United States Patent
Song et al.

(10) Patent No.: US 12,457,334 B2
(45) Date of Patent: Oct. 28, 2025

(54) ENCODING AND DECODING METHODS AND APPARATUSES FOR ENHANCEMENT LAYER

(71) Applicant: HUAWEI TECHNOLOGIES CO., LTD., Guangdong (CN)

(72) Inventors: Yi Song, Shenzhen (CN); Peiyun Di, Shenzhen (CN); Shaolin Chen, Shenzhen (CN); Yixuan Zhang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/206,794

(22) Filed: Jun. 7, 2023

(65) Prior Publication Data
US 2023/0319272 A1    Oct. 5, 2023

Related U.S. Application Data

(63) Continuation of application No. PCT/CN2021/135075, filed on Dec. 2, 2021.

(30) Foreign Application Priority Data

Dec. 8, 2020    (CN) .......................... 202011424168.7

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/30* (2014.11); *H04N 19/96* (2014.11)

(58) Field of Classification Search
CPC ...... H04N 19/119; H04N 19/30; H04N 19/34; H04N 19/12; H04N 19/147; H04N 19/176;
(Continued)

(56) References Cited

U.S. PATENT DOCUMENTS

| | | | |
|---|---|---|---|
| 2013/0051454 A1* | 2/2013 | Sze | H04N 19/86 |
| | | | 375/E7.126 |
| 2013/0077696 A1* | 3/2013 | Zhou | H04N 19/176 |
| | | | 375/E7.026 |

(Continued)

FOREIGN PATENT DOCUMENTS

| | | |
|---|---|---|
| CN | 103281531 A | 9/2013 |
| CN | 103597827 A | 2/2014 |

(Continued)

OTHER PUBLICATIONS

Jianle Chen et al:"High efficiency video coding (HEVC) scalable extension Draft 7", Jun. 30-Jul. 9, 2014, Document: JCTVC-R1008v7, Draft ISO/IEC 23008-2 : 201x (E), total 171 pages.

(Continued)

*Primary Examiner* — Daniel Chang
(74) *Attorney, Agent, or Firm* — WOMBLE BOND DICKINSON (US) LLP

(57) ABSTRACT

An encoding method includes: an encoder obtains a reconstructed block of a base layer of a to-be-encoded picture block; calculates a difference between corresponding pixels in the to-be-encoded picture block and the reconstructed block of the base layer to obtain a residual block of an enhancement layer of the to-be-encoded picture block; determines a transform-block partitioning manner of the residual block of the enhancement layer; and performs transformation on the residual block of the enhancement layer based on the transform-block partitioning manner. This application can simplify a processing procedure for the (Continued)

encoder and improve encoding efficiency of the encoder. In addition, compression efficiency of the residual block can be improved more effectively by using an adaptive TU partitioning method.

18 Claims, 20 Drawing Sheets

(51) Int. Cl.
  *H04N 19/30* (2014.01)
  *H04N 19/96* (2014.01)
(58) Field of Classification Search
  CPC ........ H04N 19/33; H04N 19/60; H04N 19/61; H04N 19/96
  See application file for complete search history.

(56) References Cited

U.S. PATENT DOCUMENTS

| | | | | |
|---|---|---|---|---|
| 2013/0094592 A1* | 4/2013 | Zhou | ................ | H04N 19/00 375/240.01 |
| 2013/0101036 A1* | 4/2013 | Zhou | ................ | H04N 19/157 375/240.12 |
| 2013/0114692 A1* | 5/2013 | Sze | ................ | H04N 19/129 375/240.03 |
| 2013/0114715 A1* | 5/2013 | Srinivasan | ................ | H04N 19/107 375/E7.243 |
| 2013/0117343 A1* | 5/2013 | Budagavi | ................ | H04N 19/60 708/400 |
| 2013/0156097 A1* | 6/2013 | Budagavi | ................ | H04N 19/82 375/240.02 |
| 2013/0177069 A1* | 7/2013 | Sze | ................ | H04N 19/70 375/240.02 |
| 2013/0182759 A1* | 7/2013 | Kim | ................ | H04N 19/117 375/240.02 |
| 2013/0188704 A1* | 7/2013 | Zhou | ................ | H04N 19/176 375/240.12 |
| 2013/0202051 A1* | 8/2013 | Zhou | ................ | H04N 19/521 375/240.26 |
| 2013/0223542 A1* | 8/2013 | Kim | ................ | H04N 19/117 375/240.29 |
| 2013/0243083 A1* | 9/2013 | Sezer | ................ | H04N 19/14 375/240.18 |
| 2013/0266060 A1* | 10/2013 | Budagavi | ................ | H04N 19/176 375/240.02 |
| 2013/0272389 A1* | 10/2013 | Sze | ................ | H04N 19/124 375/240.03 |
| 2013/0272415 A1* | 10/2013 | Zhou | ................ | H04N 19/105 375/240.16 |
| 2013/0272429 A1* | 10/2013 | Srinivasan | ................ | H04N 19/44 375/240.25 |
| 2013/0272624 A1* | 10/2013 | Budagavi | ................ | H04N 19/176 382/239 |
| 2013/0287099 A1* | 10/2013 | Kwon | ................ | H04N 19/86 375/240.03 |
| 2013/0294501 A1* | 11/2013 | Sze | ................ | H04N 19/117 375/240.02 |
| 2013/0329790 A1* | 12/2013 | Zhou | ................ | H04N 19/23 375/240.12 |
| 2013/0336385 A1* | 12/2013 | Budagavi | ................ | H04N 19/127 375/240.2 |
| 2014/0010293 A1* | 1/2014 | Srinivasan | ................ | H04N 19/157 375/240.12 |
| 2014/0016703 A1 | 1/2014 | Denoual | | |
| 2014/0050263 A1* | 2/2014 | Kim | ................ | H04N 19/176 375/240.13 |
| 2014/0064366 A1* | 3/2014 | Srinivasan | ................ | H04N 19/147 375/240.12 |
| 2014/0086330 A1* | 3/2014 | Zhou | ................ | H04N 19/157 375/240.24 |
| 2014/0140395 A1* | 5/2014 | Kim | ................ | H04N 19/176 375/240.03 |
| 2014/0185691 A1* | 7/2014 | Kwon | ................ | H04N 19/573 375/240.26 |
| 2014/0301465 A1* | 10/2014 | Kwon | ................ | H04N 19/109 375/240.16 |
| 2014/0341287 A1* | 11/2014 | Mody | ................ | H04N 19/82 375/240.13 |
| 2015/0103910 A1* | 4/2015 | Kwon | ................ | H04N 19/567 375/240.16 |
| 2016/0119660 A1* | 4/2016 | Raju | ................ | A61P 35/00 380/210 |
| 2017/0195675 A1* | 7/2017 | Seok | ................ | H04N 19/15 |
| 2018/0027236 A1* | 1/2018 | Jeon | ................ | H04N 19/176 375/240.12 |
| 2018/0192076 A1* | 7/2018 | Ikai | ................ | H04N 19/176 |
| 2018/0338142 A1* | 11/2018 | Kim | ................ | H04N 19/176 |
| 2019/0297341 A1* | 9/2019 | Zhou | ................ | H04N 19/51 |
| 2023/0319272 A1* | 10/2023 | Song | ................ | H04N 19/96 375/240.02 |

FOREIGN PATENT DOCUMENTS

| | | | | |
|---|---|---|---|---|
| CN | 104247424 A | | 12/2014 | |
| CN | 104902276 A | * | 9/2015 | |
| CN | 111971958 A | | 11/2020 | |
| WO | WO-2013128010 A2 | * | 9/2013 | ............... G06T 9/00 |

OTHER PUBLICATIONS

Information technology, High efficiency coding and media delivery in heterogeneous environments, Part 2: High efficiency video coding, Amendment 1: Shutter interval information SEI message, ISO/IEC, 23008-2, Aug. 2020, total 10 pages.
Information technology, Coding of audio-visual objects, Part 10: Advanced video coding, ISO/IEC 14496-10:2020(E), Ninth edition, Dec. 2020, total 12 pages.
Series H: Audiovisual and Multimedia Systems Infrastructure of audiovisual services, Coding of moving video, Advanced video coding for generic audiovisual services, ITU-T H.264, Telecommunication Standardization Sector of ITU (Jun. 2019), total 836 pages.
Series H: Audiovisual and Multimedia Systems Infrastructure of audiovisual services, Coding of moving video, High efficiency video coding, ITU-T H.265, Telecommunication Standardization Sector of ITU (Nov. 2019), total 712 pages.

* cited by examiner

ENCODING AND DECODING METHODS AND APPARATUSES FOR ENHANCEMENT LAYER

CROSS-REFERENCE TO RELATED APPLICATIONS

This application is a continuation of International Application No. PCT/CN2021/135075, filed on Dec. 2, 2021, which claims priority to Chinese Patent Application No. 202011424168.7, filed on Dec. 8, 2020. The disclosures of the aforementioned applications are hereby incorporated by reference in their entireties.

TECHNICAL FIELD

Embodiments of the present disclosure relate to the field of video or picture compression technologies, and in particular, to encoding and decoding methods and apparatuses for an enhancement layer.

BACKGROUND

Video coding (e.g., video encoding and decoding) is widely used in digital video applications, for example, digital broadcast televisions, video transmission over internets and mobile networks, real-time conversation applications such as video chat and video conferencing, DVDs, Blu-ray discs, video content acquisition and editing systems, and security applications of camcorders.

A large amount of video data may be depicted even if a video is short. This may result in difficulty when the data is to be sent through a network with a limited bandwidth capacity or is to be transmitted in other manners. Therefore, video data may be compressed before being transmitted through a modern telecommunications network. Because memory resources may be limited, a size of a video may also cause problems when the video is stored on a storage device. A video compression device usually uses software and/or hardware on a source side to encode video data prior to transmission or storage of the video data, thereby decreasing a volume of data used to represent digital video pictures. Compressed data is then received by a video decompression device on a destination side. With limited network resources and ever increasing requirements for higher video quality, compression and decompression technologies may benefit from improvement. These improved technologies can improve a compression ratio and hardly affect picture quality.

In the H.265/HEVC standard, a coding unit (CU) includes one luminance quantization parameter (QP) and two chrominance quantization parameters, where the chrominance quantization parameters may be derived from the luminance quantization parameter. Therefore, improving coding efficiency of the luminance quantization parameter is a key technology for improving video coding efficiency.

SUMMARY

This application provides encoding and decoding methods and apparatuses for an enhancement layer, to simplify a processing procedure for an encoder and improve encoding efficiency of the encoder. In addition, by using an adaptive TU partitioning method, a TU size of the enhancement layer is no longer limited by a CU size, so that compression efficiency of a residual block can be improved more effectively.

According to a first aspect, this application provides encoding and decoding methods for an enhancement layer, including: An encoder obtains a reconstructed block of a base layer of a to-be-encoded picture block. The encoder calculates a difference between corresponding pixels in the to-be-encoded picture block and the reconstructed block of the base layer to obtain a residual block of an enhancement layer of the to-be-encoded picture block. The encoder determines a transform-block partitioning manner of the residual block of the enhancement layer. The encoder performs transformation on the residual block of the enhancement layer based on the transform-block partitioning manner to obtain a bitstream of the residual block of the enhancement layer. A decoder obtains a bitstream of a residual block of an enhancement layer of a to-be-decoded picture block. The decoder performs entropy decoding, dequantization, and inverse transformation on the bitstream of the residual block of the enhancement layer to obtain a reconstructed residual block of the enhancement layer. The decoder obtains a reconstructed block of a base layer of the to-be-decoded picture block. The decoder performs summation on corresponding pixels in the reconstructed residual block of the enhancement layer and the reconstructed block of the base layer to obtain a reconstructed block of the enhancement layer.

Layered video coding, also referred to as scalable video coding, is an extended coding standard of an existing video coding standard (which is usually extended-standard scalable video coding (SVC) of advanced video coding (AVC) (H.264), or extended-standard scalable high efficiency video coding (SHVC) of high efficiency video coding (HEVC) (H.265)). The scalable video coding is mainly used to resolve packet loss and delay variation problems caused by a real-time change of network bandwidth in real-time video transmission.

Basic structures in the scalable video coding may be referred to as layers. In the scalable video coding technology, spatial scalability (e.g., resolution scalability) may be performed on an original picture block, to obtain bitstreams of layers with different resolutions. A resolution may be a size of a picture block expressed as pixels. A lower-layer resolution is relatively low, and a higher-layer resolution is not lower than a lower-layer resolution. Alternatively, temporal scalability (e.g., frame rate scalability) may be performed on an original picture block, to obtain bitstreams of layers with different frame rates. A frame rate may be a quantity of picture frames included in a video per unit time. A lower-layer frame rate is relatively low, and a higher-layer frame rate is not lower than a lower-layer frame rate. Alternatively, quality scalability may be performed on an original picture block, to obtain bitstreams of layers with different encoding quality. Encoding quality may be video quality. A lower-layer picture distortion degree is relatively large, and a higher-layer picture distortion degree is not higher than a lower-layer picture distortion degree.

Generally, a layer referred to as the base layer is a bottommost layer in the scalable video coding. In the spatial scalability, a base layer picture block is encoded by using a lowest resolution. In the temporal scalability, the base layer picture block is encoded by using a lowest frame rate. In the quality scalability, the base layer picture block is encoded by using a highest QP or a lowest bit rate. In other words, the base layer is a layer with lowest quality in the scalable video coding. A layer referred to as an enhancement layer is a layer above the base layer in the scalable video coding, and there may be a plurality of enhancement layers from low to high. Based on encoding information obtained by the base layer, a lowest-layer enhancement layer has a higher encoding resolution than the base layer, has a higher frame rate than the base layer, or has a higher bit rate than the base layer. A picture block with higher quality may be encoded for a higher-layer enhancement layer based on encoding information of a lower-layer enhancement layer.

For example, FIG. 9 is an example schematic diagram of layers in scalable video coding according to this application. As shown in FIG. 9, after an original picture block is sent to a scalable encoder, the original picture block may be layered into a base layer picture block B and enhancement layer picture blocks (E1 to En, where n≥1) based on different encoding configurations, and then the picture blocks are separately encoded to obtain bitstreams including a base layer bitstream and an enhancement layer bitstream. The base layer bitstream is generally a bitstream obtained by encoding a lowest spatial-domain picture block, a lowest time-domain picture block, or a lowest quality picture block. The enhancement layer bitstream is a bitstream obtained based on the base layer by superimposing and encoding a high-layer spatial-domain picture block, a high-layer time-domain picture block, or a high-layer quality picture block. As a quantity of enhancement layers increases, spatial-domain layers, time-domain layers, or quality layers for encoding are increasingly high. When transmitting bitstreams to the decoder, the encoder preferentially ensures transmission of the base layer bitstream. When there is a margin in a network, the encoder gradually transmits the bitstreams at increasingly high layers. The decoder first receives and decodes the base layer bitstream, decodes, in a layer-by-layer manner based on the received enhancement layer bitstream, bitstreams with increasingly high spatial-domain layers, time-domain layers, or quality layers in a sequence from a lower layer to a higher layer, and then superimposes higher-layer decoding information on a lower-layer reconstructed block, to obtain a reconstructed block with a higher resolution, a higher frame rate, or higher quality.

The to-be-encoded picture block may be a picture block currently being processed by the encoder, and the picture block may be a largest coding unit (LCU) in a full-frame picture. The full-frame picture may be any picture frame in a picture sequence included in a video being processed by the encoder. Partitioning processing has not been performed on the picture frame, and a size of the picture frame is a size of a complete picture frame. In the H.265 standard, before video coding is performed, an original picture frame is partitioned into a plurality of coding tree units (CTUs). A CTU is a largest coding unit for video coding, and may be partitioned into CUs of different sizes in a quadtree manner. As a largest coding unit, the CTU is also referred to as an LCU. Alternatively, the picture block may be a full-frame picture, or the picture block may be a region of interest (ROI) in a full-frame picture, that is, a picture region that is to be processed and that is specified in the picture.

As described above, each picture in a video sequence is usually partitioned into a set of non-overlapping blocks, which are usually encoded at a block level. In other words, the encoder usually processes, that is, encodes, a video at a block (e.g., picture block) level. For example, the encoder generates a prediction block through spatial prediction (e.g., intra prediction) and temporal prediction (inter prediction); subtracts the prediction block from a picture block (e.g., a currently processed/to-be-processed block) to obtain a residual block; and performs transformation and quantization on the residual block in transform domain, so that a volume of data to be transmitted (compressed) can be reduced. The encoder further may perform dequantization and inverse transformation to obtain a reconstructed residual block, and then adds pixel values of the reconstructed residual block to pixel values of the prediction block to obtain a reconstructed block. A reconstructed block of the base layer is the reconstructed block obtained by performing the foregoing operations on the base layer picture block obtained by layering the original picture block. The encoder obtains a prediction block of the base layer based on the original picture block (for example, an LCU); calculates a difference between corresponding pixels in the original picture block and the prediction block of the base layer to obtain a residual block of the base layer; and after performing partitioning on the residual block of the base layer, performs transformation and quantization on the residual block, and performs entropy encoding on the residual block together with encoding control information, prediction information, motion information, and the like of the base layer to obtain the base layer bitstream. The encoder performs dequantization and inverse transformation on a quantized coefficient to obtain a reconstructed residual block of the base layer, and then performs summation on corresponding pixels in the prediction block of the base layer and the reconstructed residual block of the base layer to obtain the reconstructed block of the base layer.

A resolution of the enhancement layer picture block is not lower than a resolution of the base layer picture block, or encoding quality of the enhancement layer picture block is not lower than encoding quality of the base layer picture block. As described above, the encoding quality may be video quality. That the encoding quality of the enhancement layer picture block is not lower than the encoding quality of the base layer picture block may mean that a picture distortion degree of the base layer is relatively large, and a picture distortion degree of the enhancement layer is not higher than the picture distortion degree of the base layer.

A picture block includes a plurality of pixels, the plurality of pixels are arranged into an array, and a location of each pixel in the picture block may be uniquely identified by using a row number and a column number. It is assumed that sizes of the to-be-encoded picture block and the reconstructed block of the base layer are both M×N, that is, the to-be-encoded picture block and the reconstructed block of the base layer each include M×N pixels. a(i1, j1) represents a pixel with an $i1^{th}$ column and a $j1^{th}$ row in the to-be-encoded picture block, where i1 ranges from 1 to M and j1 ranges from 1 to N. b(i2, j2) represents a pixel with an $i1^{th}$ column and a $j1^{th}$ row in the reconstructed block of the base layer, where i2 ranges from 1 to M and j2 ranges from 1 to N. The corresponding pixels in the to-be-encoded picture block and the reconstructed block of the base layer are pixels whose row numbers and column numbers in the picture blocks to which the pixels respectively belong are respectively equal to each other, that is, i1=i2 and j1=j2. For example, a size of a picture block is 16×16, the picture block includes 16×16 pixels, row numbers are 0 to 15, column numbers are 0 to 15, and a pixel with an identifier a(0, 0) in the to-be-encoded picture block and a pixel with an identifier b(0, 0) in the reconstructed block of the base layer are corresponding pixels, or a pixel with an identifier a(6, 9) in the to-be-encoded picture block and a pixel with an identifier b(6, 9) in the reconstructed block of the base layer are corresponding pixels. Calculating the difference between the corresponding pixels may be calculating a difference between pixel values of the corresponding pixels in the to-be-encoded picture block and the reconstructed block of the base layer. The pixel value may be a luminance value, a chrominance value, or the like of the pixel. This is not specifically limited in this application.

In the SHVC standard, the encoder predicts a prediction block of the enhancement layer based on the reconstructed block of the base layer, and then calculates a difference between corresponding pixels in the reconstructed block of the base layer and the prediction block of the enhancement layer to obtain the residual block of the enhancement layer. In contrast, in this application, the difference between the corresponding pixels in the to-be-encoded picture block and the reconstructed block of the base layer may be directly calculated to obtain the residual block of the enhancement layer. This reduces a process of obtaining the prediction block of the enhancement layer, so that a processing procedure for the encoder can be simplified, and encoding efficiency of the encoder can be improved.

In this application, the transform-block partitioning manner of the residual block of the enhancement layer is different from a transform-block partitioning manner of the residual block of the base layer. To be specific, the transform-block partitioning manner used when the encoder processes the residual block of the enhancement layer is different from the transform-block partitioning manner used when the encoder processes the residual block of the base layer. For example, the residual block of the base layer is partitioned into three subblocks in a TT partitioning manner, but the residual block of the enhancement layer is partitioned not in the TT partitioning manner. The encoder may determine the transform-block partitioning manner of the residual block of the enhancement layer in the following adaptive manner:

In a possible embodiment, the encoder may first perform iterative tree structure partitioning on a first largest transform unit (LTU) of the residual block of the enhancement layer to obtain transform units (TUs) of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and 0≤i≤Dmax−1.

Corresponding to the size of the to-be-encoded picture block, a size of the residual block of the enhancement layer may be a size of the full-frame picture, may be a size of a partitioned picture block (for example, a CTU or a CU) in the full-frame picture, or may be a size of the ROI in the full-frame picture. The LTU is a picture block of a largest size used for transform processing in picture blocks, and a size of the LTU may be same as the size of the reconstructed block of the base layer. This can ensure that efficiency of transform coding is maximized while the enhancement layers corresponding to different reconstructed blocks can be processed concurrently. One LTU may be partitioned into a plurality of nodes based on configured partitioning information, and each node may be further partitioned based on the configured partitioning information until no nodes are partitioned any more. This process may be referred to as iterative tree structure partitioning. The tree structure partitioning may include QT partitioning, BT partitioning, and/or TT partitioning, and may further include EQT partitioning. A partitioning manner of the LTU is not specifically limited in this application. A plurality of nodes are obtained by partitioning one node at a time. The node on which partitioning is performed is referred to as a parent node, and the nodes obtained through partitioning are referred to as sub-nodes. A partitioning depth of a root node is 0, and a depth of the subnode is a depth of the parent node plus 1. Therefore, iterative tree structure partitioning may be performed on the residual block of the enhancement layer starting from the root node LTU, to obtain TUs of a plurality of depths. A maximum depth (that is, a depth of a minimum TU obtained through partitioning) in the plurality of depths is Dmax. It is assumed that a width and a height of the LTU are both L, and a width and a height of the minimum TU are both S. In this case, the partitioning depth of the minimum TU is $d=\log_2(\lfloor L/S \rfloor)$, where $\lfloor \ \rfloor$ indicates rounding down, and therefore Dmax≤d.

Based on the foregoing TUs obtained through transform partitioning, the encoder performs rate-distortion optimization (RDO) processing to determine the partitioning manner of the LTU. The first TU with the partitioning depth i and the second TU with the depth i+1 are used as an example. i starts from Dmax−1 and values of i are taken in descending order, and the second TU is obtained by partitioning the first TU. The encoder first performs transformation and quantization on the first TU to obtain a quantized coefficient of the first TU (the quantized coefficient may be obtained through quantization processing in FIG. 10); precodes the quantized coefficient of the first TU (the precoding is an encoding process performed to estimate a length of an encoded code word, or a process of performing processing in a manner similar to encoding) to obtain a code word length (that is, a bitstream size) R of the first TU; performs dequantization and inverse transformation on the quantized coefficient of the first TU to obtain a reconstructed block of the TU; calculates a sum of squared differences of the first TU and the reconstructed block of the first TU to obtain a distortion value D of the first TU; and finally obtains the loss estimate C of the first TU based on the bitstream size R of the first TU and the distortion value D of the first TU.

A calculation formula of the distortion value D of the first TU is as follows:

$$D = \sum_i \sum_j (P_{rs}(i,j) - P_{rc}(i,j))^2,$$

where $P_{rs}(i,j)$ represents an original value of a residual pixel in the first TU at a coordinate point (i, j) within a range of the TU, and $P_{rc}(i,j)$ represents a reconstructed value of the residual pixel in the first TU at the coordinate point (i, j) within the range of the TU.

A calculation formula of the loss estimate C of the first TU is as follows:

$C=D+\lambda R$, where $\lambda$ represents a constant value related to a quantized coefficient of a current layer, and determines a pixel distortion status of the current layer.

The encoder may calculate the loss estimates of the second TUs by using the same method. After obtaining the loss estimate of the first TU and the loss estimates of the second TUs, the encoder compares the loss estimate of the first TU with the sum of the loss estimates of the plurality of second TUs, where the plurality of second TUs are obtained by partitioning the first TU; and determines a partitioning manner corresponding to a smaller one of the two compared values as the partitioning manner of the first TU. To be specific, if the loss estimate of the first TU is greater than the sum of the loss estimates of the plurality of second TUs, a manner of partitioning the first TU into the plurality of second TUs is determined as the partitioning manner of the first TU. If the loss estimate of the first TU is less than or equal to the sum of the loss estimates of the plurality of second TUs, the first TU is not further partitioned. After traversing all the TUs of the LTU by using the foregoing method, the encoder can obtain the partitioning manner of the LTU. When the residual block of the enhancement layer includes only one LTU, the partitioning manner of the LTU is the partitioning manner of the residual block of the enhancement layer. When the residual block of the enhancement layer includes a plurality of LTUs, the partitioning manner of the LTUs and a manner of partitioning the residual block of the enhancement layer into the LTUs constitute the partitioning manner of the residual block of the enhancement layer.

In this application, a TU partitioning manner used for the residual block of the enhancement layer is different from that used for the residual block of the base layer, and is an adaptive TU partitioning method, that is, a TU partitioning manner suitable for the residual block of the enhancement layer; and then encoding is performed. When the TU partitioning for the residual block of the enhancement layer is independent of a CU partitioning manner for the base layer, a TU size of the enhancement layer is no longer limited by a CU size, so that encoding flexibility can be improved.

The encoder may perform transformation, quantization, and entropy encoding on the residual block of the enhancement layer based on the transform-block partitioning manner to obtain the bitstream of the residual block of the enhancement layer. For transformation, quantization, and entropy encoding methods, refer to the foregoing descriptions. Details are not described herein again.

After obtaining the bitstream of the residual block of the enhancement layer, the decoder performs entropy decoding, dequantization, and inverse transform processing on the bitstream based on a syntax element carried in the bitstream to obtain the reconstructed residual block of the enhancement layer. Based on row numbers and column numbers of a plurality of pixels included in the reconstructed residual block of the enhancement layer and row numbers and column numbers of a plurality of pixels included in the reconstructed block of the base layer, the decoder adds pixels in one of the two picture blocks to corresponding pixels in the other picture block, to obtain the reconstructed block of the enhancement layer, where the pixels in one of the two picture blocks respectively have a same row number and column number as the corresponding pixels in the other picture block.

In this application, the difference between the corresponding pixels in the to-be-encoded picture block and the reconstructed block of the base layer may be directly calculated to obtain the residual block of the enhancement layer. This reduces a process of obtaining the prediction block of the enhancement layer, so that a processing procedure for the encoder can be simplified, and encoding efficiency of the encoder can be improved. In addition, the TU partitioning manner used for the residual block of the enhancement layer is different from that used for the residual block of the base layer, and is the adaptive TU partitioning method, that is, the TU partitioning manner suitable for the residual block of the enhancement layer; and then encoding is performed. When the TU partitioning for the residual block of the enhancement layer is independent of the CU partitioning manner for the base layer, the TU size of the enhancement layer is no longer limited by the CU size, so that compression efficiency of the residual block can be improved more effectively.

The foregoing method is applicable to two layering manners: spatial scalability and quality scalability. When the spatial scalability is used for the picture block to obtain the base layer picture block and the enhancement layer picture block, the resolution of the base layer picture block is lower than the resolution of the enhancement layer picture block. Therefore, before calculating the difference between the corresponding pixels in the to-be-encoded picture block and the reconstructed block of the base layer to obtain the residual block of the enhancement layer of the to-be-encoded picture block, the encoder may perform downsampling on an original to-be-encoded picture block to obtain the to-be-encoded picture block with a first resolution, and perform upsampling on an original reconstructed block of the base layer to obtain the reconstructed block of the base layer with the first resolution. In other words, the encoder may separately perform downsampling on the original to-be-encoded picture block, and perform upsampling on the original reconstructed block of the base layer, so that the resolution of the to-be-encoded picture block is equal to the resolution of the reconstructed block of the base layer.

According to a second aspect, this application provides encoding and decoding methods for an enhancement layer, including: An encoder obtains a reconstructed block of a first enhancement layer of a to-be-encoded picture block. The encoder calculates a difference between corresponding pixels in the to-be-encoded picture block and the reconstructed block of the first enhancement layer to obtain a residual block of a second enhancement layer of the to-be-encoded picture block. The encoder determines a transform-block partitioning manner of the residual block of the second enhancement layer. The encoder performs transformation on the residual block of the second enhancement layer based on the transform-block partitioning manner to obtain a bitstream of the residual block of the second enhancement layer. A decoder obtains the bitstream of the residual block of the second enhancement layer of a to-be-decoded picture block. The decoder performs entropy decoding, dequantization, and inverse transformation on the bitstream of the residual block of the second enhancement layer to obtain a reconstructed residual block of the second enhancement layer. The decoder obtains the reconstructed block of the first enhancement layer of the to-be-decoded picture block. The decoder performs summation on corresponding pixels in the reconstructed residual block of the second enhancement layer and the reconstructed block of the first enhancement layer to obtain a reconstructed block of the second enhancement layer.

In this embodiment of this application, after a picture block is layered by using spatial scalability, temporal scalability, or quality scalability, in addition to a base layer, the picture block is further partitioned into a plurality of enhancement layers. Compared with the first aspect, this embodiment describes the encoding and decoding methods for a higher layer, namely, the second enhancement layer, based on a lower-layer enhancement layer (e.g., the first enhancement layer).

A difference from a method for obtaining a reconstructed block of the base layer lies in that: A code block may calculate a difference between corresponding pixels in the to-be-processed picture block and a reconstructed block of a third layer of the to-be-processed picture block to obtain a residual block of the first enhancement layer, where the third layer is a layer lower than the first enhancement layer, and may be the base layer or an enhancement layer; perform transformation and quantization on the residual block of the first enhancement layer to obtain a quantized coefficient of the residual block of the first enhancement layer; perform dequantization and inverse transformation on the quantized coefficient of the residual block of the first enhancement layer to obtain a reconstructed residual block of the first enhancement layer; and finally perform summation on corresponding pixels in the reconstructed block of the third layer and the reconstructed residual block of the first enhancement layer to obtain the reconstructed block of the first enhancement layer.

In this embodiment of this application, the transform-block partitioning manner of the residual block of the second enhancement layer is different from a transform-block partitioning manner of the residual block of the first enhancement layer. The encoder may alternatively use the foregoing RDO processing to determine the transform-block partitioning manner of the residual block of the second enhancement layer. Details are not described herein again.

In this application, a TU partitioning manner used for the residual block of the second enhancement layer is different from those used for the residual block of the first enhancement layer and a residual block of the base layer, and is an adaptive TU partitioning method, that is, a TU partitioning manner suitable for the residual block of the second enhancement layer; and then encoding is performed. When the TU partitioning for the residual block of the second enhancement layer is independent of a CU or TU partitioning manner for another layer, a TU size of the second enhancement layer is no longer limited by a CU size or a TU size of the second enhancement layer is no longer limited by a TU size of the first enhancement layer, so that encoding flexibility can be improved.

In this application, the difference between the corresponding pixels in the to-be-encoded picture block and the reconstructed block of the first enhancement layer may be directly calculated to obtain the residual block of the second enhancement layer. This reduces a process of obtaining a prediction block of the second enhancement layer, so that a processing procedure for the encoder can be simplified, and encoding efficiency of the encoder can be improved. In addition, the TU partitioning manner used for the residual block of the second enhancement layer is different from that used for the residual block of the first enhancement layer, and is the adaptive TU partitioning method, that is, the TU partitioning manner suitable for the residual block of the second enhancement layer; and then encoding is performed. When the TU partitioning for the residual block of the second enhancement layer is independent of a CU or TU partitioning manner for the first enhancement layer, the TU size of the second enhancement layer is no longer limited by the CU size or the TU size of the second enhancement layer is no longer limited by the TU size of the first enhancement layer, so that compression efficiency of the residual block can be improved more effectively.

The foregoing method is applicable to two layering manners: spatial scalability and quality scalability. When the spatial scalability is used for the picture block to obtain a first enhancement layer picture block and a second enhancement layer picture block, a resolution of the first enhancement layer picture block is lower than a resolution of the second enhancement layer picture block. Therefore, before calculating the difference between the corresponding pixels in the to-be-encoded picture block and the reconstructed block of the first enhancement layer to obtain the residual block of the second enhancement layer of the to-be-encoded picture block, the encoder may perform downsampling on an original to-be-encoded picture block to obtain the to-be-encoded picture block with a first resolution, and perform upsampling on an original reconstructed block of the first enhancement layer to obtain the reconstructed block of the first enhancement layer with the first resolution. In other words, the encoder may separately perform downsampling on the original to-be-encoded picture block, and perform upsampling on the original reconstructed block of the first enhancement layer, so that the resolution of the to-be-encoded picture block is equal to the resolution of the reconstructed block of the first enhancement layer.

According to a third aspect, this application provides an encoding apparatus, including: an obtaining module, configured to: obtain a reconstructed block of a base layer of a to-be-encoded picture block; and calculate a difference between corresponding pixels in the to-be-encoded picture block and the reconstructed block of the base layer to obtain a residual block of an enhancement layer of the to-be-encoded picture block, where a resolution of an enhancement layer picture block is not lower than a resolution of a base layer picture block, or encoding quality of an enhancement layer picture block is not lower than encoding quality of a base layer picture block; a determining module, configured to determine a transform-block partitioning manner of the residual block of the enhancement layer, where the transform-block partitioning manner of the residual block of the enhancement layer is different from a transform-block partitioning manner of a residual block of the base layer; and an encoding module, configured to perform transformation on the residual block of the enhancement layer based on the transform-block partitioning manner to obtain a bitstream of the residual block of the enhancement layer.

In a possible embodiment, the determining module is configured to: perform iterative tree structure partitioning on a first largest transform unit LTU of the residual block of the enhancement layer to obtain transform units TUs of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and $0 \le i \le Dmax-1$.

In a possible embodiment, the determining module is configured to: perform transformation and quantization on a TU to obtain a quantized coefficient of the TU, where the TU is the first TU or the second TU; precode the quantized coefficient of the TU to obtain a code word length of the TU; perform dequantization and inverse transformation on the quantized coefficient of the TU to obtain a reconstructed block of the TU; calculate a sum of squared differences SSD of the TU and the reconstructed block of the TU to obtain a distortion value of the TU; obtain a loss estimate of the TU based on the code word length of the TU and the distortion value of the TU; determine a smaller one of the loss estimate of the first TU and the sum of the loss estimates of the plurality of second TUs; and determine a partitioning manner corresponding to the smaller one as the partitioning manner of the first TU.

In a possible embodiment, a size of the LTU is same as a size of the reconstructed block of the base layer, or a size of the LTU is same as a size of a reconstructed block obtained by performing upsampling on an original reconstructed block of the base layer.

In a possible embodiment, the to-be-encoded picture block is a largest coding unit LCU in a full-frame picture, the to-be-encoded picture block is a full-frame picture, or the to-be-encoded picture block is a region of interest ROI in a full-frame picture.

In a possible embodiment, the base layer and the enhancement layer are obtained based on resolution or encoding quality scalability.

In a possible embodiment, when the base layer and the enhancement layer are obtained based on resolution scalability, the obtaining module is further configured to: perform downsampling on an original to-be-encoded picture block to obtain the to-be-encoded picture block with a first resolution; and perform upsampling on the original reconstructed block of the base layer to obtain the reconstructed block of the base layer with the first resolution.

In a possible embodiment, the obtaining module is configured to: calculate a difference between corresponding pixels in the to-be-processed picture block and a prediction block of the to-be-processed picture block to obtain a residual block of the to-be-processed picture block; perform transformation and quantization on the residual block of the to-be-processed picture block to obtain a quantized coefficient of the to-be-processed picture block; perform dequantization and inverse transformation on the quantized coefficient of the to-be-processed picture block to obtain a reconstructed residual block of the to-be-processed picture block; and perform summation on corresponding pixels in the prediction block of the to-be-processed picture block and the reconstructed residual block of the to-be-processed picture block to obtain the reconstructed block of the base layer.

According to a fourth aspect, this application provides an encoding apparatus, including: an obtaining module, configured to: obtain a reconstructed block of a first enhancement layer of a to-be-encoded picture block; and calculate a difference between corresponding pixels in the to-be-encoded picture block and the reconstructed block of the first enhancement layer to obtain a residual block of a second enhancement layer of the to-be-encoded picture block, where a resolution of a second enhancement layer picture block is not lower than a resolution of a first enhancement layer picture block, or encoding quality of a second enhancement layer picture block is not lower than encoding quality of a first enhancement layer picture block; a determining module, configured to determine a transform-block partitioning manner of the residual block of the second enhancement layer, where the transform-block partitioning manner of the residual block of the second enhancement layer is different from a transform-block partitioning manner of a residual block of the first layer; and an encoding module, configured to perform transformation on the residual block of the second enhancement layer based on the transform-block partitioning manner to obtain a bitstream of the residual block of the second enhancement layer.

In a possible embodiment, the determining module is configured to: perform iterative tree structure partitioning on a first largest transform unit LTU of the residual block of the second enhancement layer to obtain transform units TUs of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and $0 \leq i \leq Dmax-1$.

In a possible embodiment, the determining module is configured to: perform transformation and quantization on a TU to obtain a quantized coefficient of the TU, where the TU is the first TU or the second TU; precode the quantized coefficient of the TU to obtain a code word length of the TU; perform dequantization and inverse transformation on the quantized coefficient of the TU to obtain a reconstructed block of the TU; calculate a sum of squared differences SSD of the TU and the reconstructed block of the TU to obtain a distortion value of the TU; obtain a loss estimate of the TU based on the code word length of the TU and the distortion value of the TU; determine a smaller one of the loss estimate of the first TU and the sum of the loss estimates of the plurality of second TUs; and determine a partitioning manner corresponding to the smaller one as the partitioning manner of the first TU.

In a possible embodiment, a size of the LTU is same as a size of the reconstructed block of the first enhancement layer, or a size of the LTU is same as a size of a reconstructed block obtained by performing upsampling on an original reconstructed block of the first enhancement layer.

In a possible embodiment, the to-be-encoded picture block is a largest coding unit LCU in a full-frame picture, the to-be-encoded picture block is a full-frame picture, or the to-be-encoded picture block is a region of interest ROI in a full-frame picture.

In a possible embodiment, the first enhancement layer and the second enhancement layer are obtained through layering in a quality scalability manner or a spatial scalability manner.

In a possible embodiment, when the first enhancement layer and the second enhancement layer are obtained through layering in a spatial scalability manner, the obtaining module is further configured to: perform downsampling on an original to-be-encoded picture block to obtain the to-be-encoded picture block with a second resolution; and perform upsampling on the original reconstructed block of the first enhancement layer to obtain the reconstructed block of the first enhancement layer with the second resolution.

In a possible embodiment, the obtaining module is configured to: calculate a difference between corresponding pixels in the to-be-processed picture block and a reconstructed block of a third layer of the to-be-processed picture block to obtain a residual block of the first enhancement layer, where the resolution of the first enhancement layer picture block is not lower than a resolution of a third-layer picture block, or the encoding quality of the first enhancement layer picture block is not lower than encoding quality of a third-layer picture block; perform transformation and quantization on the residual block of the first enhancement layer to obtain a quantized coefficient of the residual block of the first enhancement layer; perform dequantization and inverse transformation on the quantized coefficient of the residual block of the first enhancement layer to obtain a reconstructed residual block of the first enhancement layer; and perform summation on corresponding pixels in the reconstructed block of the third layer and the reconstructed residual block of the first enhancement layer to obtain the reconstructed block of the first enhancement layer.

According to a fifth aspect, this application provides a decoding apparatus, including: an obtaining module, configured to obtain a bitstream of a residual block of an enhancement layer of a to-be-decoded picture block; a decoding module, configured to perform entropy decoding, dequantization, and inverse transformation on the bitstream of the residual block of the enhancement layer to obtain a reconstructed residual block of the enhancement layer; and a reconstruction module, configured to: obtain a reconstructed block of a base layer of the to-be-decoded picture block, where a resolution of an enhancement layer picture block is not lower than a resolution of a base layer picture block, or encoding quality of an enhancement layer picture block is not lower than encoding quality of a base layer picture block; and perform summation on corresponding pixels in the reconstructed residual block of the enhancement layer and the reconstructed block of the base layer to obtain a reconstructed block of the enhancement layer.

In a possible embodiment, the to-be-decoded picture block is a largest coding unit LCU in a full-frame picture, the to-be-decoded picture block is a full-frame picture, or the to-be-decoded picture block is a region of interest ROI in a full-frame picture.

In a possible embodiment, the base layer and the enhancement layer are obtained through layering in a quality scalability manner or a spatial scalability manner.

In a possible embodiment, when the base layer and the enhancement layer are obtained through layering in a spatial scalability manner, the reconstruction module is further configured to perform upsampling on an original reconstructed block of the base layer to obtain the reconstructed block of the base layer whose resolution is a third resolution, where the third resolution is equal to the resolution of the reconstructed residual block of the enhancement layer.

In a possible embodiment, the reconstruction module is configured to: obtain a bitstream of a residual block of the base layer; perform entropy decoding on the bitstream of the residual block of the base layer to obtain decoded data of the residual block of the base layer; perform dequantization and inverse transformation on the decoded data of the residual block of the base layer to obtain a reconstructed residual block of the base layer; obtain a prediction block of the base layer based on the decoded data of the residual block of the base layer; and perform summation on corresponding pixels in the reconstructed residual block of the base layer and the prediction block of the base layer to obtain the reconstructed block of the base layer.

According to a sixth aspect, this application provides a decoding apparatus, including: an obtaining module, configured to obtain a bitstream of a residual block of a second enhancement layer of a to-be-decoded picture block; a decoding module, configured to perform entropy decoding, dequantization, and inverse transformation on the bitstream of the residual block of the second enhancement layer to obtain a reconstructed residual block of the second enhancement layer; and a reconstruction module, configured to: obtain a reconstructed block of a first enhancement layer of the to-be-decoded picture block, where a resolution of a second enhancement layer picture block is not lower than a resolution of a first enhancement layer picture block, or encoding quality of a second enhancement layer picture block is not lower than encoding quality of a first enhancement layer picture block; and perform summation on corresponding pixels in the reconstructed residual block of the second enhancement layer and the reconstructed block of the first enhancement layer to obtain a reconstructed block of the second enhancement layer.

In a possible embodiment, the to-be-decoded picture block is a largest coding unit LCU in a full-frame picture, the to-be-decoded picture block is a full-frame picture, or the to-be-decoded picture block is a region of interest ROI in a full-frame picture.

In a possible embodiment, the first enhancement layer and the second enhancement layer are obtained through layering in a quality scalability manner or a spatial scalability manner.

In a possible embodiment, when the first enhancement layer and the second enhancement layer are obtained through layering in a spatial scalability manner, the reconstruction module is further configured to perform upsampling on an original reconstructed block of the first enhancement layer to obtain the reconstructed block of the first enhancement layer whose resolution is a fourth resolution, where the fourth resolution is equal to the resolution of the reconstructed residual block of the second enhancement layer.

In a possible embodiment, the reconstruction module is configured to: obtain a bitstream of a residual block of the first enhancement layer; perform entropy decoding, dequantization, and inverse transformation on the bitstream of the residual block of the first enhancement layer to obtain a reconstructed residual block of the first enhancement layer; and perform summation on corresponding pixels in the reconstructed residual block of the first enhancement layer and a reconstructed block of a third layer to obtain the reconstructed block of the first enhancement layer, where the resolution of the first enhancement layer picture block is not lower than a resolution of a third-layer picture block, or the encoding quality of the first enhancement layer picture block is not lower than encoding quality of a third-layer picture block.

According to a seventh aspect, this application provides an encoder, including a processor and a memory, where the processor is coupled to the memory, and the memory stores computer-readable instructions; and the processor is configured to read the computer-readable instructions, so that the encoder implements the method according to any one of the first aspect and the second aspect.

According to an eighth aspect, this application provides a decoder, including a processor and a memory, where the processor is coupled to the memory, and the memory stores computer-readable instructions; and the processor is configured to read the computer-readable instructions, so that the encoder implements the method according to any one of the first aspect and the second aspect.

According to a ninth aspect, this application provides a computer program product, including program code, where when the computer program product is being executed on a computer or a processor, the computer program product is used to perform the method according to any one of the first aspect and the second aspect.

According to a tenth aspect, this application provides a computer-readable storage medium, including program code, where when the computer-readable storage medium is being executed on a computer device, the computer-readable storage medium is used to perform the method according to any one of the first aspect and the second aspect.

DESCRIPTION OF EMBODIMENTS

Figure 1A:
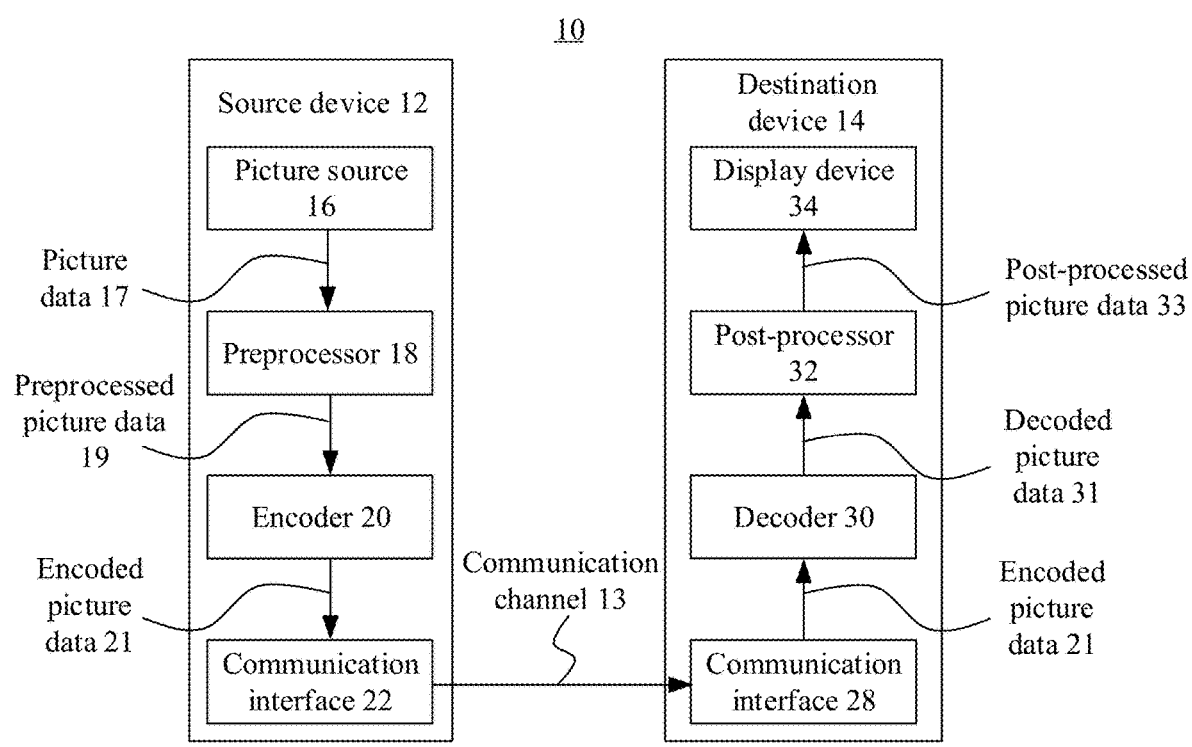
FIG. 1A is an example block diagram of a coding system 10 according to an embodiment of this application.

Embodiments of this application provide a video picture compression technology, and provide an encoding and decoding architecture that is based on layered residual coding, to improve a conventional hybrid video encoding and decoding system.

Video coding generally refers to processing of a picture sequence that forms a video or a video sequence. In the video coding field, terms "picture", "frame", and "image" may be used as synonyms. Video coding (or usually referred to as coding) includes two parts: video encoding and video decoding. Video encoding is performed on a source side, and generally includes processing (for example, compressing) an original video picture to reduce a volume of data used to represent the video picture (for more efficient storage and/or transmission). Video decoding is performed on a destination side, and generally includes inverse processing opposite to processing of an encoder to reconstruct the video picture. "Coding" of a video picture (or usually referred to as a picture) in embodiments should be understood as "encoding" or "decoding" of the video picture or a video sequence. A combination of an encoding part and a decoding part is also referred to as encoding/decoding (CODEC).

In case of lossless video coding, an original video picture can be reconstructed. In other words, a reconstructed video picture has same quality as the original video picture (it is assumed no transmission loss or no other data loss during storage or transmission). In case of lossy video coding, further compression is performed through quantization and the like to reduce a volume of data used to represent a video picture, but a decoder side cannot completely reconstruct the video picture. In other words, a reconstructed video picture has lower or worse quality than the original video picture.

Several video coding standards are used for "lossy hybrid video encoding and decoding" (that is, spatial and temporal prediction in pixel domain is combined with 2D transform coding used for quantization in transform domain). Each picture in a video sequence is usually partitioned into a set of non-overlapping blocks, which are usually encoded at a block level. In other words, the encoder usually processes, that is, encodes, a video at a block (e.g., video block) level. For example, the encoder generates a prediction block through spatial prediction (e.g., intra prediction) and temporal prediction (e.g., inter prediction); subtracts the prediction block from a current block (e.g., a currently processed/to-be-processed block) to obtain a residual block; and performs transformation and quantization on the residual block in transform domain, so that a volume of data to be transmitted (e.g., compressed) is reduced. On the decoder side, the inverse processing part opposite to processing of the encoder is applied to an encoded or compressed block to reconstruct the current block used for representation. In addition, the encoder may repeat the processing operation performed by the decoder, so that both the encoder and the decoder generate a same prediction (for example, intra prediction and inter prediction) pixel and/or a same reconstructed pixel for processing, that is, coding a subsequent block.

In the following embodiment of a coding system 10, an encoder 20 and a decoder 30 are described with reference to FIG. 1A to FIG. 3.

FIG. 1A is an example block diagram of a coding system 10 according to an embodiment of this application. For example, the coding system 10 is a video coding system 10 (or referred to as a coding system 10 for short) that can utilize technologies in this application. A video encoder 20 (or referred to as the encoder 20 for short) and a video decoder 30 (or referred to as the decoder 30 for short) in the video coding system 10 represent devices and the like that may be configured to perform various technologies based on various examples described in this application.

As shown in FIG. 1A, the coding system 10 includes a source device 12. The source device 12 is configured to provide encoded picture data 21 such as an encoded picture to a destination device 14 configured to decode the encoded picture data 21.

The source device 12 includes the encoder 20, and may, in some embodiments, include a picture source 16, a preprocessor (or preprocessing unit) 18, for example, a picture preprocessor, and a communication interface (or communication unit) 22.

The picture source 16 may include or may be any type of a picture capture device for capturing a real-world picture and/or any type of a picture generation device, for example a computer graphics processing unit for generating a computer animation picture, or any type of device for obtaining and/or providing a real-world picture and a computer generated picture (for example, screen content, a virtual reality (VR) picture) and/or any combination thereof (for example, an augmented reality (AR) picture). The picture source may be any type of internal memory or memory storing any of the foregoing pictures.

To distinguish a picture (or picture data) 17 from processing performed by the preprocessor (or preprocessing unit) 18, the picture (or picture data) 17 may also be referred to as an original picture (or original picture data) 17.

The preprocessor 18 is configured to: receive the original picture data 17, and perform preprocessing on the original picture data 17 to obtain a preprocessed picture (or preprocessed picture data) 19. For example, preprocessing performed by the preprocessor 18 may include, for example, trimming, color format conversion (for example, conversion from RGB to YCbCr), color correction, or noise reduction. It can be understood that the preprocessing unit 18 may be an optional component.

The video encoder (or encoder) 20 is configured to: receive the preprocessed picture data 19 and provide the encoded picture data 21 (details are further described below based on FIG. 2 and the like).

The communication interface 22 in the source device 12 may be configured to: receive the encoded picture data 21, and send the encoded picture data 21 (or any other versions of this data) over a communication channel 13 to another device, for example, the destination device 14, or any other device, for storage or direct reconstruction.

The destination device 14 includes the decoder 30, and may, in some embodiments, include a communication interface (or communication unit) 28, a post-processor (or post-processing unit) 32, and a display device 34.

The communication interface 28 in the destination device 14 is configured to receive the encoded picture data 21 (or any other versions of this data) directly from the source device 12 or from any other source device, for example, a storage device. For example, the storage device is an encoded picture data storage device, and provides the encoded picture data 21 for the decoder 30.

The communication interface 22 and the communication interface 28 may be configured to send or receive the encoded picture data (or encoded data) 21 over a direct communication link, for example, a direct wired or wireless connection, between the source device 12 and the destination device 14; or over any type of network, for example, a wired or wireless network or any combination thereof, or any type of private or public network or any type of combination thereof.

For example, the communication interface 22 may be configured to: encapsulate the encoded picture data 21 in a packet or another appropriate format, and/or process the encoded pictured data using any type of transmission encoding or processing for transmission over a communication link or a communication network.

Corresponding to the communication interface 22, the communication interface 28 may be configured to: for example, receive the transmitted data, and process the transmitted data using any type of corresponding transmission decoding or processing and/or decapsulation to obtain the encoded picture data 21.

Both the communication interface 22 and the communication interface 28 may be configured as unidirectional communication interfaces as indicated by an arrow for the corresponding communication channel 13 pointing from the source device 12 to the destination device 14 in FIG. 1A, or bi-directional communication interfaces. The two communication interfaces may be configured to send and receive messages and the like, to establish a connection, confirm and exchange any other information related to the communication link and/or data transmission such as encoded pictured data transmission, and perform other operations.

The video decoder (or decoder) 30 is configured to: receive the encoded picture data 21 and provide decoded picture data (or decoded picture data) 31 (details are further described below based on FIG. 3 and the like).

The post-processor 32 is configured to post-process the decoded picture data 31 (also referred to as reconstructed picture data) such as a decoded picture, to obtain post-processed picture data 33 such as a post-processed picture. The post-processing performed by the post-processing unit 32 may include, for example, color format conversion (for example, conversion from YCbCr to RGB), color correction, trimming, resampling, or any other processing such as generating the decoded picture data 31 for display by the display device 34 and the like.

The display device 34 is configured to receive the post-processed picture data 33, to display the picture to a user, a viewer, or the like. The display device 34 may be or may include any type of display for representing a reconstructed picture, for example, an integrated or external display screen or display. For example, the display screen may include a liquid crystal display (LCD), an organic light-emitting diode (OLED) display, a plasma display, a projector, a micro-LED display, a liquid crystal on silicon (LCoS), a digital light processor (DLP), or any type of other display screen.

Although FIG. 1A shows the source device 12 and the destination device 14 as separate devices, in device embodiments, both the source device 12 and the destination device 14 may be included or functions of both the source device 12 and the destination device 14 may be included, that is, both the source device 12 or the corresponding functions and the destination device 14 or the corresponding functions may be included. In such embodiments, the source device 12 or the corresponding functions and the destination device 14 or the corresponding functions may be implemented by using same hardware and/or software or by using separate hardware and/or software or any combination thereof.

It is clear for a skilled person that, based on the description, existence and (accurate) division of different units or functions of the source device 12 and/or the destination device 14 shown in FIG. 1A may vary depending on an actual device and application.

Figure 1B:
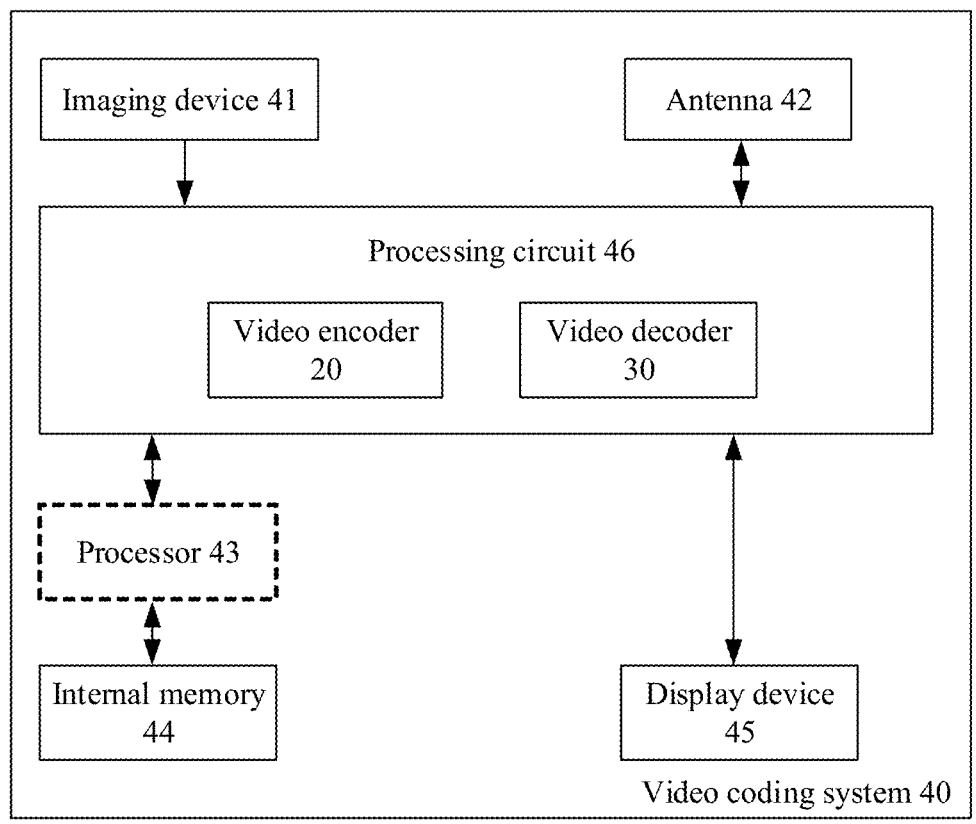
FIG. 1B is an example block diagram of a video coding system 40 according to an embodiment of this application.
Figure 5:
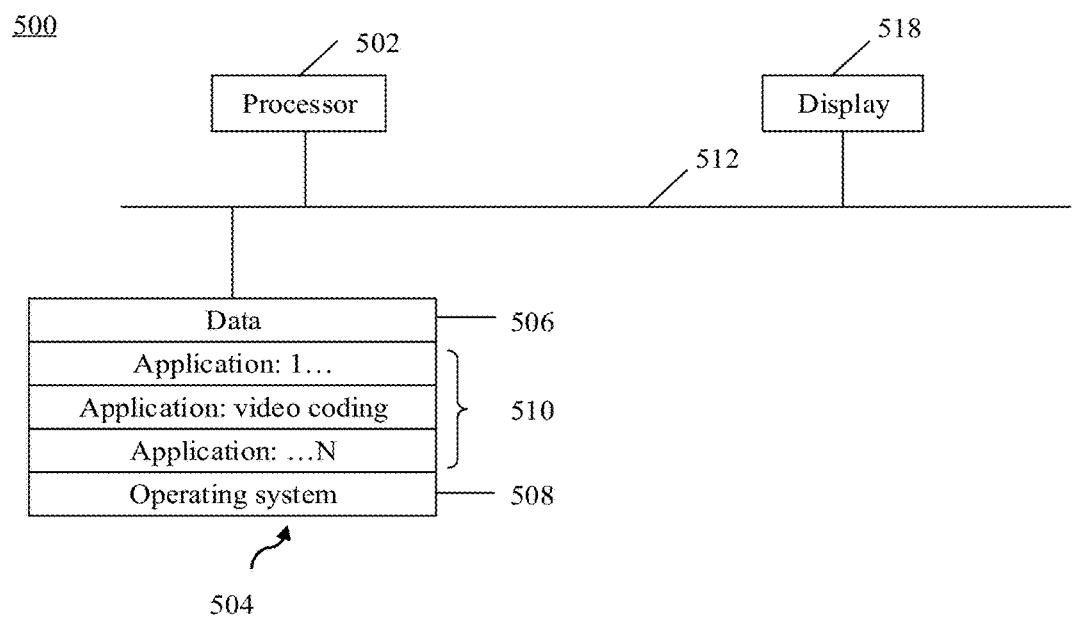
FIG. 5 is an example block diagram of an apparatus 500 according to an embodiment of this application.

The encoder 20 (for example, the video encoder 20), the decoder 30 (for example, the video decoder 30), or both the encoder 20 and the decoder 30 may be implemented by using a processing circuit shown in FIG. 1B, for example, one or more microprocessors, a digital signal processor (DSP), an application-specific integrated circuit (ASIC), a field-programmable gate array (FPGA), a discrete logic, hardware, a dedicated video coding processor, or any combinations thereof. The encoder 20 may be implemented by using the processing circuit 46, to embody the modules described with reference to the encoder 20 in FIG. 2 and/or any other encoder system or subsystem described in this specification. The decoder 30 may be implemented by using the processing circuit 46, to embody the modules described with reference to a decoder 30 in FIG. 3 and/or any other decoder system or subsystem described in this specification. The processing circuit 46 may be configured to perform various operations described below. As shown in FIG. 5, if some technologies are implemented in software, a device may store software instructions in a suitable computer-readable storage medium, and may execute the instructions in hardware by using one or more processors, to perform the technologies in the present disclosure. Either of the video encoder 20 and the video decoder 30 may be integrated as part of a codec (encoder/decoder) into a single device, as shown in FIG. 1B.

The source device 12 and the destination device 14 each may include any one of a wide range of devices, including any type of handheld device or stationary device, for example, a notebook computer, a laptop computer, a mobile phone, a smartphone, a tablet, a tablet computer, a camera, a desktop computer, a set top box, a television, a display device, a digital media player, a video gaming console, a video streaming device (for example, a content service server or a content delivery server), a broadcast receiving device, a broadcast transmitting device, or the like, and may not use or use any type of operating system. In some cases, the source device 12 and the destination device 14 may be equipped with components for wireless communication. Therefore, the source device 12 and the destination device 14 may be wireless communication devices.

In some cases, the video coding system 10 shown in FIG. 1A is merely an example and the technologies provided in this application are applicable to video coding settings (for example, video encoding or video decoding). These settings do not necessarily include any data communication between the encoding device and the decoding device. In other examples, data is retrieved from a local memory, is sent over a network, and the like. The video encoding device may encode the data and store the data to the memory, and/or the video decoding device may retrieve the data from the memory and decode the data. In some examples, encoding and decoding is performed by devices that do not communicate with each other but simply encode data to the memory and/or retrieve the data from memory and decode the data.

FIG. 1B is an example block diagram of a video coding system 40 according to an embodiment of this application. As shown in FIG. 1B, the video coding system 40 may include an imaging device 41, a video encoder 20, a video decoder 30 (and/or a video codec implemented by using the processing circuit 46), an antenna 42, one or more processors 43, one or more internal memories 44, and/or a display device 45.

As shown in FIG. 1B, the imaging device 41, the antenna 42, the processing circuit 46, the video encoder 20, the video decoder 30, the processor 43, the internal memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. In addition, in some examples, the display device 45 may be configured to present the video data. The processing circuit 46 may include an application-specific integrated circuit (ASIC) logic, a graphics processing unit, a general purpose processor, or the like. The video coding system 40 may also include the optional processor 43. The optional processor 43 may similarly include an application-specific integrated circuit (ASIC) logic, a graphics processing unit, a general purpose processor, or the like. Moreover, the internal memory 44 may be any type of memory, for example, a volatile memory (for example, a static random access memory (SRAM) or a dynamic random access memory (DRAM)), or a nonvolatile memory (for example, a flash memory). In a non-limitative example, the internal memory 44 may be implemented by a cache memory. In other examples, the processing circuit 46 may include a memory (for example, a cache) configured to implement a picture buffer and the like.

In some examples, the video encoder 20 implemented by using the logic circuit may be included in a picture buffer (which is implemented, for example, by using the processing circuit 46 or the internal memory 44) and a graphics processing unit (which is implemented, for example, by using the processing circuit 46). The graphics processing unit may be communicatively coupled to the picture buffer. The graphics processing unit may be included in the video encoder 20 implemented by using the processing circuit 46, to embody the modules described with reference to FIG. 2 and/or any other encoder system or subsystem described in this specification. The logic circuit may be configured to perform various operations described in this specification.

In some examples, the video decoder 30 may be implemented by using the processing circuit 46 in a similar manner, to embody the modules described with reference to the video decoder 30 in FIG. 3 and/or any other decoder system or subsystem described in this specification. In some examples, the video decoder 30 implemented by using the logic circuit may be included in a picture buffer (which is implemented by using the processing circuit 46 or the internal memory 44) and a graphics processing unit (which is implemented, for example, by using the processing circuit 46). The graphics processing unit may be communicatively coupled to the picture buffer. The graphics processing unit may be included in the video decoder 30 implemented by using the processing circuit 46, to embody the modules described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to encoding partitioning (for example, a transform coefficient or a quantized transform coefficient, an optional indicator (as described), and/or data defining the encoding partitioning). The video coding system 40 may further include the video decoder 30 that is coupled to the antenna 42 and that is configured to decode the encoded bitstream. The display device 45 is configured to present a video frame.

It should be understood that in this embodiment of this application, relative to the examples described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may perform entropy encoding on the syntax element to obtain an encoded video bitstream. In such examples, the video decoder 30 may parse such a syntax element and correspondingly decode related video data.

For ease of description, embodiments of the present disclosure are described with reference to versatile video coding (VVC) reference software or high efficiency video coding (HEVC) developed by the Joint Collaboration Team on Video Coding (JCT-VC) constituted by the ITU-T Video Coding Experts Group (VCEG) and the ISO/IEC Motion Picture Experts Group (MPEG). A person of ordinary skill in the art understands that embodiments of the present disclosure are not limited to HEVC or VVC.

Encoder and Encoding Method

Figure 2:
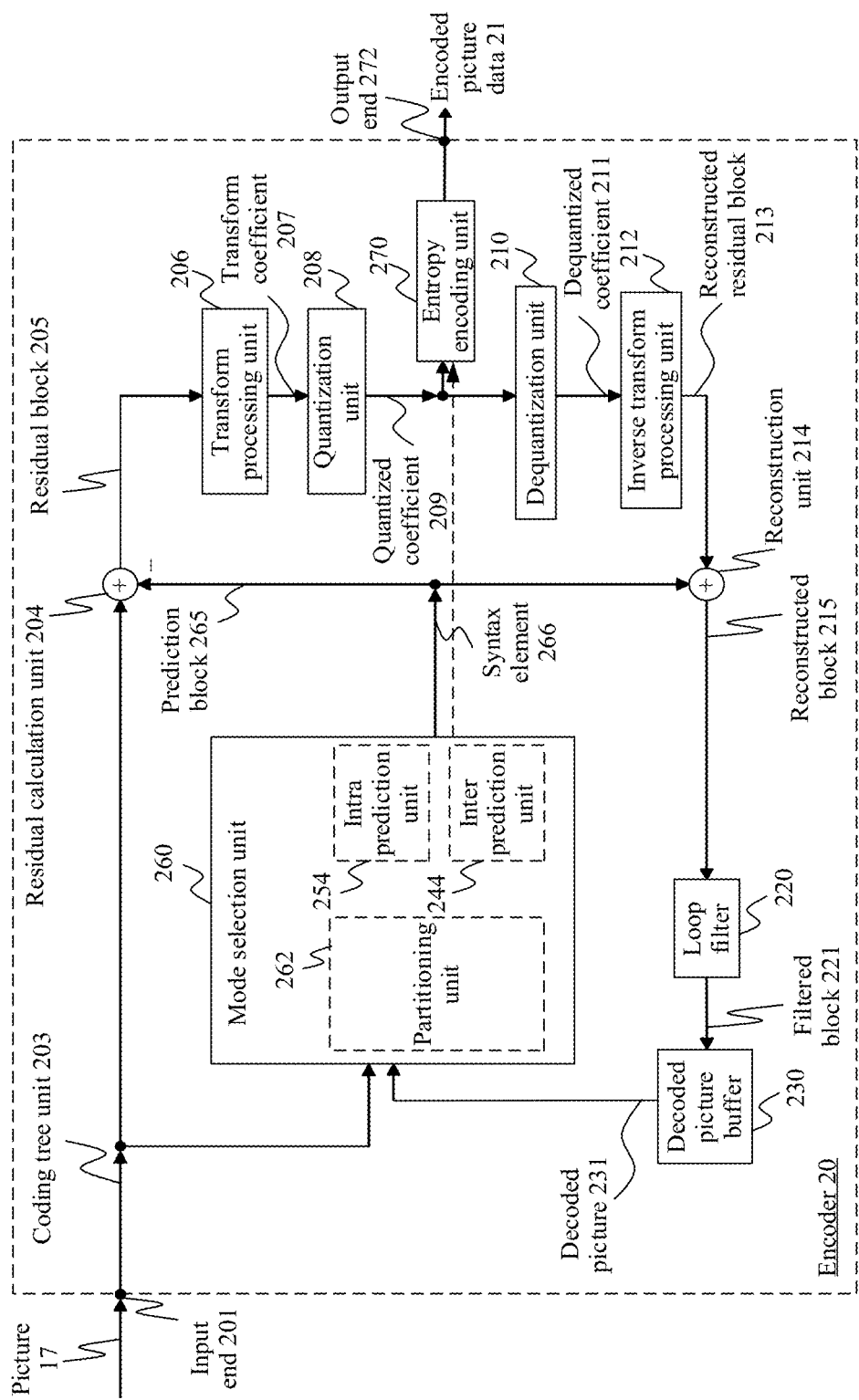
FIG. 2 is an example block diagram of a video encoder 20 according to an embodiment of this application.

FIG. 2 is an example block diagram of a video encoder 20 according to an embodiment of this application. As shown in FIG. 2, the video encoder 20 includes an input end (or input interface) 201, a residual calculation unit 204, a transform processing unit 206, a quantization unit 208, a dequantization unit 210, and inverse transform processing unit 212, a reconstruction unit 214, a loop filter 220, a decoded picture buffer (DPB) 230, a mode selection unit 260, an entropy encoding unit 270, and an output end (or output interface) 272. The mode selection unit 260 may include an inter prediction unit 244, an intra prediction unit 254, and a partitioning unit 262. The inter prediction unit 244 may include a motion estimation unit and a motion compensation unit (not shown). The video encoder 20 shown in FIG. 2 may also be referred to as a hybrid video encoder or a video encoder that is based on a hybrid video codec.

The residual calculation unit 204, the transform processing unit 206, the quantization unit 208, and the mode selection unit 260 form a forward signal path of the encoder 20, whereas the dequantization unit 210, the inverse transform processing unit 212, the reconstruction unit 214, a buffer 216, the loop filter 220, the decoded picture buffer (DPB) 230, the inter prediction unit 244, and the intra prediction unit 254 form a backward signal path of the encoder. The backward signal path of the encoder 20 is corresponding to a signal path of the decoder (refer to the decoder 30 in FIG. 3). The dequantization unit 210, the inverse transform processing unit 212, the reconstruction unit 214, the loop filter 220, the decoded picture buffer 230, the inter prediction unit 244, and the intra prediction unit 254 further form a "built-in decoder" of the video encoder 20.

Picture and Picture Partitioning (Picture and Block)

The encoder 20 may be configured to receive, through the input end 201 or the like, a picture (or picture data) 17, for example, a picture in a picture sequence that forms a video or a video sequence. The received picture or picture data may be alternatively a preprocessed picture (or preprocessed picture data) 19. For ease of simplicity, the picture 17 is used in the following descriptions. The picture 17 may also be referred to as a current picture or a to-be-encoded picture (especially when the current picture is distinguished from another picture in video encoding, the another picture is, for example, a previous encoded picture and/or decoded picture in a same video sequence, that is, a video sequence that also includes the current picture).

A (digital) picture is or may be considered as a two-dimensional array or matrix including pixels with intensity values. A pixel in the array may also be referred to as a pel (pixel) (a short form of a picture element). A quantity of pixels in horizontal and vertical directions (or axes) of the array or picture defines a size and/or a resolution of the picture. For representation of a color, three color components are usually used. In other words, the picture may be represented as or include three pixel arrays. In an RBG format or color space, a picture includes a corresponding red-green-blue pixel array. However, in video coding, each pixel is usually represented by a luminance/chrominance format or color space, for example, YCbCr, which includes a luminance component represented by Y (sometimes represented by L instead) and two chrominance components represented by Cb and Cr. The luminance (luma) component Y represents luminance or gray scale intensity (for example, the luminance and the gray scale intensity are the same in a gray-scale picture), and the two chrominance (chroma for short) components Cb and Cr represent chrominance or color information components. Correspondingly, a picture in a YCbCr format includes a luminance pixel array with a luminance pixel value (Y) and two chrominance pixel arrays with chrominance values (Cb and Cr). A picture in an RGB format may be converted or transformed into a YCbCr format and vice versa. This process is also referred to as color conversion or transformation. If a picture is monochrome, the picture may include only a luminance pixel array. Correspondingly, a picture may be, for example, a luminance pixel array in a monochrome format or a luminance pixel array and two corresponding chrominance pixel arrays in 4:2:0, 4:2:2, and 4:4:4 color formats.

In an embodiment, the embodiment of the video encoder 20 may include a picture partitioning unit (not shown in FIG. 2) configured to partition the picture 17 into a plurality of picture blocks 203 (usually non-overlapped). These blocks may also be referred to as root blocks, macroblocks (H.264/AVC), coding tree blocks (CTBs), or coding tree units (CTUs) in the H.265/HEVC and VVC standards. The partitioning unit may be configured to: use same block sizes and corresponding grids defining the block sizes for all pictures in the video sequence, or change a block size between pictures, a picture subset, or a picture group, and partition each picture into corresponding blocks.

In other embodiments, the video encoder may be configured to receive a block 203 of the picture 17 directly, for example, one, several, or all blocks forming the picture 17. The picture block 203 may also be referred to as a current picture block or a to-be-encoded picture block.

Like the picture 17, the picture block 203 is or may be considered as a two-dimensional array or matrix including pixels with intensity values (pixel values), but the picture block 203 is smaller than the picture 17 in size. In other words, the block 203 may include, for example, one pixel array (for example, a luminance array in case of a monochrome picture 17, or a luminance array or a chrominance array in case of a color picture), three pixel arrays (for example, one luminance array and two chrominance arrays in case of a color picture 17), or arrays of any other quantity and/or type based on a color format used. A quantity of pixels in horizontal and vertical directions (or axes) of the block 203 defines a size of the block 203. Correspondingly, the block may be an M×N (M columns×N rows) pixel array, an M×N transform coefficient array, or the like.

In an embodiment, the video encoder 20 shown in FIG. 2 is configured to encode the picture 17 block by block, for example, perform encoding and prediction on each block 203.

In an embodiment, the video encoder 20 shown in FIG. 2 may be alternatively configured to partition and/or encode the picture by using a slice (also referred to as a video slice). The picture may be partitioned or encoded by using one or more slices (usually non-overlapped). Each slice may include one or more blocks (for example, one or more coding tree units CTUs) or one or more block groups (for example, one or more tiles (tiles) in the H.265/HEVC/VVC standard and one or more bricks in the VVC standard).

In an embodiment, the video encoder 20 shown in FIG. 2 may be alternatively configured to partition and/or encode the picture by using a slice/tile group (also referred to as a video tile group) and/or a tile (also referred to as a video tile). The picture may be partitioned or encoded by using one or more slices/tile groups (usually non-overlapped). Each slice/tile group may include one or more blocks (for example, one or more CTUs), one or more tiles, or the like. Each tile may be in a rectangular shape or the like, and may include one or more complete or partial blocks (for example, one or more CTUs).

Residual Calculation

The residual calculation unit 204 is configured to perform calculation on a residual block 205 in the following manner based on the picture block 203 and a prediction block 265 (details about the prediction block 265 are described subsequently). For example, by subtracting pixel values of the prediction block 265 from pixel values of the picture block 203 pixel by pixel (pel by pel), to obtain the residual block 205 in pixel domain.

Transformation

The transform processing unit 206 is configured to perform discrete cosine transform (DCT), discrete sine transform (DST), or the like on a pixel value of the residual block 205 to obtain a transform coefficient 207 in transform domain. The transform coefficient 207 may also be referred to as a transform residual coefficient and indicates the residual block 205 in transform domain.

The transform processing unit 206 may be configured to apply an integer approximation of the DCT/DST, such as transform specified in HEVC/H.265. Compared with orthogonal DCT transform, such an integer approximation is usually scaled proportionally by a factor. To preserve a norm of a residual block on which transform and inverse transform processing have been performed, another proportional scale factor is used in a transformation process. The proportional scale factor is usually selected based on some constraints. For example, the proportional scale factor is a power of 2 for a shift operation, a bit depth of the transform coefficient, or a balance between accuracy and implementation costs. For example, a proportional scale factor is specified for inverse transform by the inverse transform processing unit 212 on the encoder side 20 (and a proportional scale factor is specified for corresponding inverse transform, for example, by an inverse transform processing unit 312 on the decoder side 30), and a corresponding proportional scale factor is specified for transform by the transform processing unit 206 on the encoder side 20.

In an embodiment, the video encoder 20 (specifically, the transform processing unit 206) may be configured to output a transform parameter, for example, one or more transform types. For example, the video encoder 20 directly outputs the transform parameter, or encodes or compresses the transform parameter by using the entropy encoding unit 270 and then outputs a processed transform parameter, so that the video decoder 30 can receive and use, for example, the transform parameter for decoding.

Quantization

The quantization unit 208 is configured to perform quantization such as scalar quantization or vector quantization on the transform coefficient 207 to obtain a quantized transform coefficient 209. The quantized transform coefficient 209 may also be referred to as a quantized residual coefficient 209.

The quantization process can reduce a bit depth related to a part or all of the transform coefficient 207. For example, an n-bit transform coefficient may be rounded down to an m-bit transform coefficient during quantization, where n is greater than m. A quantization degree may be modified by adjusting a quantization parameter (QP). For example, for scalar quantization, different proportions may be applied to achieve finer or coarser quantization. A smaller quantization step is corresponding to finer quantization, and a larger quantization step is corresponding to coarser quantization. An appropriate quantization step may be indicated by a quantization parameter (QP). For example, the quantization parameter may be an index to a predefined set of the appropriate quantization step. For example, a smaller quantization parameter may be corresponding to finer quantization (a smaller quantization step) and a larger quantization parameter may be corresponding to coarser quantization (a larger quantization step), and vice versa. The quantization may include division by a quantization step, and corresponding dequantization performed by the dequantization unit 210 and the like may include multiplication by the quantization step. In an embodiment according to some standards such as HEVC, the quantization step may be determined by using the quantization parameter. Generally, the quantization step may be calculated based on the quantization parameter by using a fixed point approximation of an equation including division. Another proportional scale factor may be used for quantization and dequantization to restore the norm that is of the residual block and that may be modified because of a proportion used in the fixed point approximation of the equation used for the quantization step and the quantization parameter. In an example embodiment, proportions of the inverse transform and dequantization may be combined. Alternatively, a customized quantization table may be used and indicated by the encoder to the decoder in a bitstream or the like. Quantization is a lossy operation, where a larger quantization step indicates a larger loss.

In an embodiment, the video encoder 20 (specifically, the quantization unit 208) may be configured to output a quantization parameter (QP). For example, the video encoder 20 directly outputs the quantization parameter, or encodes or compresses the quantization parameter by using the entropy encoding unit 270 and then outputs a processed quantization parameter, so that the video decoder 30 can receive and use, for example, the quantization parameter for decoding.

Dequantization

The dequantization unit 210 is configured to perform dequantization on a quantized coefficient to obtain a dequantized coefficient 211, where the dequantization is a reverse process of the quantization performed by the quantization unit 208. For example, the dequantization unit 210 performs, based on or by using the same quantization step as the quantization unit 208, a dequantization scheme corresponding to the quantization scheme performed by the quantization unit 208. The dequantized coefficient 211 may also be referred to as a dequantized residual coefficient 211 and is corresponding to the transform coefficient 207. However, the dequantized coefficient 211 is usually not completely identical to the transform coefficient because of a quantization loss.

Inverse Transformation

The inverse transform processing unit 212 is configured to perform inverse transformation, where the inverse transformation is a reverse process of the transformation performed by the transform processing unit 206. For example, the inverse transform processing unit 212 performs inverse discrete cosine transform (DCT) or inverse discrete sine transform (DST), to obtain a reconstructed residual block 213 (or a corresponding dequantized coefficient 213) in pixel domain. The reconstructed residual block 213 may also be referred to as a transform block 213.

Reconstruction

The reconstruction unit 214 (for example, a summator 214) is configured to add the transform block 213 (that is, the reconstructed residual block 213) to the prediction block 265, for example, add pixel values of the reconstructed residual block 213 and the pixel values of the prediction block 265, to obtain a reconstructed block 215 in pixel domain.

Filtering

A loop filter unit 220 (or referred to as the "loop filter" 220 for short) is configured to filter the reconstructed block 215 to obtain a filtered block 221, or is usually configured to filter a reconstructed pixel to obtain a filtered pixel value. For example, the loop filter unit is configured to smoothly perform pixel conversion, or improve video quality. The loop filter unit 220 may include one or more loop filters such as a de-blocking filter, a sample-adaptive offset (SAO) filter, or one or more other filters, for example, an adaptive loop filter (ALF), a noise suppression filter (NSF), or any combination thereof. For example, the loop filter unit 220 may include the de-blocking filter, the SAO filter, and the ALF filter. The filtering process may be performed by the de-blocking filter, the SAO filter, and the ALF filter sequentially. For another example, a luma mapping with chroma scaling (LMCS) process (that is, an adaptive in-loop reshaper) is added. This process is performed before de-blocking. For another example, the de-blocking filtering process may also be applied to internal subblock edges, for example, an affine subblock edge, an ATMVP subblock edge, a subblock transform (SBT) edge, and an intra sub-partition (ISP) edge. Although the loop filter unit 220 is shown as the in loop filter in FIG. 2, the loop filter unit 220 may be implemented as a post-loop filter in other configurations. The filtered block 221 may also be referred to as a filtered reconstructed block 221.

In an embodiment, the video encoder 20 (specifically, the loop filter unit 220) may be configured to output a loop filter parameter (for example, a SAO filter parameter, an ALF filter parameter, or an LMCS parameter). For example, the video encoder 20 directly outputs the loop filter parameter, or performs entropy encoding on the loop filter parameter by using the entropy encoding unit 270 and then outputs a processed loop filter parameter, so that the decoder 30 can receive and use, for example, identical or different loop filter parameters for decoding.

Decoded Picture Buffer

The decoded picture buffer (DPB) 230 may be a reference-picture memory that stores reference picture data used by the video encoder 20 during encoding of video data. The DPB 230 may be formed by any type of a variety of memory devices, such as a dynamic random access memory (DRAM) including a synchronous DRAM (SDRAM), a magnetoresistive RAM (MRAM), a resistive RAM (RRAM), or another type of storage device. The decoded picture buffer 230 may be configured to store one or more filtered blocks 221. The decoded picture buffer 230 may be further configured to: store other previous filtered blocks of a same current picture, or other previous filtered blocks of different pictures such as previous reconstructed blocks, for example, the previous reconstructed and filtered block 221, and may provide a previous complete reconstructed picture, namely, a decoded picture, (and a corresponding reference block and pixels), and/or part of a reconstructed current picture (and a corresponding reference block and pixels). For example, these pictures are used for inter prediction. The decoded picture buffer 230 may be further configured to store one or more unfiltered reconstructed blocks 215, or usually store an unfiltered reconstructed pixel, for example, the reconstructed block 215 that has not been filtered by the loop filter unit 220, or a reconstructed block or a reconstructed pixel on which no other processing has been performed.

Mode Selection (Partitioning and Prediction)

The mode selection unit 260 includes the partitioning unit 262, the inter prediction unit 244, and the intra prediction unit 254, and is configured to receive or obtain, from the decoded picture buffer 230 or another buffer (for example, a column buffer, which is not shown in the figure), an original picture data such as an original block 203 (the current block 203 of the current picture 17) and reconstructed block data, for example, a filtered and/or unfiltered reconstructed pixel or reconstructed block of a same (current) picture and/or one or more previous decoded pictures. The reconstructed block data is used as the reference picture data used for prediction, for example, inter prediction or intra prediction, to obtain the prediction block 265 or a predictor 265.

The mode selection unit 260 may be configured to: determine or select a partitioning manner for a prediction mode (for example, an intra or inter prediction mode) of the current block (no partitioning is performed), and generate the corresponding prediction block 265, to perform calculation on the residual block 205 and reconstruct the reconstructed block 215.

In an embodiment, the mode selection unit 260 may be configured to select a partitioning and prediction mode (for example, from prediction modes supported by or available for the mode selection unit 260). The prediction mode provides a best match or a minimum residual (the minimum residual means better compression for transmission or storage), provides minimum signaling overheads (the minimum signaling overhead means better compression for transmission or storage), or considers or balances the two aspects. The mode selection unit 260 may be configured to determine the partitioning and prediction mode based on rate-distortion optimization (RDO), that is, select a prediction mode that provides optimization for minimum rate-distortion. Terms such as "best", "lowest", and "optimal" in this specification do not necessarily refer to "best", "lowest", and "optimal" in general, but may also refer to a case in which a termination or selection criterion is satisfied. For example, a value above or below a threshold or other limitations may result in a "suboptimal selection", but complexity and a processing time are reduced.

In other words, the partitioning unit 262 may be configured to: partition a picture in the video sequence into a sequence of coding tree units (CTUs), where the CTU 203 may be further partitioned into smaller block parts or subblocks (which form a block again), for example, iteratively use quadtree partitioning (QT), binary tree partitioning (BT), triple tree partitioning (TT), or any combination thereof; and perform, for example, prediction for each of the block parts or subblocks. Mode selection includes selection of a tree structure of the partitioned block 203 and selection of a prediction mode applied to each of the block parts or subblocks.

The following details partitioning (for example, performed by the partitioning unit 262) and prediction processing (for example, performed by the inter prediction unit 244 and the intra prediction unit 254) that are performed by the video encoder 20.

Partitioning

The partitioning unit 262 may partition (or split) the coding tree unit 203 into smaller parts, for example, smaller blocks in square or rectangular shapes. For a picture that has three pixel arrays, one CTU includes an N×N luminance pixel blocks and two corresponding chrominance pixel blocks.

In the H.265/HEVC video coding standard, one frame of picture is partitioned into non-overlapping CTUs. A size of the CTU may be set to 64×64 (or a size of the CTU may be set to another value, for example, the size of the CTU in JVET reference software JEM is increased to 128×128 or 256×256). A 64×64 CTU includes a rectangular pixel array with 64 columns and 64 pixels per column, and each pixel includes a luminance component or/and a chrominance component.

Figure 6A:
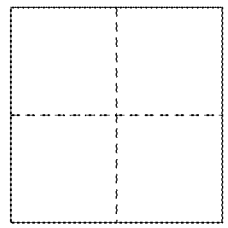
FIG. 6*a* to FIG. 6*g* are several example schematic diagrams of partitioning manners according to an embodiment of this application.

A QT-based CTU partitioning method is used in H.265. The CTU is used as a root node of a QT, and the CTU is recursively partitioned into several leaf nodes in the QT partitioning manner, for example, as shown in FIG. 6a. One node is corresponding to one picture region. If a node is not partitioned, the node is referred to as a leaf node, and a picture region corresponding to the node is a CU. If a node is further partitioned, a picture region corresponding to the node may be partitioned into four regions of a same size (a length and a width of each of the four regions are respectively half a length and a width of the original region), and each region is corresponding to one node. Whether these nodes are further partitioned may be separately determined. Whether to partition a node is indicated by a split flag field split_cu_flag that is in a bitstream and that is corresponding to the node. A node A is partitioned once into four nodes Bi, where i ranges from 0 to 3. Bi is referred to as a subnode of A, and A is referred to as a parent node of Bi. A QT depth (qtDepth) of the root node is 0, and a QT depth of a node is a QT depth of the parent node of the node plus 1. For brevity of description, a size and a shape of a node in the following are a size and a shape of a picture region corresponding to the node.

For example, based on split_cu_flag corresponding to one 64×64 CTU (a QT depth of the CTU is 0), if it is determined that the CTU is not to be partitioned, the CTU is one 64×64 CU; or if it is determined that the CTU is to be partitioned, the CTU is partitioned into four 32×32 nodes (a QT depth of each node is 1). Whether each of the four 32×32 nodes is to be further partitioned or not may be determined based on split_cu_flag corresponding to the node. If one 32×32 node is further partitioned, four 16×16 nodes are generated (a QT depth of each node is 2). The foregoing process continues until no nodes are partitioned any more. In this way, one CTU is partitioned into one group of CUs. A minimum CU size is identified in a sequence parameter set (SPS). For example, 8×8 is the minimum CU size. In the foregoing recursive partitioning process, if a size of a node is equal to the minimum CU size, it is considered by default that the node is not further partitioned, and a split flag field of the node does not need to be included in a bitstream.

After it is learned, through parsing, that a node is a leaf node and the leaf node is a CU, coding information (including information such as a prediction mode and a transform coefficient of the CU, for example, a coding_unit( ) syntax structure in H.265) corresponding to the CU is further parsed. Then, decoding processing, such as prediction, dequantization, inverse transformation, and loop filtering, is performed on the CU based on these pieces of coding information, to generate a reconstructed block corresponding to the CU. The QT partitioning enables a CTU to be partitioned into a group of CUs of appropriate sizes based on local features of a picture. For example, a smooth region is partitioned into CUs of larger sizes, and a texture-rich region is partitioned into CUs of smaller sizes.

Based on the QT partitioning, a BT partitioning manner and a TT partitioning manner are added in the H.266/VVC standard.

Figure 6B:
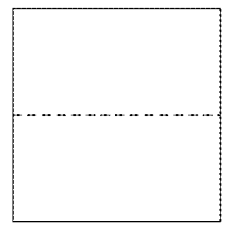

In the BT partitioning manner, one node is partitioned into two subnodes. There are two example BT partitioning manners:

(1) "Horizontal binary partitioning": A region corresponding to a node is partitioned into two regions of a same size: an upper region and a lower region. To be specific, for each of the two regions, a width remains unchanged, a height is half a height of the region that is before partitioning, and each region obtained through partitioning is corresponding to one subnode. This case is shown, for example, in FIG. 6b.

Figure 6C:
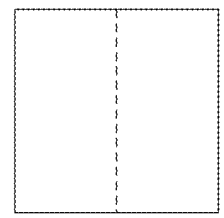

(2) "Vertical binary partitioning": A region corresponding to a node is partitioned into two regions of a same size: a left region and a right region. To be specific, for each of the two regions, a height remains unchanged, a width is half a width of the region that is before partitioning, and each region obtained through partitioning is corresponding to one subnode. This case is shown, for example, in FIG. 6c.

Figure 6D:
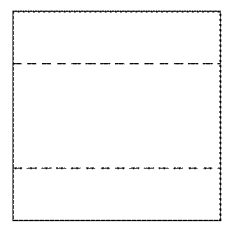

In the TT partitioning manner, one node is partitioned into three subnodes. There are two example TT partitioning manners:

(1) "Horizontal ternary partitioning": A region corresponding to a node is partitioned into three regions: an upper region, a middle region, and a lower region. For the three regions: the upper region, the middle region, and the lower region, heights are respectively ¼, ½, and ¼ of a height of the region that is before partitioning, and each region obtained through partitioning is corresponding to one subnode. This case is shown, for example, in FIG. 6d.

Figure 6E:
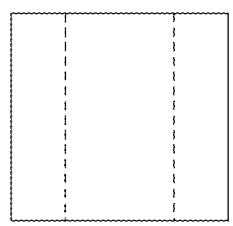

(2) "Vertical ternary partitioning": A region corresponding to a node is partitioned into three regions: a left region, a middle region, and a right region. For the three regions: the left region, the middle region, and the right region, widths are respectively ¼, ½, and ¼ of a width of the region that is before partitioning, and each region obtained through partitioning is corresponding to one subnode. This case is shown, for example, in FIG. 6e.

H.266 uses a manner in which QT partitioning is combined with BT/TT partitioning, which is referred to as a QT-MTT partitioning manner for short. To be specific, a CTU generates four QT nodes through QT partitioning, and the QT node may be further partitioned into four QT nodes in the QT partitioning manner, until a QT node is no longer partitioned in the QT partitioning manner and is used as a QT leaf node; or the QT nodes are not partitioned in the QT partitioning manner and are directly used as QT leaf nodes. The QT leaf node is used as a root node of an MTT. A node in the MTT may be partitioned into a subnode by using one of the four partitioning manners: horizontal binary partitioning, vertical binary partitioning, horizontal ternary partitioning, and vertical ternary partitioning; or a node in the MTT is used as an MTT leaf node without being further partitioned. The MTT leaf node is a CU.

Figure 7:
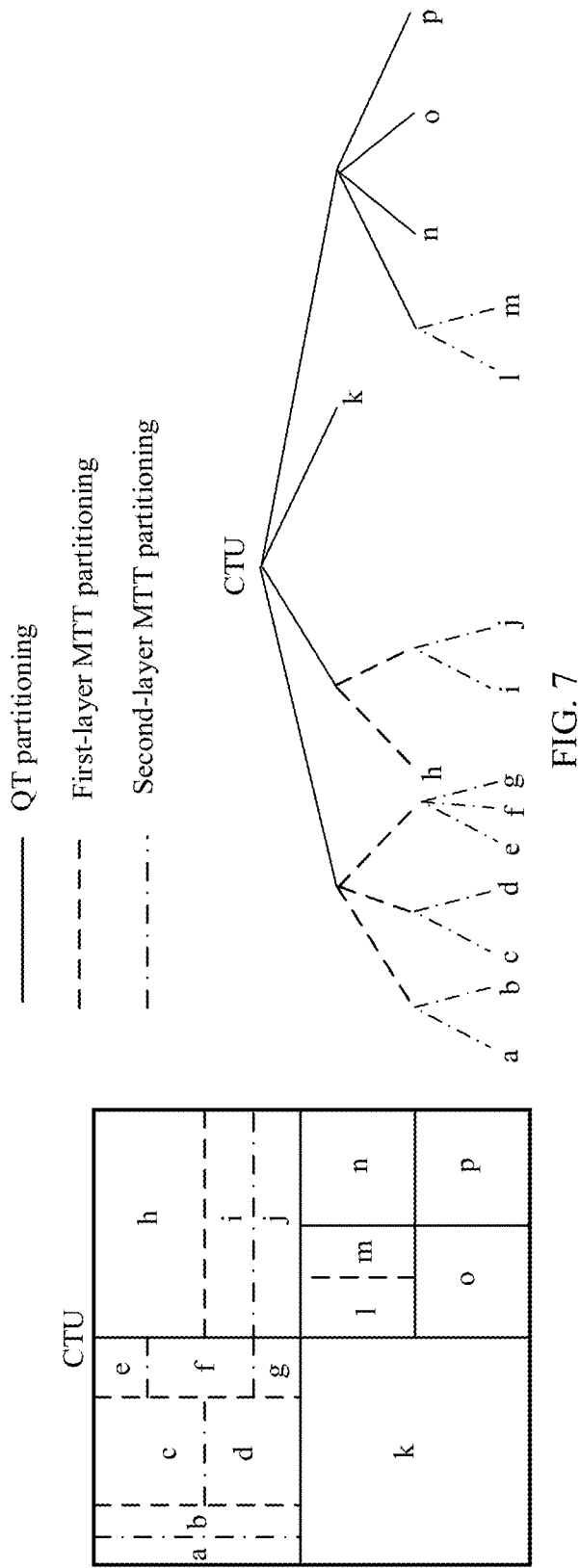
FIG. 7 is an example schematic diagram of a QT-MTT partitioning manner according to this application.

For example, FIG. 7 is an example schematic diagram of a QT-MTT partitioning manner according to this application. As shown in FIG. 7, a CTU is partitioned into a total of 16 CUs, namely, a to p, by using a QT-MTT. Each endpoint in a tree diagram represents one node, one node is connected to four lines to represent QT partitioning, one node is connected to two lines to represent BT partitioning, and one node is connected to three lines to represent TT partitioning. A solid line represents QT partitioning, a dashed line represents first-layer MTT partitioning, and a dash-dot line represents second-layer MTT partitioning. a to p are 16 MTT leaf nodes, and each MTT leaf node is corresponding to one CU. A partitioning diagram of the CTU in FIG. 7 may be obtained based on the tree diagram.

In the QT-MTT partitioning manner, each CU has a QT depth (or a QT depth) (quad-tree depth) and an MTT layer (an MTT depth) (multi-type tree depth). The QT depth indicates a QT depth of a QT leaf node to which the CU belongs, and the MTT layer indicates an MTT layer of an MTT leaf node to which the CU belongs. For example, in FIG. 7, QT depths of a, b, c, d, e, f, g, i, and j are 1, and MTT layers of a, b, c, d, e, f, g, i, and j are 2; a QT depth of h is 1, and an MTT layer of h is 1; QT depths of n, o, and p are 2, and MTT layers of n, o, and p are 0; and QT depths of l and m are 2, and MTT layers of l and m are 1. If the CTU is partitioned into only one CU, a QT depth of the CU is 0, and an MTT layer is 0.

The AVS3 standard uses another QT-MTT partitioning method, that is, a manner in which QT partitioning is combined with BT/EQT partitioning. In other words, the AVS3 standard replaces the TT partitioning in H.266 with extended quadtree (EQT) partitioning. To be specific, a CTU generates four QT nodes through QT partitioning, and the QT node may be further partitioned into four QT nodes in the QT partitioning manner, until a QT node is no longer partitioned in the QT partitioning manner and is used as a QT leaf node; or the QT nodes are not partitioned in the QT partitioning manner and are directly used as QT leaf nodes. The QT leaf node is used as a root node of an MTT. A node in the MTT may be partitioned into a subnode by using one of the four partitioning manners: horizontal binary partitioning, vertical binary partitioning, horizontal quaternary partitioning, and vertical quaternary partitioning; or a node in the MTT is used as an MTT leaf node without being further partitioned. The MTT leaf node is a CU.

Figure 6F:
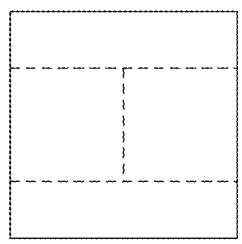

In the EQT partitioning manner, one node is partitioned into four subnodes. There are two example EQT partitioning manners:

(1) "Horizontal quaternary partitioning": A region corresponding to a node is partitioned into four regions: an upper region, a middle left region, a middle right region, and a lower region. For the four regions: the upper region, the middle left region, the middle right region, and the lower region, heights are respectively ¼, ½, ½, and ¼ of a height of the region that is before partitioning, widths of the middle left region and the middle right region each are ½ of a width of the region that is before partitioning, and each region obtained through partitioning is corresponding to one subnode. This case is shown, for example, in FIG. 6f.

Figure 6G:
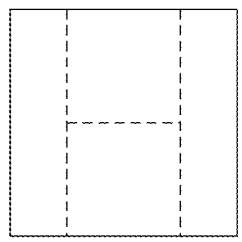

(2) "Vertical quaternary partitioning": A region corresponding to a node is partitioned into four regions: a left region, a middle upper region, a middle lower region, and a right region. For the four regions: the left region, the middle upper region, the middle lower region, and the right region, widths are respectively ¼, ½, ½, and ¼ of a width of the region that is before partitioning, heights of the middle upper region and the middle lower region each are ½ of a height of the region that is before partitioning, and each region obtained through partitioning is corresponding to one subnode. This case is shown, for example, in FIG. 6g.

In the H.265/HEVC standard, for a picture in a YUV 4:2:0 format, one CTU includes one luminance block and two chrominance blocks. The luminance block and the chrominance blocks may be partitioned in a same manner, and are referred to as a luminance-chrominance joint coding tree. In VVC, if a current frame is an I frame, when a CTU is a node of a preset size (for example, 64×64) in an intra frame (the I frame), a luminance block included in the node is partitioned, by using a luminance coding tree, into a group of coding units including only luminance blocks, and a chrominance block included in the node is partitioned, by using a chrominance coding tree, into a group of coding units including only chrominance blocks. Partitioning of the luminance coding tree and partitioning of the chrominance coding tree are independent of each other. The coding trees independently used for the luminance block and the chrominance block are referred to as separate trees. In H.265, a CU includes a luminance pixel and a chrominance pixel. In standards such as H.266 and AVS3, in addition to a CU that includes both a luminance pixel and a chrominance pixel, a luminance CU that includes only a luminance pixel and a chrominance CU that includes only a chrominance pixel also exist.

As described above, the video encoder 20 is configured to determine or select a best or optimal prediction mode from a (e.g., predetermined) prediction mode set. The prediction mode set may include, for example, an intra prediction mode and/or an inter prediction mode.

Intra Prediction

An intra prediction mode set may include 35 different intra prediction modes, for example, non-directional modes like a DC (or mean) mode and a planar mode, or directional modes defined in HEVC; or may include 67 different intra prediction modes, for example, non-directional modes like a DC (or mean) mode and a planar mode, or directional modes defined in VVC. For example, several conventional angular intra prediction modes are adaptively replaced with wide-angle intra prediction modes that are used for non-square blocks and that are defined in VVC. For another example, to avoid a division operation for DC prediction, only longer sides are used to calculate a mean for non-square blocks. In addition, a planar-mode intra prediction result may be further modified by using a position dependent intra prediction combination (PDPC) method.

The intra prediction unit 254 is configured to generate an intra prediction block 265 by using reconstructed pixels of neighboring blocks of a same current picture based on intra prediction modes in the intra prediction mode set.

The intra prediction unit 254 (or usually the mode selection unit 260) is further configured to output an intra prediction parameter (or usually information indicative of a selected intra prediction mode for a block) to the entropy encoding unit 270 in a form of a syntax element 266, so that the intra prediction parameter is included in encoded picture data 21. In this way, the video decoder 30 can perform operations, for example, receive and use the prediction parameter for decoding.

Inter Prediction

In a possible embodiment, an inter prediction mode set depends on an available reference picture (for example, at least some of the previous decoded pictures stored in the DBP 230) and other inter prediction parameters. For example, the inter prediction mode set depends on whether the entire reference picture or only part of the reference picture, for example, a search window region near a region of the current block, is used for searching for a best matched reference block, and/or depends on whether pixel interpolation, such as half-pel interpolation, quarter-pel interpolation, and/or 1/16 pel interpolation, is performed.

In addition to the foregoing prediction modes, a skip mode and/or a direct mode may be used.

For example, merge prediction is extended. A merge candidate list of such a mode is constituted by the following five types of candidates in sequence: spatial MVP from spatial neighboring CUs, temporal MVP from collocated CUs, history-based MVP from an FIFO table, pairwise average MVP, and zero MVs. A bilateral-matching based decoder-side motion vector refinement (DMVR) may be applied to increase accuracy of MVs of the merge mode. The merge mode with an MVD (MMVD) comes from a merge mode with a motion vector difference. An MMVD flag is sent immediately after a skip flag and a merge flag are sent, to specify whether the MMVD mode is used for a CU. A CU-level adaptive motion vector resolution (AMVR) scheme may be applied. The AMVR allows MVDs of the CU to be encoded with different precision. The MVD is adaptively selected for the current CU based on a prediction mode for the current CU. When the CU is encoded in a merge mode, a combined inter/intra prediction (CIIP) mode may be applied to the current CU. Weighted averaging is performed on inter and intra prediction signals to obtain CIIP prediction. For affine motion compensated prediction, an affine motion field of a block is described by using motion information of motion vectors of two control points (four-parameter) or motion vectors of three control points (six-parameter). Subblock-based temporal motion vector prediction (SbTMVP) is similar to temporal motion vector prediction (TMVP) in HEVC, but is used to predict motion vectors of sub-CUs in the current CU. Bi-directional optical flow (BDOF), which is previously referred to as BIO, is a simplified version that reduces calculation, especially in terms of a quantity of multiplications and a value of a multiplier. In a triangle partition mode, the CU is partitioned evenly into two triangle-shaped parts by using two partitioning manners: diagonal partitioning and anti-diagonal partitioning. In addition, simple averaging in a bidirectional prediction mode is extended, to support weighted averaging performed on the two prediction signals.

The inter prediction unit 244 may include a motion estimation (ME) unit and a motion compensation (MC) unit (both not shown in FIG. 2). The motion estimation unit may be configured to receive or obtain the picture block 203 (the current picture block 203 of the current picture 17) and a decoded picture 231, or at least one or more previous reconstructed blocks, for example, one or more reconstructed blocks of other/different previous decoded pictures 231, to perform motion estimation. For example, the video sequence may include the current picture and the previous decoded picture 231. In other words, the current picture and the previous decoded picture 231 may be part of a picture sequence forming the video sequence or may form the picture sequence.

For example, the encoder 20 may be configured to: select a reference block from a plurality of reference blocks of a same picture or different pictures in a plurality of other pictures, and provide the motion estimation unit with a reference picture (or a reference picture index) and/or an offset (e.g., a spatial offset) between a location (e.g., coordinates x and y) of the reference block and a location of the current block as an inter prediction parameter/inter prediction parameters. This offset is also referred to as a motion vector (MV).

The motion compensation unit is configured to: obtain, for example, receive, the inter prediction parameter, and perform inter prediction based on or by using the inter prediction parameter, to obtain an inter prediction block 246. Motion compensation performed by the motion compensation unit may include extraction or generation of the prediction block based on the motion/block vector determined through motion estimation, and may further include interpolation on subpixel precision. Interpolation filtering may be used to generate a pixel location of another pixel from pixel locations of known pixels, thereby potentially increasing a quantity of candidate prediction blocks that may be used to encode picture blocks. Upon receiving a motion vector corresponding to a PU of the current picture block, the motion compensation unit may locate, in one of reference picture lists, a prediction block to which the motion vector points.

The motion compensation unit may further generate a syntax element that is related to a block and a video slice, so that the video decoder 30 uses the syntax element to decode a picture block of the video slice. Alternatively, the motion compensation unit may generate or use the tile group and/or the tile and the corresponding syntax element as a replacement for the slice and the corresponding syntax element.

Entropy Encoding

The entropy encoding unit 270 is configured to apply an entropy encoding algorithm or scheme (for example, a variable-length coding (VLC) scheme, a context-adaptive VLC (CALVC) scheme, an arithmetic coding scheme, a binarization algorithm, context-adaptive binary arithmetic coding (CABAC), syntax-based context-adaptive binary arithmetic coding (SBAC), probability interval partitioning entropy (PIPE) coding, or another entropy encoding methodology or technique) to the quantized residual coefficient 209, the inter prediction parameter, the intra prediction parameter, the loop filter parameter, and/or other syntax elements, to obtain the encoded picture data 21 that can be output through the output end 272 in a form of an encoded bitstream 21 or the like, so that the video decoder 30 can receive and use the parameters for decoding. The encoded bitstream 21 may be transmitted to the video decoder 30, or stored in a memory for subsequent transmission or retrieval by the video decoder 30.

Other structural variations of the video encoder 20 may be used to encode a video stream. For example, the non-transform based encoder 20 may perform quantization on a residual signal directly when there is no transform processing unit 206 used for some blocks or frames. In another embodiment, the encoder 20 may have the quantization unit 208 and the dequantization unit 210 that are combined into a single unit.

Decoder and Decoding Method

Figure 3:
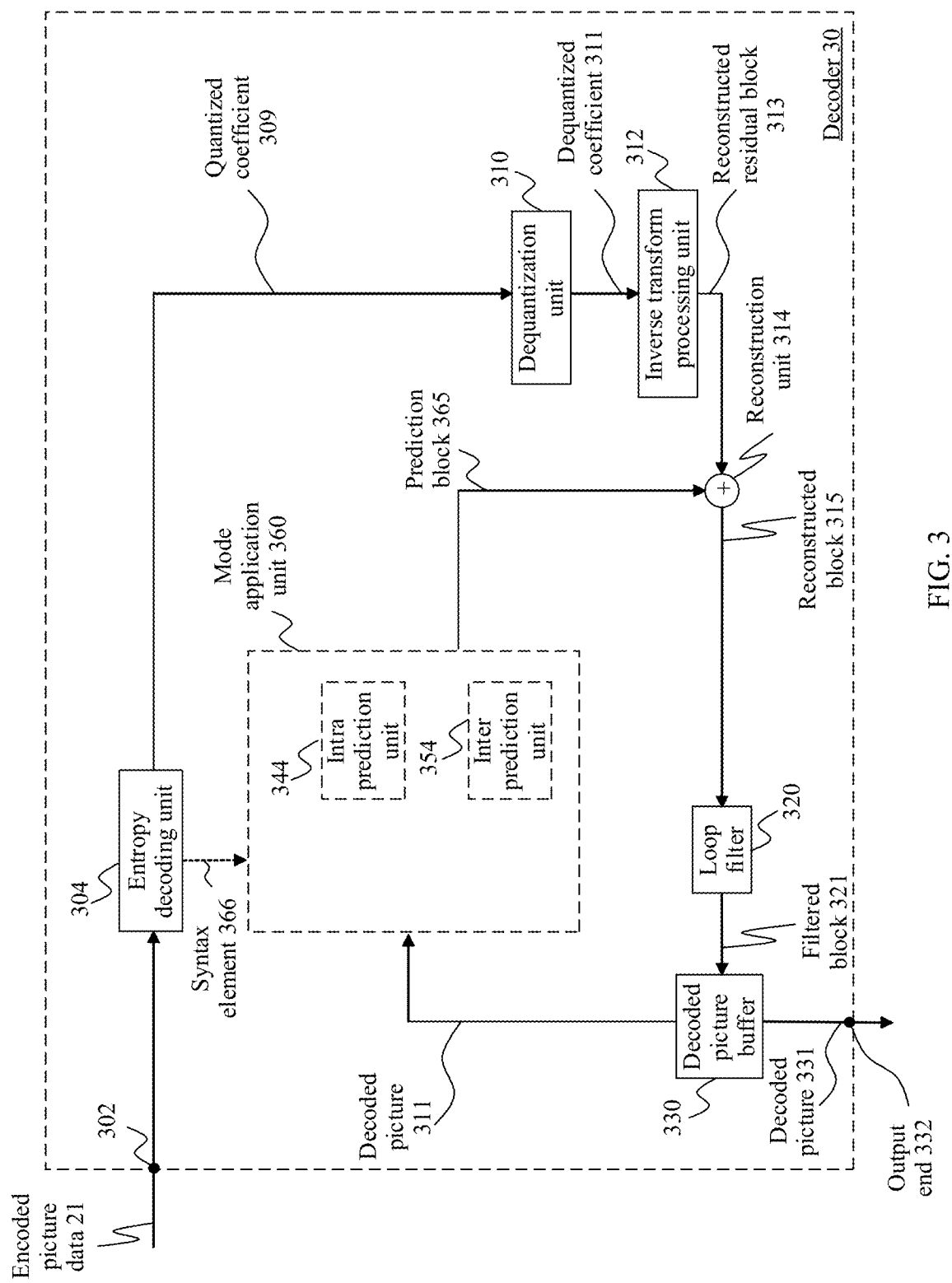
FIG. 3 is an example block diagram of a video decoder 30 according to an embodiment of this application.

FIG. 3 is an example block diagram of a video decoder 30 according to an embodiment of this application. The video decoder 30 is configured to receive, for example, the encoded picture data 21 (for example, the encoded bitstream 21) encoded by the encoder 20, to obtain a decoded picture 331. The encoded picture data or the bitstream includes information used to decode the encoded picture data, for example, data representing a picture block of an encoded video slice (and/or a tile group or a tile) and a related syntax element.

In an example in FIG. 3, the decoder 30 includes an entropy decoding unit 304, a dequantization unit 310, the inverse transform processing unit 312, a reconstruction unit 314 (for example, a summator 314), a loop filter 320, a decoded picture buffer (DBP) 330, a mode application unit 360, an inter prediction unit 344, and an intra prediction unit 354. The inter prediction unit 344 may be or include a motion compensation unit. In some examples, the video decoder 30 may perform a decoding process generally opposite to the encoding pass described with reference to the video encoder 100 in FIG. 2.

As described in the encoder 20, the dequantization unit 210, the inverse transform processing unit 212, the reconstruction unit 214, the loop filter 220, the decoded picture buffer DPB 230, the inter prediction unit 344, and the intra prediction unit 354 further form the "built-in decoder" of the video encoder 20. Correspondingly, the dequantization unit 310 may be identical in function to the dequantization unit 110, the inverse transform processing unit 312 may be identical in function to the inverse transform processing unit 122, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the descriptions of the corresponding units and functions of the video encoder 20 are correspondingly applicable to the corresponding units and functions of the video decoder 30.

Entropy Decoding

The entropy decoding unit 304 is configured to parse the bitstream 21 (or usually the encoded picture data 21) and perform entropy decoding on the encoded picture data 21, to obtain a quantized coefficient 309 and/or a decoded coding parameter (not shown in FIG. 3), and the like, for example, any one or all of the following: inter prediction parameters (for example, a reference picture index and a motion vector), an intra prediction parameter (for example, an intra prediction mode or index), a transform parameter, a quantization parameter, a loop filter parameter, and/or other syntax elements. The entropy decoding unit 304 may be configured to apply a decoding algorithm or scheme corresponding to the encoding scheme applied by the entropy encoding unit 270 of the encoder 20. The entropy decoding unit 304 may be further configured to provide the inter prediction parameters, the intra prediction parameter, and/or the other syntax elements for the mode application unit 360, and provide other parameters for other units of the decoder 30. The video decoder 30 may receive a syntax element at a video slice and/or video block level. Alternatively, the video decoder 30 may receive or use the tile group and/or the tile and a corresponding syntax element as a replacement for the slice and the corresponding syntax element.

Dequantization

The dequantization unit 310 may be configured to: receive a quantization parameter (QP) (or usually information related to dequantization) and a quantized coefficient from the encoded picture data 21 (for example, through parsing and/or decoding by the entropy decoding unit 304), and perform dequantization on the decoded quantized coefficient 309 based on the quantization parameter to obtain a dequantized coefficient 311. The dequantized coefficient 311 may also be referred to as a transform coefficient 311. The dequantization process may include determining a quantization degree by using a quantization parameter calculated by the video encoder 20 for each video block in the video slice, and determining a degree of dequantization that is to be performed.

Inverse Transformation

The inverse transform processing unit 312 may be configured to: receive a dequantized coefficient 311, which is also referred to as the transform coefficient 311, and apply transformation to the dequantized coefficient 311 to obtain a reconstructed residual blocks 213 in pixel domain. The reconstructed residual block 213 may also be referred to as a transform block 313. The transformation may be inverse transformation, for example, inverse DCT, inverse DST, inverse integer transform, or a conceptually similar inverse transformation process. The inverse transform processing unit 312 may be further configured to receive the transform parameter or corresponding information from the encoded picture data 21 (for example, through parsing and/or decoding by the entropy decoding unit 304), to determine the transformation to be applied to the dequantized coefficient 311.

Reconstruction

The reconstruction unit 314 (for example, the summator 314) is configured to add a reconstructed residual block 313 to a prediction block 365, for example, add pixel values of the reconstructed residual block 313 and pixel values of the prediction block 365, to obtain a reconstructed block 315 in pixel domain.

Filtering

The loop filter unit 320 (either in a coding loop or after the coding loop) is configured to filter the reconstructed block 315 to obtain a filtered block 321, to smoothly perform pixel conversion, improve video quality, or the like. The loop filter unit 320 may include one or more loop filters such as a de-blocking filter, a sample-adaptive offset (SAO) filter, or one or more other filters, for example, an adaptive loop filter (ALF), a noise suppression filter (NSF), or any combination thereof. For example, the loop filter unit 220 may include the de-blocking filter, the SAO filter, and the ALF filter. The filtering process may be performed by the de-blocking filter, the SAO filter, and the ALF filter sequentially. For another example, a luma mapping with chroma scaling (LMCS) process (that is, an adaptive in-loop reshaper) is added. This process is performed before de-blocking. For another example, the de-blocking filtering process may also be applied to internal subblock edges, for example, an affine subblock edge, an ATMVP subblock edge, a subblock transform (SBT) edge, and an intra sub-partition (ISP) edge. Although the loop filter unit 320 is shown as the in loop filter in FIG. 3, the loop filter unit 320 may be implemented as a post-loop filter in other configurations.

Decoded Picture Buffer

A decoded video block 321 in a picture is then stored in the decoded picture buffer 330, and the decoded picture buffer 330 stores the decoded picture 331 used as a reference picture. The reference picture is used for subsequent motion compensation for other pictures and/or output and display.

The decoder 30 is configured to output the decoded picture 311 through an output end 312 or the like, so that the decoded picture 311 is presented to or viewed by a user.

Prediction

The inter prediction unit 344 may be identical in function to the inter prediction unit 244 (in particular to the motion compensation unit) and the intra prediction unit 354 may be identical in function to the inter prediction unit 254, and the two prediction units determine to perform splitting or partitioning and prediction based on partitioning and/or prediction parameters or corresponding information received from the encoded picture data 21 (for example, through parsing and/or decoding by the entropy decoding unit 304). The mode application unit 360 may be configured to perform prediction (e.g., intra or inter prediction) on each block based on reconstructed blocks, blocks, or corresponding (filtered or unfiltered) pixels to obtain the prediction block 365.

When the video slice is coded as an intra-coded (I) slice, the intra prediction unit 354 in the mode application unit 360 is configured to generate the prediction block 365 for the picture block of the current video slice based on an indicated intra prediction mode and data from a previous decoded block of a current picture. When the video picture is coded as an inter-coded (that is, B or P) slice, the inter prediction unit 344 (for example, the motion compensation unit) in the mode application unit 360 is configured to generate the prediction block 365 for the video block in the current video slice based on the motion vector and the other syntax elements received from the entropy decoding unit 304. For inter prediction, these prediction blocks may be generated based on one of reference pictures in one of reference picture lists. The video decoder 30 may construct reference frame lists 0 and 1 based on the reference picture stored in the DPB 330 by using a default construction technique. A same or similar process may be applied to an embodiments of a tile group (for example, a video tile group) and/or a tile (for example, a video tile) in addition to a slice (for example, a video slice) or a replacement for a slice. For example, a video may be coded by using an I, P, or B tile group and/or tile.

The mode application unit 360 is configured to: determine prediction information for the video block in the current video slice by parsing the motion vector and the other syntax elements, and generate, by using the prediction information, the prediction block for the current video block being decoded. For example, the mode application unit 360 uses some received syntax elements to determine a prediction (for example, intra or inter prediction) mode used to code the video block in the video slice, an inter prediction slice type (for example, a B slice, a P slice, or a GPB slice), construction information of one or more reference picture lists for a slice, a motion vector of each inter-coded video block for the slice, an inter prediction status of each inter-coded video block for the slice, and other information, to decode the video block in the current video slice. A same or similar process may be applied to an embodiments of a tile group (for example, a video tile group) and/or a tile (for example, a video tile) in addition to a slice (for example, a video slice)

or a replacement for a slice. For example, a video may be coded by using an I, P, or B tile group and/or tile.

In an embodiment, the video encoder 30 shown in FIG. 3 may be alternatively configured to partition and/or decode the picture by using a slice (also referred to as a video slice). The picture may be partitioned or decoded by using one or more slices (usually non-overlapped). Each slice may include one or more blocks (for example, one or more CTUs) or one or more block groups (for example, one or more tiles in the H.265/HEVC/VVC standard and one or more bricks in the VVC standard).

In an embodiment, the video decoder 30 shown in FIG. 3 may be alternatively configured to partition and/or decode the picture by using a slice/tile group (also referred to as a video tile group) and/or a tile (also referred to as a video tile). The picture may be partitioned or decoded by using one or more slices/tile groups (usually non-overlapped). Each slice/tile group may include one or more blocks (for example, one or more CTUs), one or more tiles, or the like. Each tile may be in a rectangular shape or the like, and may include one or more complete or partial blocks (for example, one or more CTUs).

Other variations of the video decoder 30 may be used to decode the encoded picture data 21. For example, the decoder 30 may generate an output video stream without the loop filter unit 320. For example, a non-transform based decoder 30 may perform dequantization on a residual signal directly when there is no inverse transform processing unit 312 used for some blocks or frames. In another embodiment, the video decoder 30 may have the dequantization unit 310 and the inverse transform processing unit 312 that are combined into a single unit.

It should be understood that in the encoder 20 and the decoder 30, a processing result of a current operation may be further processed, and then a result obtained through further processing may be output to a next operation. For example, after interpolation filtering, motion vector derivation, or loop filtering is performed, a further operation such as a clipping (clip) or shift operation may be performed on a processing result of the interpolation filtering, the motion vector derivation, or the loop filtering.

It should be noted that further operations may be performed on derived motion vectors (including but not limit to a control-point motion vector in an affine mode, subblock motion vectors in affine, planar, ATMVP modes, and a temporal motion vector) of a current block. For example, a value of a motion vector is constrained to a predefined range based on a bitdepth of the motion vector. If the bitdepth of the motion vector is bitDepth, the range is $-2^{(bitDepth-1)}$ to $2^{(bitDepth-1)}-1$, where "^" represents an exponent. For example, if bitDepth is set equal to 16, the range is from −32768 to 32767; if bitDepth is set equal to 18, the range is from −131072 to 131071. For example, the value of the derived motion vector (for example, MVs of four 4×4 subblocks in one 8×8 block) is constrained, so that a maximum difference between integer parts of the MVs of the four 4×4 subblocks is not greater than N pixels, for example, not greater than one pixel. Two methods for constraining the motion vector based on bitDepth are provided herein.

Although video encoding and decoding are mainly described in the foregoing embodiments, it should be noted that embodiments of the coding system 10, the encoder 20, and the decoder 30, and the other embodiments described in this specification may also be used for still-picture processing or encoding and decoding, that is, processing or encoding and decoding of a single picture in video encoding and decoding independent of any previous picture or consecutive pictures. Generally, the inter prediction unit 244 (the encoder) and the inter prediction unit 344 (the decoder) may be unavailable if picture processing is only performed on a single picture 17. All other functions (also referred to as tools or technologies) of the video encoder 20 and the video decoder 30, such as residual calculation 204/304, transform 206, quantization 208, dequantization 210/310, (inverse) transform 212/312, partitioning 262/362, intra prediction 254/354, and/or loop filtering 220/320, entropy encoding 270, and entropy decoding 304, may also be used for still-picture processing.

Figure 4:
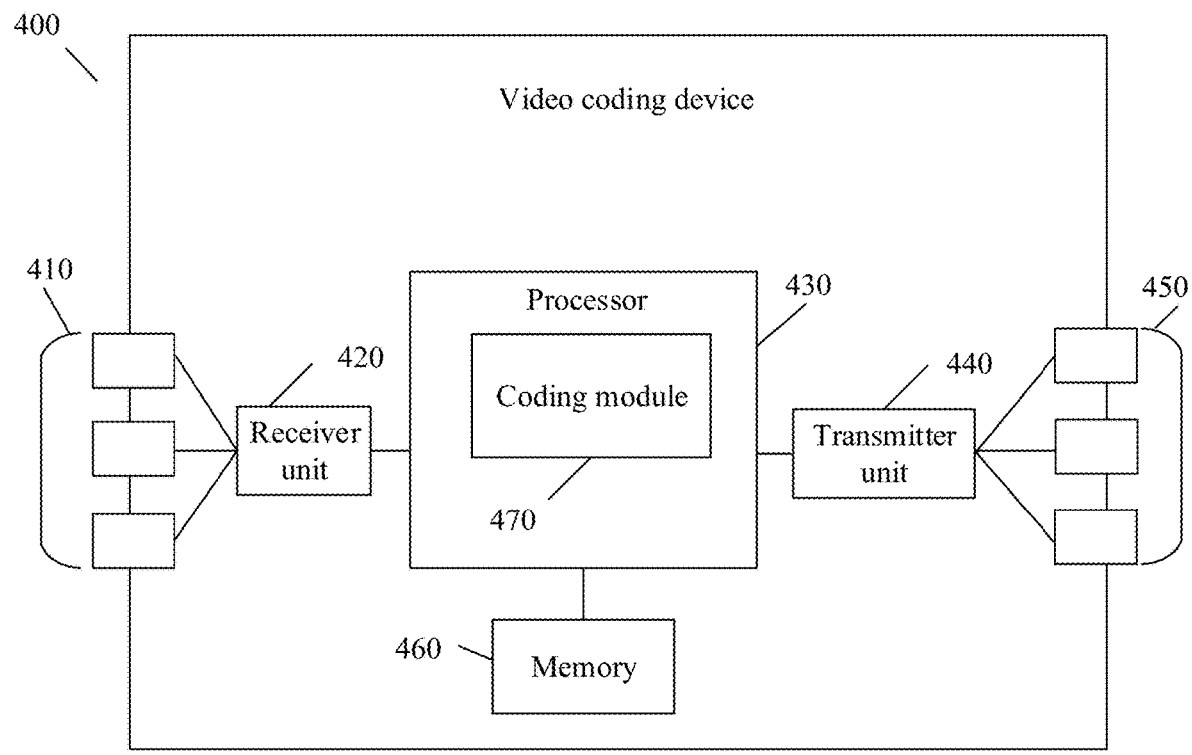
FIG. 4 is an example block diagram of a video coding device 400 according to an embodiment of this application.

FIG. 4 is an example block diagram of a video coding device 400 according to an embodiment of this application. The video coding device 400 is suitable for implementing the disclosed embodiments described in this specification. In an embodiment, the video coding device 400 may be a decoder, for example, the video decoder 30 in FIG. 1A, or may be an encoder, for example, the video encoder 20 in FIG. 1A.

The video coding device 400 includes: an ingress port 410 (or an input port 410) and a receiver unit (Rx) 420 configured to receive data; a processor, a logical unit, or a central processing unit (CPU) 430 configured to process data; a transmitter unit (Tx) 440 and an egress port 450 (or an output port 450) configured to transmit data; and a memory 460 configured to store data. The video coding device 400 may further include an optical-to-electrical (OE) component and an electrical-to-optical (EO) component that are coupled to the ingress port 410, the receiver unit 420, the transmitter unit 440, and the egress port 450, and the OE component and the EO component are used as egresses or ingresses of optical signals or electrical signals.

The processor 430 is implemented by using hardware and software. The processor 430 may be implemented as one or more processor chips, a core (for example, a multi-core processor), an FPGA, an ASIC, and a DSP. The processor 430 communicates with the ingress port 410, the receiver unit 420, the transmitter unit 440, the egress port 450, and the memory 460. The processor 430 includes a coding module 470. The coding module 470 implements the disclosed embodiments described above. For example, the coding module 470 performs, processes, prepares, or provides various coding operations. Therefore, the coding module 470 provides a substantial improvement to functions of the video coding device 400 and affects switching of the video coding device 400 between different states. Alternatively, the coding module 470 is implemented by using instructions that are stored in the memory 460 and executed by the processor 430.

The memory 460 includes one or more magnetic disks, a tape drive, and a solid-state drive, may be used as an over-flow data storage device, and is configured to store a program when such a program is selected for execution and store instructions and data that are read during execution of the program. The memory 460 may be volatile and/or nonvolatile and may include a read-only memory (ROM), a random access memory (RAM), ternary content-addressable memory (TCAM), and/or a static random access memory (SRAM).

FIG. 5 is an example block diagram of an apparatus 500 according to an embodiment of this application. The apparatus 500 may be used as either or both of the source device 12 and the destination device 14 in FIG. 1A.

A processor 502 in the apparatus 500 can be a central processing unit. Alternatively, a processor 502 may be any other type of device or a plurality of devices capable of manipulating or processing information that exist nowadays or will be developed in the future. Although the disclosed embodiments can be implemented by using a single processor, for example, the processor 502 shown in the figure, a higher speed and higher efficiency are achieved by using more than one processor.

In an embodiment, a memory 504 in the apparatus 500 may be a read-only memory (ROM) device or a random access memory (RAM) device. Any other appropriate type of storage device may be alternatively used as the memory 504. The memory 504 may include code and data 506 that are accessed by the processor 502 through a bus 512. The memory 504 may further include an operating system 508 and an application program 510, and the application program 510 includes at least one program that allows the processor 502 to perform the methods described in this specification. For example, the application program 510 may include applications 1 to N, and further includes a video coding application for performing the methods described in this specification.

The apparatus 500 may further include one or more output devices such as a display 518. In an example, the display 518 may be a touch sensitive display that combines a display with a touch sensitive element that may be configured to sense touch input. The display 518 may be coupled to the processor 502 through the bus 512.

Although the bus 512 in the apparatus 500 is depicted as a single bus in this specification, the bus 512 may include a plurality of buses. In addition, a secondary memory may be directly coupled to the other components in the apparatus 500 or may be accessed over a network, and may include a single integrated unit such as a memory card or a plurality of units such as a plurality of memory cards. Therefore, the apparatus 500 may have a wide variety of configurations.

Figure 8:
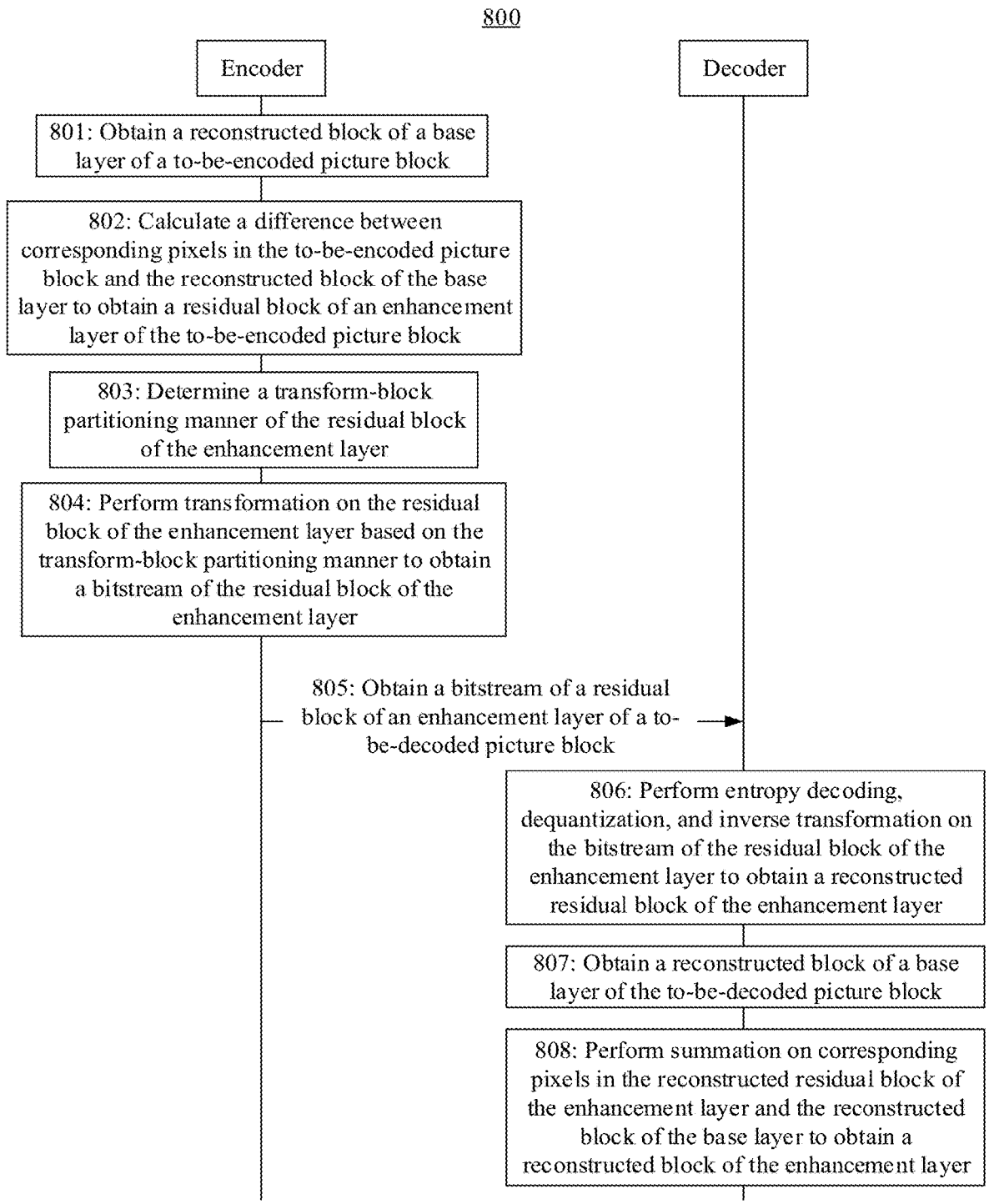
FIG. 8 is an example flowchart of a coding method for an enhancement layer according to this application.

FIG. 8 is an example flowchart of a coding method for an enhancement layer according to this application. A process 800 may be performed by a video encoder 20 (or an encoder) and a video decoder 30 (or a decoder). The process 800 is described as a series of steps or operations. It should be understood that the steps or operations of the process 800 may be performed in various sequences and/or simultaneously, and are not limited to an execution sequence shown in FIG. 8.

Operation 801: The encoder obtains a reconstructed block of a base layer of a to-be-encoded picture block.

Layered video coding, also referred to as scalable video coding, is an extended coding standard of an existing video coding standard (which is usually extended-standard scalable video coding (SVC) of advanced video coding (AVC) (H.264), or extended-standard scalable high efficiency video coding (SHVC) of high efficiency video coding (HEVC) (H.265)). The scalable video coding is mainly used to resolve packet loss and delay variation problems caused by a real-time change of network bandwidth in real-time video transmission.

Basic structures in the scalable video coding may be referred to as layers. In the scalable video coding technology, spatial scalability (resolution scalability) may be performed on an original picture block, to obtain bitstreams of layers with different resolutions. A resolution may be a size of a picture block expressed as pixels. A lower-layer resolution is relatively low, and a higher-layer resolution is not lower than a lower-layer resolution. Alternatively, temporal scalability (frame rate scalability) may be performed on an original picture block, to obtain bitstreams of layers with different frame rates. A frame rate may be a quantity of picture frames included in a video per unit time. A lower-layer frame rate is relatively low, and a higher-layer frame rate is not lower than a lower-layer frame rate. Alternatively, quality scalability may be performed on an original picture block, to obtain bitstreams of layers with different encoding quality. Encoding quality may be video quality. A lower-layer picture distortion degree is relatively large, and a higher-layer picture distortion degree is not higher than a lower-layer picture distortion degree.

Generally, a layer referred to as the base layer is a bottommost layer in the scalable video coding. In the spatial scalability, a base layer picture block is encoded by using a lowest resolution. In the temporal scalability, the base layer picture block is encoded by using a lowest frame rate. In the quality scalability, the base layer picture block is encoded by using a highest QP or a lowest bit rate. In other words, the base layer is a layer with lowest quality in the scalable video coding. A layer referred to as an enhancement layer is a layer above the base layer in the scalable video coding, and there may be a plurality of enhancement layers from low to high. Based on encoding information obtained by the base layer, a lowest-layer enhancement layer has a higher encoding resolution than the base layer, has a higher frame rate than the base layer, or has a higher bit rate than the base layer. A picture block with higher quality may be encoded for a higher-layer enhancement layer based on encoding information of a lower-layer enhancement layer.

Figure 9:
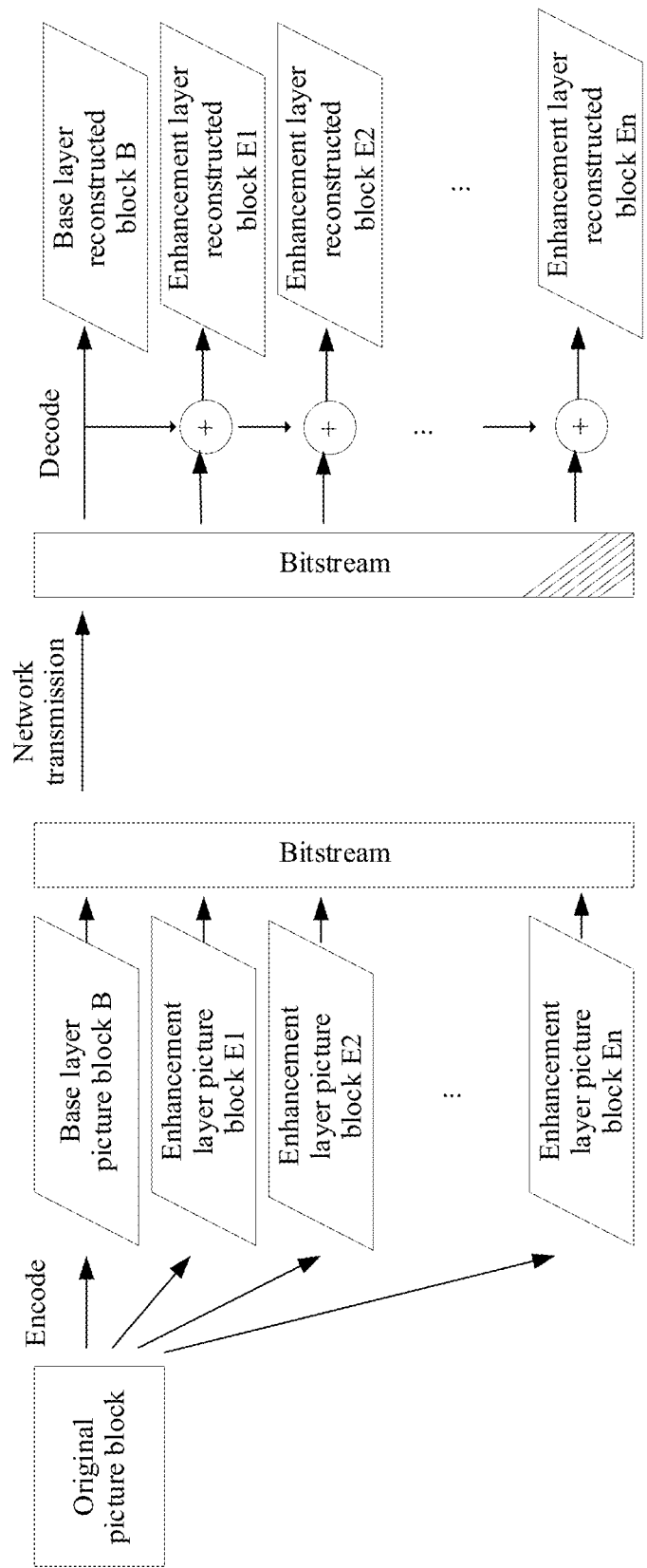
FIG. 9 is an example schematic diagram of layers of scalable video coding according to this application.

For example, FIG. 9 is an example schematic diagram of layers in scalable video coding according to this application. As shown in FIG. 9, after an original picture block is sent to a scalable encoder, the original picture block may be layered into a base layer picture block B and enhancement layer picture blocks (E1 to En, where n≥1) based on different encoding configurations, and then the picture blocks are separately encoded to obtain bitstreams including a base layer bitstream and an enhancement layer bitstream. The base layer bitstream is generally a bitstream obtained by encoding a lowest spatial-domain picture block, a lowest time-domain picture block, or a lowest quality picture block. The enhancement layer bitstream is a bitstream obtained based on the base layer by superimposing and encoding a high-layer spatial-domain picture block, a high-layer time-domain picture block, or a high-layer quality picture block. As a quantity of enhancement layers increases, spatial-domain layers, time-domain layers, or quality layers for encoding are increasingly high. When transmitting bitstreams to the decoder, the encoder preferentially ensures transmission of the base layer bitstream. When there is a margin in a network, the encoder gradually transmits the bitstreams at increasingly high layers. The decoder first receives and decodes the base layer bitstream, decodes, in a layer-by-layer manner based on the received enhancement layer bitstream, bitstreams with increasingly high spatial-domain layers, time-domain layers, or quality layers in a sequence from a lower layer to a higher layer, and then superimposes higher-layer decoding information on a lower-layer reconstructed block, to obtain a reconstructed block with a higher resolution, a higher frame rate, or higher quality.

The to-be-encoded picture block may be a picture block currently being processed by the encoder, and the picture block may be a largest coding unit (LCU) in a full-frame picture. The full-frame picture may be any picture frame in a picture sequence included in a video being processed by the encoder. Partitioning processing has not been performed on the picture frame, and a size of the picture frame is a size of a complete picture frame. In the H.265 standard, before video coding is performed, an original picture frame is partitioned into a plurality of coding tree units (CTUs). A CTU is a largest coding unit for video coding, and may be partitioned into CUs of different sizes in a quadtree manner. As a largest coding unit, the CTU is also referred to as an LCU. Alternatively, the picture block may be a full-frame picture, or the picture block may be a region of interest (ROI) in a full-frame picture, that is, a picture region that is to be processed and that is specified in the picture.

Figure 10:
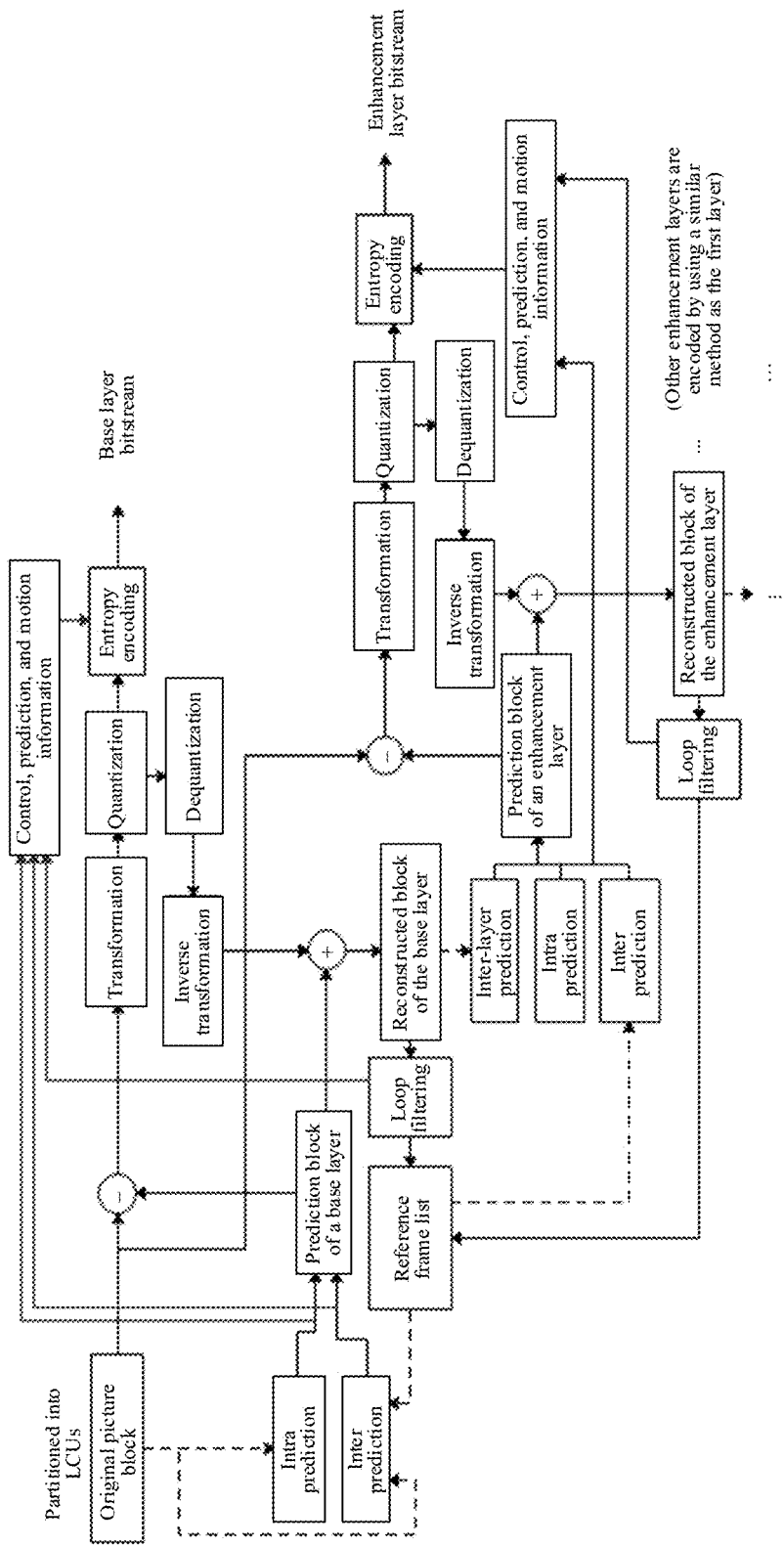
FIG. 10 is an example flowchart of an encoding method for an enhancement layer according to this application.

As described above, each picture in a video sequence is usually partitioned into a set of non-overlapping blocks, which are usually encoded at a block level. In other words, the encoder usually processes, that is, encodes, a video at a block (e.g., picture block) level. For example, the encoder generates a prediction block through spatial prediction (e.g., intra prediction) and temporal prediction (inter prediction); subtracts the prediction block from a picture block (e.g., a currently processed/to-be-processed block) to obtain a residual block; and performs transformation and quantization on the residual block in transform domain, so that a volume of data to be transmitted (e.g., compressed) can be reduced. The encoder further may perform dequantization and inverse transformation to obtain a reconstructed residual block, and then adds pixel values of the reconstructed residual block to pixel values of the prediction block to obtain a reconstructed block. A reconstructed block of the base layer is the reconstructed block obtained by performing the foregoing operations on the base layer picture block obtained by layering the original picture block. For example, FIG. 10 is an example flowchart of an encoding method for an enhancement layer according to this application. As shown in FIG. 10, the encoder obtains a prediction block of the base layer based on the original picture block (for example, an LCU); calculates a difference between corresponding pixels in the original picture block and the prediction block of the base layer to obtain a residual block of the base layer; and after performing partitioning on the residual block of the base layer, performs transformation and quantization on the residual block, and performs entropy encoding on the residual block together with encoding control information, prediction information, motion information, and the like of the base layer to obtain the base layer bitstream. The encoder performs dequantization and inverse transformation on a quantized coefficient to obtain a reconstructed residual block of the base layer, and then performs summation on corresponding pixels in the prediction block of the base layer and the reconstructed residual block of the base layer to obtain the reconstructed block of the base layer.

Operation 802: The encoder calculates a difference between corresponding pixels in the to-be-encoded picture block and the reconstructed block of the base layer to obtain a residual block of an enhancement layer of the to-be-encoded picture block.

A resolution of the enhancement layer picture block is not lower than a resolution of the base layer picture block, or encoding quality of the enhancement layer picture block is not lower than encoding quality of the base layer picture block. As described above, the encoding quality may be video quality. That the encoding quality of the enhancement layer picture block is not lower than the encoding quality of the base layer picture block may mean that a picture distortion degree of the base layer is relatively large, and a picture distortion degree of the enhancement layer is not higher than the picture distortion degree of the base layer.

A picture block includes a plurality of pixels, the plurality of pixels are arranged into an array, and a location of each pixel in the picture block may be uniquely identified by using a row number and a column number. It is assumed that sizes of the to-be-encoded picture block and the reconstructed block of the base layer are both M×N, that is, the to-be-encoded picture block and the reconstructed block of the base layer each include M×N pixels. $a(i1,j1)$ represents a pixel with an i1th column and a j1th row in the to-be-encoded picture block, where it ranges from 1 to M and j1 ranges from 1 to N. $b(i2, j2)$ represents a pixel with an i1th column and a j1th row in the reconstructed block of the base layer, where i2 ranges from 1 to M and j2 ranges from 1 to N. The corresponding pixels in the to-be-encoded picture block and the reconstructed block of the base layer are pixels whose row numbers and column numbers in the picture blocks to which the pixels respectively belong are respectively equal to each other, that is, i1=i2 and j1=j2. For example, a size of a picture block is 16×16, the picture block includes 16×16 pixels, row numbers are 0 to 15, column numbers are 0 to 15, and a pixel with an identifier $a(0, 0)$ in the to-be-encoded picture block and a pixel with an identifier $b(0, 0)$ in the reconstructed block of the base layer are corresponding pixels, or a pixel with an identifier $a(6, 9)$ in the to-be-encoded picture block and a pixel with an identifier $b(6, 9)$ in the reconstructed block of the base layer are corresponding pixels. Calculating the difference between the corresponding pixels may be calculating a difference between pixel values of the corresponding pixels in the to-be-encoded picture block and the reconstructed block of the base layer. The pixel value may be a luminance value, a chrominance value, or the like of the pixel. This is not specifically limited in this application.

As shown in FIG. 10, in the SHVC standard, the encoder predicts a prediction block of the enhancement layer based on the reconstructed block of the base layer, and then calculates a difference between corresponding pixels in the reconstructed block of the base layer and the prediction block of the enhancement layer to obtain the residual block of the enhancement layer. In contrast, in operation 802, the difference between the corresponding pixels in the to-be-encoded picture block and the reconstructed block of the base layer may be directly calculated to obtain the residual block of the enhancement layer. This reduces a process of obtaining the prediction block of the enhancement layer, so that a processing procedure for the encoder can be simplified, and encoding efficiency of the encoder can be improved.

Operation 803: The encoder determines a transform-block partitioning manner of the residual block of the enhancement layer.

The transform-block partitioning manner of the residual block of the enhancement layer is different from a transform-block partitioning manner of the residual block of the base layer. To be specific, the transform-block partitioning manner used when the encoder processes the residual block of the enhancement layer is different from the transform-block partitioning manner used when the encoder processes the residual block of the base layer. For example, the residual block of the base layer is partitioned into three subblocks in a TT partitioning manner, but the residual block of the enhancement layer is partitioned not in the TT partitioning manner. The encoder may determine the transform-block partitioning manner of the residual block of the enhancement layer in the following adaptive manner:

In a possible embodiment, the encoder may first perform iterative tree structure partitioning on a first largest transform unit (LTU) of the residual block of the enhancement layer to obtain transform units (TUs) of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and 0≤i≤Dmax−1.

Corresponding to the size of the to-be-encoded picture block, a size of the residual block of the enhancement layer may be a size of the full-frame picture, may be a size of a partitioned picture block (for example, a CTU or a CU) in the full-frame picture, or may be a size of the ROI in the full-frame picture. The LTU is a picture block of a largest size used for transform processing in picture blocks, and a size of the LTU may be same as the size of the reconstructed block of the base layer. This can ensure that efficiency of transform coding is maximized while the enhancement layers corresponding to different reconstructed blocks can be processed concurrently. One LTU may be partitioned into a plurality of nodes based on configured partitioning information, and each node may be further partitioned based on the configured partitioning information until no nodes are partitioned any more. This process may be referred to as iterative tree structure partitioning. The tree structure partitioning may include QT partitioning, BT partitioning, and/or TT partitioning, and may further include EQT partitioning. A partitioning manner of the LTU is not specifically limited in this application. A plurality of nodes are obtained by partitioning one node at a time. The node on which partitioning is performed is referred to as a parent node, and the nodes obtained through partitioning are referred to as subnodes. A partitioning depth of a root node is 0, and a depth of the subnode is a depth of the parent node plus 1. Therefore, iterative tree structure partitioning may be performed on the residual block of the enhancement layer starting from the root node LTU, to obtain TUs of a plurality of depths, for example, as shown in FIG. 7. A maximum depth (that is, a depth of a minimum TU obtained through partitioning) in the plurality of depths is Dmax. It is assumed that a width and a height of the LTU are both L, and a width and a height of the minimum TU are both S. In this case, the partitioning depth of the minimum TU is d=log$_2$(⌊L/S⌋), where ⌊ ⌋ indicates rounding down, and therefore Dmax≤d.

Based on the foregoing TUs obtained through transform partitioning, the encoder performs rate-distortion optimization (RDO) processing to determine the partitioning manner of the LTU. The first TU with the partitioning depth i and the second TU with the depth i+1 are used as an example. i starts from Dmax−1 and values of i are taken in descending order, and the second TU is obtained by partitioning the first TU. The encoder first performs transformation and quantization on the first TU to obtain a quantized coefficient of the first TU (the quantized coefficient may be obtained through quantization processing in FIG. 10); precodes the quantized coefficient of the first TU (the precoding is an encoding process performed to estimate a length of an encoded code word, or a process of performing processing in a manner similar to encoding) to obtain a bitstream size R of the first TU; performs dequantization and inverse transformation on the quantized coefficient of the first TU to obtain a reconstructed block of the TU; calculates a sum of squared differences of the first TU and the reconstructed block of the first TU to obtain a distortion value D of the first TU; and finally obtains the loss estimate C of the first TU based on the bitstream size R of the first TU and the distortion value D of the first TU.

A calculation formula of the distortion value D of the first TU is as follows:

$$D = \sum_i \sum_j (P_{rs}(i,j) - P_{rc}(i,j))^2,$$

where
$P_{rs}(i,j)$ represents an original value of a residual pixel in the first TU at a coordinate point (i, j) within a range of the TU, and $P_{rc}(i,j)$ represents a reconstructed value of the residual pixel in the first TU at the coordinate point (i, j) within the range of the TU.

A calculation formula of the loss estimate C of the first TU is as follows:

$C = D + \lambda R$, where $\lambda$ represents a constant value related to a quantized coefficient of a current layer, and determines a pixel distortion status of the current layer.

The encoder may calculate the loss estimates of the second TUs by using the same method. After obtaining the loss estimate of the first TU and the loss estimates of the second TUs, the encoder compares the loss estimate of the first TU with the sum of the loss estimates of the plurality of second TUs, where the plurality of second TUs are obtained by partitioning the first TU; and determines a partitioning manner corresponding to a smaller one of the two compared values as the partitioning manner of the first TU. To be specific, if the loss estimate of the first TU is greater than the sum of the loss estimates of the plurality of second TUs, a manner of partitioning the first TU into the plurality of second TUs is determined as the partitioning manner of the first TU. If the loss estimate of the first TU is less than or equal to the sum of the loss estimates of the plurality of second TUs, the first TU is not further partitioned. After traversing all the TUs of the LTU by using the foregoing method, the encoder can obtain the partitioning manner of the LTU. When the residual block of the enhancement layer includes only one LTU, the partitioning manner of the LTU is the partitioning manner of the residual block of the enhancement layer. When the residual block of the enhancement layer includes a plurality of LTUs, the partitioning manner of the LTUs and a manner of partitioning the residual block of the enhancement layer into the LTUs constitute the partitioning manner of the residual block of the enhancement layer.

In this application, a TU partitioning manner used for the residual block of the enhancement layer is different from that used for the residual block of the base layer, and is an adaptive TU partitioning method, that is, a TU partitioning manner suitable for the residual block of the enhancement layer; and then encoding is performed. When the TU partitioning for the residual block of the enhancement layer is independent of a CU partitioning manner for the base layer, a TU size of the enhancement layer is no longer limited by a CU size, so that encoding flexibility can be improved.

Operation 804: The encoder performs transformation on the residual block of the enhancement layer based on the transform-block partitioning manner to obtain a bitstream of the residual block of the enhancement layer.

The encoder may perform transformation, quantization, and entropy encoding on the residual block of the enhancement layer based on the transform-block partitioning manner to obtain the bitstream of the residual block of the enhancement layer. For transformation, quantization, and entropy encoding methods, refer to the foregoing descriptions. Details are not described herein again.

Operation 805: The decoder obtains a bitstream of a residual block of an enhancement layer of a to-be-decoded picture block.

The encoder and the decoder may transmit bitstreams (including the base layer bitstream and the enhancement layer bitstream) over a wired or wireless link between the encoder and the decoder. Details are not described herein.

Operation 806: The decoder performs entropy decoding, dequantization, and inverse transformation on the bitstream of the residual block of the enhancement layer to obtain a reconstructed residual block of the enhancement layer.

After obtaining the bitstream of the residual block of the enhancement layer, the decoder performs entropy decoding, dequantization, and inverse transform processing on the bitstream based on a syntax element carried in the bitstream to obtain the reconstructed residual block of the enhancement layer. For this process, refer to the foregoing descriptions. The encoder also performs the foregoing operations in a process of obtaining a reconstructed block. Therefore, details are not described herein again.

Operation 807: The decoder obtains a reconstructed block of a base layer of the to-be-decoded picture block.

The decoder side may obtain, with reference to the description in operation 801, the reconstructed block of the base layer by using the same method as that performed by the encoder. Details are not described herein again.

Operation 808: The decoder performs summation on corresponding pixels in the reconstructed residual block of the enhancement layer and the reconstructed block of the base layer to obtain a reconstructed block of the enhancement layer.

Based on row numbers and column numbers of a plurality of pixels included in the reconstructed residual block of the enhancement layer and row numbers and column numbers of a plurality of pixels included in the reconstructed block of the base layer, the decoder adds pixels in one of the two picture blocks to corresponding pixels in the other picture block, to obtain the reconstructed block of the enhancement layer, where the pixels in one of the two picture blocks respectively have a same row number and column number as the corresponding pixels in the other picture block.

In this application, the difference between the corresponding pixels in the to-be-encoded picture block and the reconstructed block of the base layer may be directly calculated to obtain the residual block of the enhancement layer. This reduces the process of obtaining the prediction block of the enhancement layer, so that the processing procedure for the encoder can be simplified, and the encoding efficiency of the encoder can be improved. In addition, the TU partitioning manner used for the residual block of the enhancement layer is different from that used for the residual block of the base layer, and is the adaptive TU partitioning method, that is, the TU partitioning manner suitable for the residual block of the enhancement layer; and then encoding is performed. When the TU partitioning for the residual block of the enhancement layer is independent of the CU partitioning manner for the base layer, the TU size of the enhancement layer is no longer limited by the CU size, so that compression efficiency of the residual block can be improved more effectively.

The method shown in FIG. 8 is applicable to two layering manners: spatial scalability and quality scalability. When the spatial scalability is used for the picture block to obtain the base layer picture block and the enhancement layer picture block, the resolution of the base layer picture block is lower than the resolution of the enhancement layer picture block. Therefore, before calculating the difference between the corresponding pixels in the to-be-encoded picture block and the reconstructed block of the base layer to obtain the residual block of the enhancement layer of the to-be-encoded picture block, the encoder may perform downsampling on an original to-be-encoded picture block to obtain the to-be-encoded picture block with a first resolution, and perform upsampling on an original reconstructed block of the base layer to obtain the reconstructed block of the base layer with the first resolution. In other words, the encoder may separately perform downsampling on the original to-be-encoded picture block, and perform upsampling on the original reconstructed block of the base layer, so that the resolution of the to-be-encoded picture block is equal to the resolution of the reconstructed block of the base layer.

Figure 11:
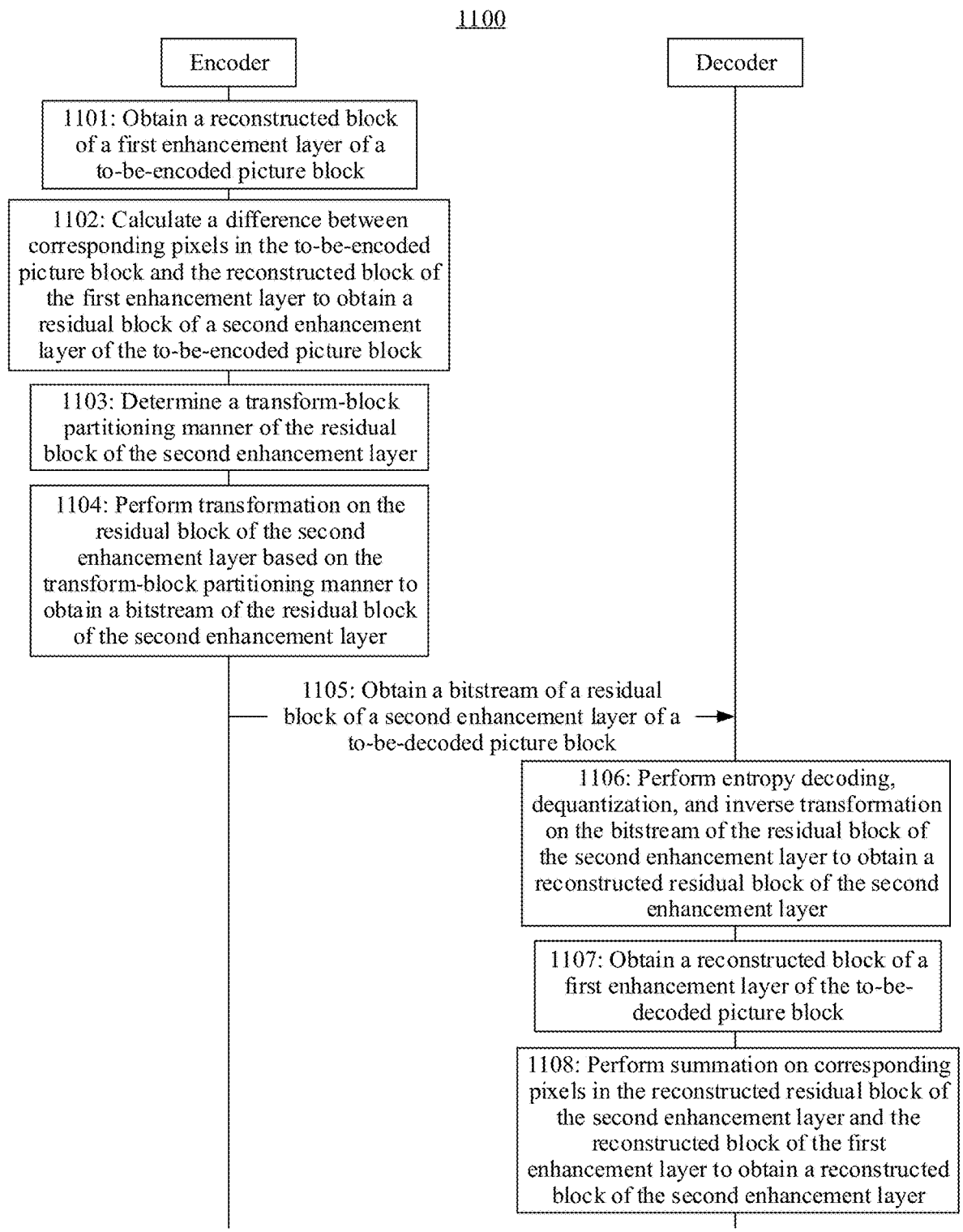
FIG. 11 is an example flowchart of a coding method for an enhancement layer according to this application.

FIG. 11 is an example flowchart of a coding method for an enhancement layer according to this application. A process 1100 may be performed by a video encoder 20 (or an encoder) and a video decoder 30 (or a decoder). The process 1100 is described as a series of steps or operations. It should be understood that the steps or operations of the process 1100 may be performed in various sequences and/or simultaneously, and are not limited to an execution sequence shown in FIG. 11.

Operation 1101: The encoder obtains a reconstructed block of a first enhancement layer of a to-be-encoded picture block.

As shown in FIG. 9, after a picture block is layered by using spatial scalability, temporal scalability, or quality scalability, in addition to a base layer, the picture block is further partitioned into a plurality of enhancement layers. The method shown in FIG. 8 is encoding and decoding methods for the enhancement layer, which is higher than the base layer, based on the base layer, while this embodiment describes the encoding and decoding methods for a higher layer, namely, a second enhancement layer, based on a lower-layer enhancement layer (e.g., the first enhancement layer).

A difference from a method for obtaining a reconstructed block of the base layer lies in that: A code block may calculate a difference between corresponding pixels in the to-be-processed picture block and a reconstructed block of a third layer of the to-be-processed picture block to obtain a residual block of the first enhancement layer, where the third layer is a layer lower than the first enhancement layer, and may be the base layer or an enhancement layer; perform transformation and quantization on the residual block of the first enhancement layer to obtain a quantized coefficient of the residual block of the first enhancement layer; perform dequantization and inverse transformation on the quantized coefficient of the residual block of the first enhancement layer to obtain a reconstructed residual block of the first enhancement layer; and finally perform summation on corresponding pixels in the reconstructed block of the third layer and the reconstructed residual block of the first enhancement layer to obtain the reconstructed block of the first enhancement layer.

Operation 1102: The encoder calculates a difference between corresponding pixels in the to-be-encoded picture block and the reconstructed block of the first enhancement layer to obtain a residual block of the second enhancement layer of the to-be-encoded picture block.

Operation 1103: The encoder determines a transform-block partitioning manner of the residual block of the second enhancement layer.

The transform-block partitioning manner of the residual block of the second enhancement layer is different from a transform-block partitioning manner of the residual block of the first enhancement layer.

The encoder may alternatively use the foregoing RDO processing to determine the transform-block partitioning manner of the residual block of the second enhancement layer. Details are not described herein again.

In this application, a TU partitioning manner used for the residual block of the second enhancement layer is different from those used for the residual block of the first enhancement layer and a residual block of the base layer, and is an adaptive TU partitioning method, that is, a TU partitioning manner suitable for the residual block of the second enhancement layer; and then encoding is performed. When the TU partitioning for the residual block of the second enhancement layer is independent of a CU or TU partitioning manner for another layer, a TU size of the second enhancement layer is no longer limited by a CU size or a TU size of the second enhancement layer is no longer limited by a TU size of the first enhancement layer, so that encoding flexibility can be improved.

Operation 1104: The encoder performs transformation on the residual block of the second enhancement layer based on the transform-block partitioning manner to obtain a bitstream of the residual block of the second enhancement layer.

Operation 1105: The decoder obtains the bitstream of the residual block of the second enhancement layer of a to-be-decoded picture block.

Operation 1106: The decoder performs entropy decoding, dequantization, and inverse transformation on the bitstream of the residual block of the second enhancement layer to obtain a reconstructed residual block of the second enhancement layer.

Operation 1107: The decoder obtains the reconstructed block of the first enhancement layer of the to-be-decoded picture block.

Operation 1108: The decoder performs summation on corresponding pixels in the reconstructed residual block of the second enhancement layer and the reconstructed block of the first enhancement layer to obtain a reconstructed block of the second enhancement layer.

In this application, the difference between the corresponding pixels in the to-be-encoded picture block and the reconstructed block of the first enhancement layer may be directly calculated to obtain the residual block of the second enhancement layer. This reduces a process of obtaining a prediction block of the second enhancement layer, so that a processing procedure for the encoder can be simplified, and encoding efficiency of the encoder can be improved. In addition, the TU partitioning manner used for the residual block of the second enhancement layer is different from that used for the residual block of the first enhancement layer, and is the adaptive TU partitioning method, that is, the TU partitioning manner suitable for the residual block of the second enhancement layer; and then encoding is performed. When the TU partitioning for the residual block of the second enhancement layer is independent of a CU or TU partitioning manner for the first enhancement layer, the TU size of the second enhancement layer is no longer limited by the CU size or the TU size of the second enhancement layer is no longer limited by the TU size of the first enhancement layer, so that compression efficiency of the residual block can be improved more effectively.

The method shown in FIG. 11 is applicable to two layering manners: spatial scalability and quality scalability. When the spatial scalability is used for the picture block to obtain a first enhancement layer picture block and a second enhancement layer picture block, a resolution of the first enhancement layer picture block is lower than a resolution of the second enhancement layer picture block. Therefore, before calculating the difference between the corresponding pixels in the to-be-encoded picture block and the reconstructed block of the first enhancement layer to obtain the residual block of the second enhancement layer of the to-be-encoded picture block, the encoder may perform downsampling on an original to-be-encoded picture block to obtain the to-be-encoded picture block with a first resolution, and perform upsampling on an original reconstructed block of the first enhancement layer to obtain the reconstructed block of the first enhancement layer with the first resolution. In other words, the encoder may separately perform downsampling on the original to-be-encoded picture block, and perform upsampling on the original reconstructed block of the first enhancement layer, so that the resolution of the to-be-encoded picture block is equal to the resolution of the reconstructed block of the first enhancement layer.

The following describes the embodiments shown in FIG. 8 and FIG. 11 by using several example embodiments.

Embodiment 1

Figure 12A:
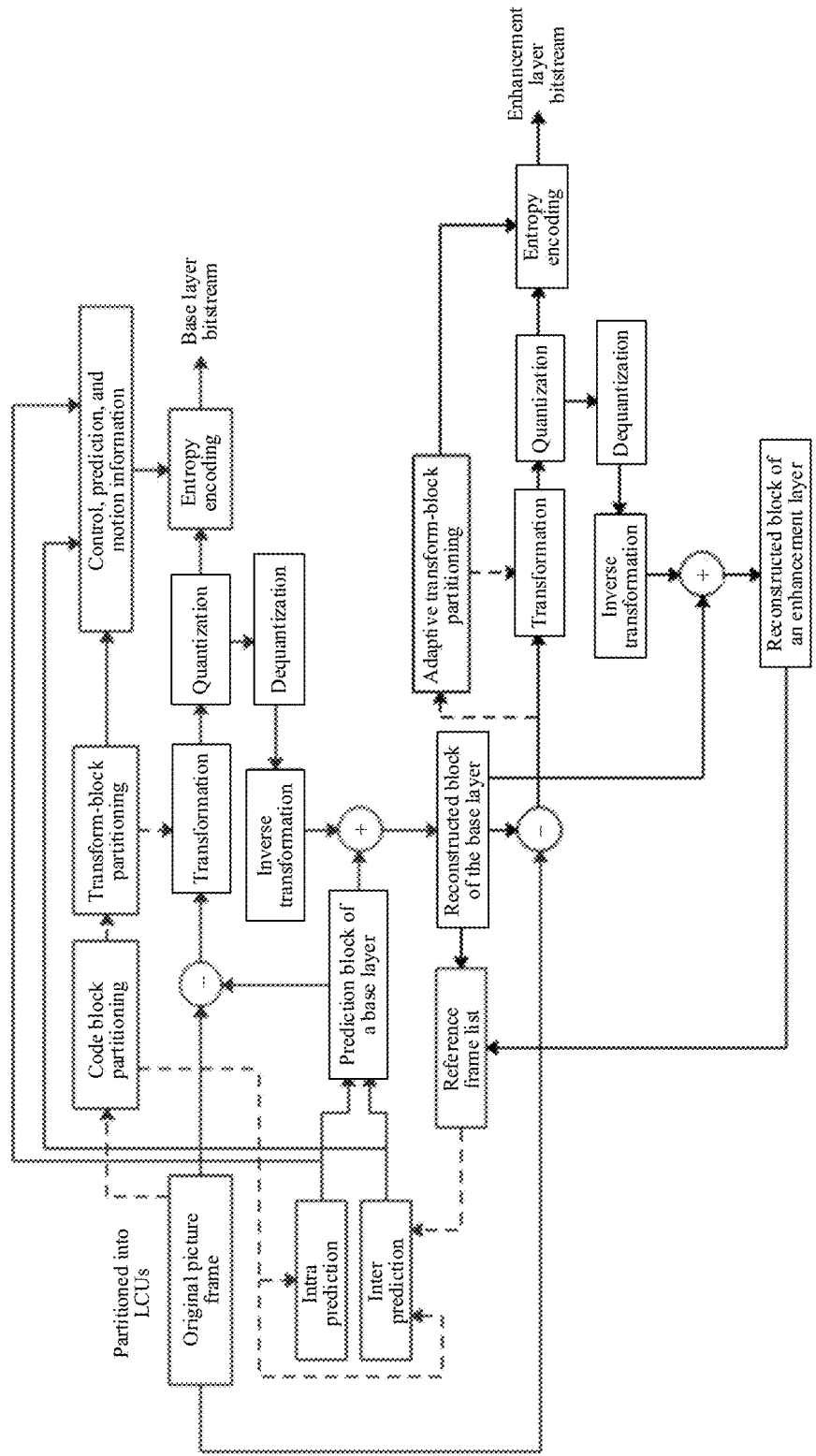
FIG. 12a and FIG. 12b are an example flowchart of a coding method for an enhancement layer according to this application.
Figure 12B:
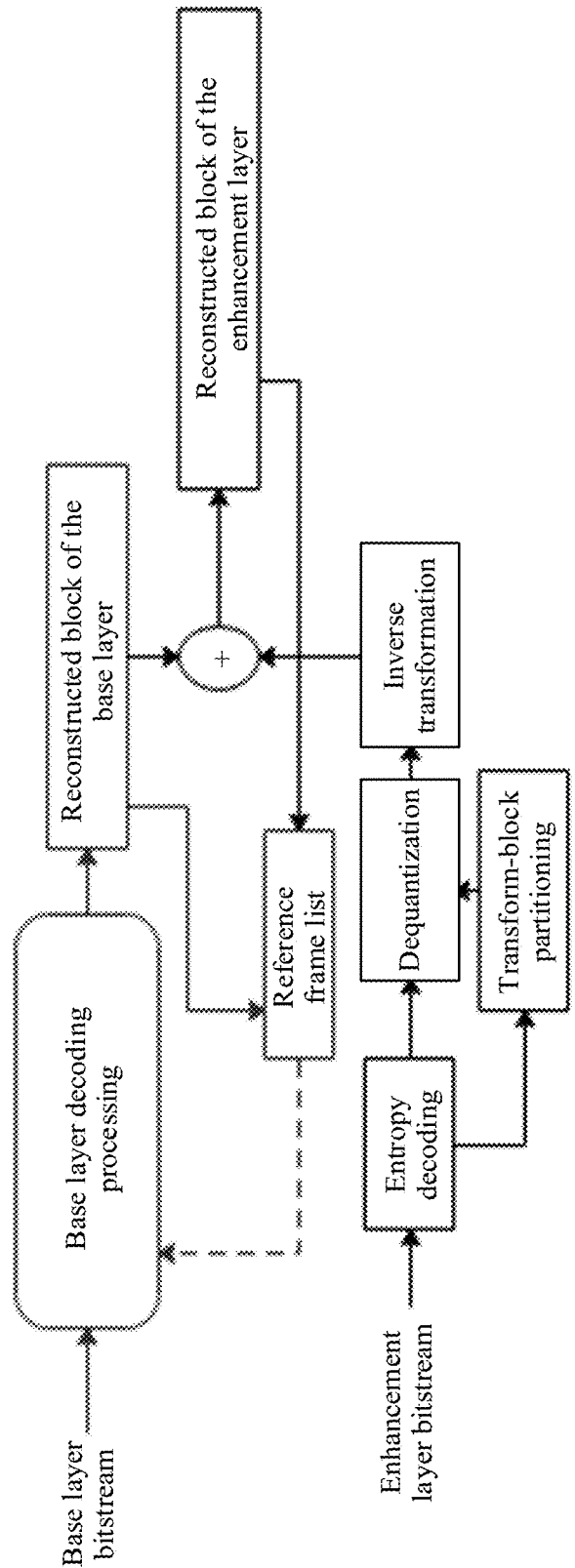

FIG. 12a and FIG. 12b are an example flowchart of a coding method for an enhancement layer according to this application. As shown in FIG. 12a and FIG. 12b, a picture block is layered by using quality scalability in this embodiment, where the picture block is an LCU.

Encoder Side:

Operation 1: An encoder obtains an original picture frame, encodes a base layer picture block based on an LCU, and obtains a reconstructed block of a base layer and a base layer bitstream of the LCU.

In this operation, an encoder that complies with the H.264/H.265 standard may be used to perform encoding, or another non-standard video encoder may be used to perform encoding. This is not limited in this application. In this embodiment, an example in which the encoder complies with the H.265 standard is used for description.

Picture partitioning is performed on the original image frame based on a size of the LCU. CU partitioning is performed on each LCU to obtain an optimal prediction unit (PU), and intra prediction or inter prediction is performed on the picture block to obtain a prediction block of the base layer. A residual quadtree (RQT) partitioning process may be performed in the CU, to obtain optimal TU partitioning. Transformation and quantization may be performed on a residual block of the base layer in the TU partitioning manner, and entropy encoding may be performed on the residual block together with control information, prediction information, motion information, and the like of the LCU to obtain the base layer bitstream. In the foregoing process of obtaining the optimal PU and the optimal TU partitioning, RDO processing may be used to achieve an optimal encoding compression ratio.

After dequantization and inverse transformation processes are performed on a quantized coefficient to obtain a reconstructed residual block of the base layer, summation is performed on corresponding pixels in the reconstructed residual block of the base layer and the prediction block of the base layer, to obtain the reconstructed block of the base layer. In this embodiment, the foregoing processes may be performed on each CU in the LCU, to obtain the reconstructed block of the base layer of the entire LCU.

In some embodiments, before operation 2 is performed, the encoder may perform further post-processing (for example, loop filtering) on the reconstructed block of the base layer of the LCU, and then use a post-processed block as the reconstructed block of the base layer of the LCU. Whether to perform the post-processing process is not limited herein. If the post-processing process is performed, information indicating post-processing may be encoded into the base layer bitstream.

Operation 2: Calculate a difference between corresponding pixels in the picture block corresponding to the LCU and the reconstructed block of the base layer to obtain a residual block of an enhancement layer of the LCU.

Operation 3: Send the residual block of the enhancement layer of the LCU to an enhancement-layer encoder for residual encoding.

In this operation, the LCU may be sent to the enhancement-layer encoder for processing after the residual block of the enhancement layer of the LCU is obtained. A pre-specified largest transform unit (LTU) is the LCU corresponding to the enhancement layer at a current corresponding location. Adaptive TU partitioning is performed to obtain TUs of different sizes. An example method may be an RDO method based on a residual quadtree (RQT). The method is described as follows.

(1) Both a width and a height of the LTU are set to L, and the LTU is an L×L square. A maximum partitioning depth Dmax obtained through RQT partitioning is pre-specified, where Dmax>0, and the LTU is a TU whose partitioning depth is equal to 0. In terms of specifying Dmax, a size of a minimum TU that can be used to perform transformation may be considered. A value of Dmax does not exceed a corresponding depth, relative to a size of the LTU, of the size of the minimum TU that can be used to perform transformation. For example, if values of a width and a height of the minimum TU that can be used to perform transformation process are both S, the partitioning depth corresponding to the minimum TU is $d=\log_2(\lfloor L/S \rfloor)$, where $\lfloor \, \rfloor$ indicates rounding down, that is, the value of Dmax is less than or equal to d.

(2) Quadtree partitioning is performed on the LTU based on grids to obtain four TUs of equal sizes, where the size of the TU is a quarter of the size of the LCU, and a depth of the TU is 1. It is determined whether the current TU depth is equal to the maximum partitioning depth Dmax, and if the current TU depth is equal to the maximum partitioning depth Dmax, partitioning is not further performed; or if the current TU depth is not equal to the maximum partitioning depth Dmax, a quadtree partitioning process is performed on each TU of the partitioning depth, to partition the TU into TUs of a smaller size, where a partitioning depth of the partitioned TU is the current depth value plus 1. This process is performed until TUs whose partitioning depths are equal to Dmax are obtained through quadtree partitioning.

(3) RDO selection is performed to obtain an optimal TU partitioning manner. Starting from a TU whose depth is Dmax−1, transformation and quantization are performed on a residual block of an enhancement layer at a location of the TU to obtain a quantized coefficient, and the quantized coefficient is precoded to obtain a code word length R. In addition, dequantization and inverse transformation processes are performed on the quantized coefficient to obtain a reconstructed residual block, a sum of squared differences (SSD) between the reconstructed block and the residual block is calculated in the TU to obtain a distortion value Dr, and a loss estimate C1 may be obtained based on R and Dr. C1 represents a loss estimate caused when quadtree partitioning is not performed on the TU. Quadtree partitioning is performed on the TU to obtain four TUs whose partitioning depths are Dmax, and calculation is performed on each TU in a same manner as that used for a case in which the partitioning depth is Dmax−1, to obtain a sum of loss estimates of the four TUs, which is denoted as C2 and represents a loss estimate caused when quadtree partitioning is performed on the TU. Values of C1 and C2 are compared, a smaller loss estimate C3=min(C1,C2) is selected as an optimal loss value of the TU of the partitioning depth Dmax−1, and a partitioning manner corresponding to the smaller loss estimate is used. According to this process, calculation is performed on a TU with a small partitioning depth by analogy, optimal loss values obtained by performing quadtree partitioning on the TU and obtained by not performing quadtree partitioning on the TU are separately calculated, a smaller loss value is obtained through comparison as an optimal loss of the TU, and partitioning is performed in a partitioning manner corresponding to the smaller loss value. An optimal TU partitioning manner of the LTU can be obtained until determining whether quadtree partitioning is to be performed on the LTU is completed.

After the optimal TU partitioning manner of the LTU is obtained, transformation and quantization are performed on the residual block of the enhancement layer of the LTU in each TU block in the partitioning manner to obtain a quantized coefficient, and entropy encoding is performed on the quantized coefficient together with partitioning information of the LTU to obtain an enhancement layer bitstream of the LTU. In addition, dequantization and inverse transformation processes are performed on the quantized coefficient, to obtain an encoding-distorted reconstructed block of the residual block of the enhancement layer of the LTU. The picture is superimposed on the reconstructed block of the base layer of the LCU at the corresponding location of the LTU, to obtain a reconstructed block of the enhancement layer corresponding to the LTU.

Herein, the enhancement layer bitstream of the LTU may be encoded by using a syntax element arrangement and encoding mode of some bitstreams of a TU in an existing coding standard.

In addition, the adaptive TU partitioning manner for the LTU may not be limited to the RQT manner, other methods in which adaptive TU partitioning can be performed based on the residual block of the enhancement layer are also applicable to this specification, and there may be another corresponding encoding method used for encoding partitioning information of the TU into the enhancement layer bitstream. Sizes of TU blocks in the LTU may be different from each other after partitioning is performed.

Operation 4: Complete processing on all LCUs of the entire source picture by using operation 1 to operation 3, to obtain the reconstructed block of the base layer and the reconstructed block of the enhancement layer of the entire picture and the base layer bitstream and the enhancement layer bitstream of the entire picture. These reconstructed blocks may be placed in a reference frame list for reference of subsequent picture frames in time domain. After the reconstructed block of the base layer or the enhancement layer is obtained, further post-processing (for example, loop filtering) may be performed, and a post-processed block is placed into the reference frame list. This is not limited herein. If post-processing is performed, information indicating that the post-processed block is to be placed into the reference frame list after post-processing is performed may be encoded into a corresponding bitstream.

Herein, information indicating that the residual block of the enhancement layer is no longer partitioned in the LCU or CU partitioning manner of the base layer may be further encoded into the bitstream, so that a decoder side performs enhancement layer processing after decoding.

Operation 5: Repeat operation 1 to operation 4 to encode subsequent frames of pictures in a picture sequence until encoding of the entire picture sequence is completed.

Decoder Side:

Operation 1: Obtain the base layer bitstream, and send the base layer bitstream to a base-layer decoder for decoding, to obtain the reconstructed block of the base layer.

In this operation, the base-layer decoder is a decoder that is corresponding to a base layer bitstream encoding rule and that can decode the base layer bitstream. Herein, a decoder that complies with the H.264/H.265 standard may be used to perform decoding, or another non-standard video decoder may be used to perform decoding. This is not limited herein. In this embodiment, an example in which the base-layer decoder is a decoder that complies with the H.265 coding standard is used for description.

Entropy decoding is performed after the bitstream is sent to the decoder. In this way, a code block partitioning information, transform-block partitioning information, the control information, the prediction information, and the motion information of the LCU may be obtained, and intra prediction and inter prediction are performed based on these pieces of information to obtain a prediction block of the LCU. In addition, residual information may be obtained, and a residual picture of the LCU may be obtained by performing dequantization and inverse transformation processes based on the transform-block partitioning information obtained through decoding. The prediction block is superimposed on the residual picture, to obtain the reconstructed block of the base layer corresponding to the LCU. The process is repeated until decoding of all the LCUs of the full-frame picture is completed, to obtain the reconstructed block of the entire picture.

If information that is to be used for performing post-processing (for example, loop filtering) in the reconstructed block is obtained through decoding, a corresponding post-processing process is performed after the reconstructed block is obtained, so that the post-processing process is corresponding to an encoding process.

After this operation is completed, the reconstructed block of the base layer is obtained.

Operation 2: Obtain the enhancement layer bitstream, and send the enhancement layer bitstream to an enhancement-layer decoder for decoding, to obtain a reconstructed residual block of the enhancement layer and further obtain the reconstructed block of the enhancement layer.

In this operation, entropy decoding is performed after the bitstream is sent to the decoder. In this way, the partitioning information of the LTU and the residual information of the LTU are obtained, and dequantization and inverse transformation are performed on the residual information based on the LTU partitioning, to obtain a reconstructed residual block corresponding to the LTU. The process is repeated until decoding of the LTUs of the full-frame picture is completed, to obtain the reconstructed residual block of the enhancement layer. The reconstructed block of the base layer and the reconstructed residual block of the enhancement layer are added to obtain a reconstructed block.

If information indicating that the enhancement layer is no longer partitioned in the LCU or CU partitioning manner of the base layer exists in the bitstream, the information may be obtained through entropy decoding first, and then operation 2 is performed.

In this operation, if information that is to be used for performing post-processing (for example, loop filtering) in the reconstructed block is obtained through decoding, a corresponding post-processing process is performed after the reconstructed block is obtained, so that the post-processing process is corresponding to the encoding process.

After this operation is completed, the obtained reconstructed block is the reconstructed block of the enhancement layer.

Operation 3: Place the reconstructed block of the base layer and the reconstructed block of the enhancement layer into the reference frame list for reference of subsequent frames of pictures in time domain.

If information indicating that the post-processed block is to be placed into the reference frame list after post-processing (for example, loop filtering) is performed on the reconstructed block exists in the bitstream, the information may be obtained through entropy decoding, post-processing is performed on the reconstructed block of the base layer and the reconstructed block of the enhancement layer, and then reconstructed blocks obtained through post-processing are placed into the reference frame list, so that the post-processing process is corresponding to the encoding process.

Operation 4: Repeat operation 1 to operation 3 until decoding of the entire picture sequence is completed.

In this embodiment, a prediction process is no longer performed on the enhancement layer, but adaptive partitioning and transform coding are directly performed on the residual block of the enhancement layer. Compared with a coding mode that requires prediction, this embodiment can improve a coding speed, reduce a processing process of hardware, and reduce processing costs of the hardware. For the residual block of the enhancement layer, the TU partitioning manner for the base layer is no longer used, but a more suitable TU partitioning manner is adaptively selected for coding, so that compression efficiency of the residual block can be improved more effectively. In addition, after the LCU corresponding to the base layer is processed, the obtained residual block of the LCU can be directly sent to the enhancement layer for subsequent separate processing, and a next LCU of the base layer can be processed concurrently. Therefore, this manner is more convenient for the processing process implemented by using the hardware, and can make the processing process more efficient.

In some embodiments, the base layer and the enhancement layer may be processed based on a size of the full-frame picture, instead of being processed based on the size of the LCU in the foregoing embodiments.

Embodiment 2

Figure 13A:
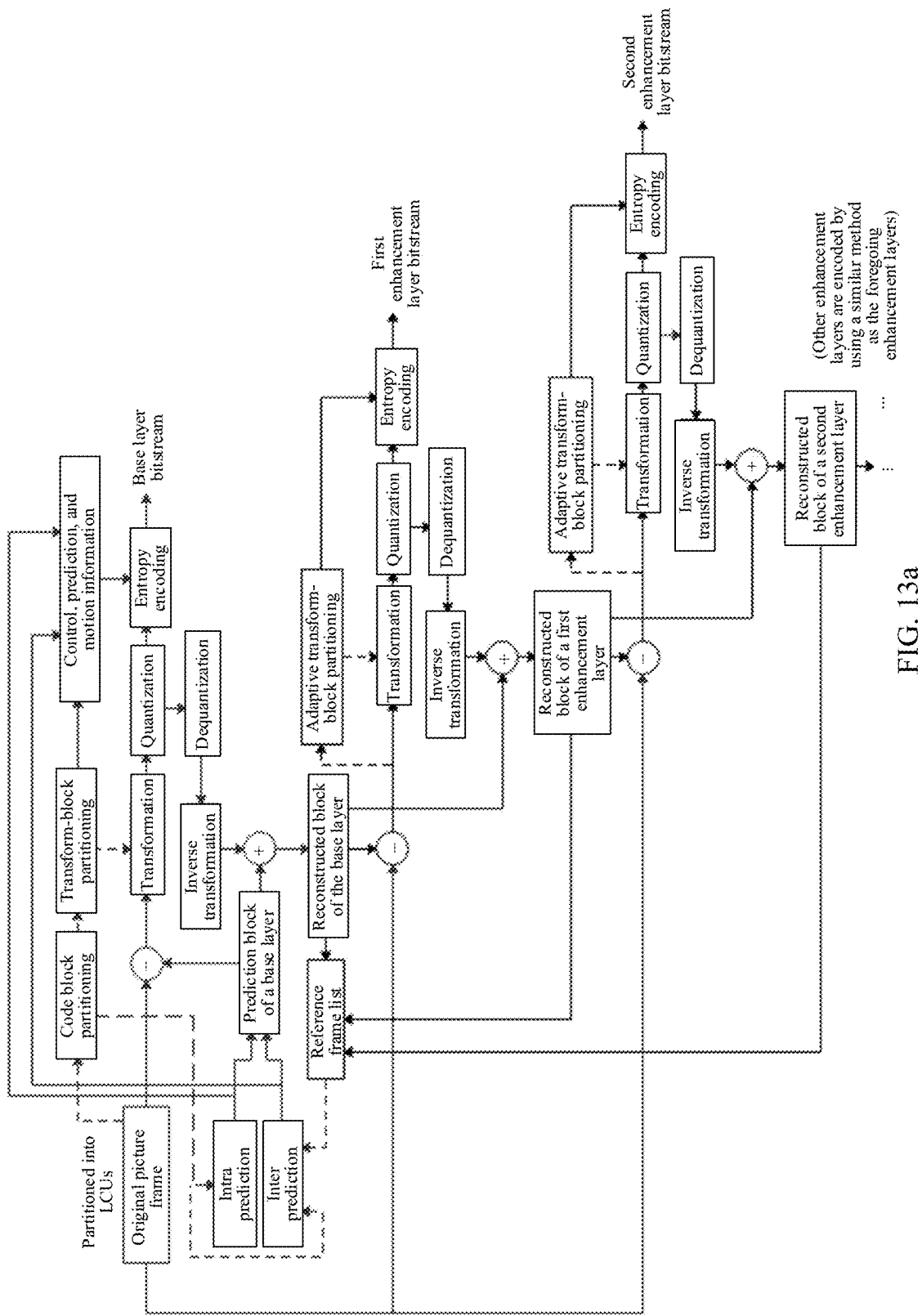
FIG. 13a and FIG. 13b are an example flowchart of a coding method for an enhancement layer according to this application.
Figure 13B:
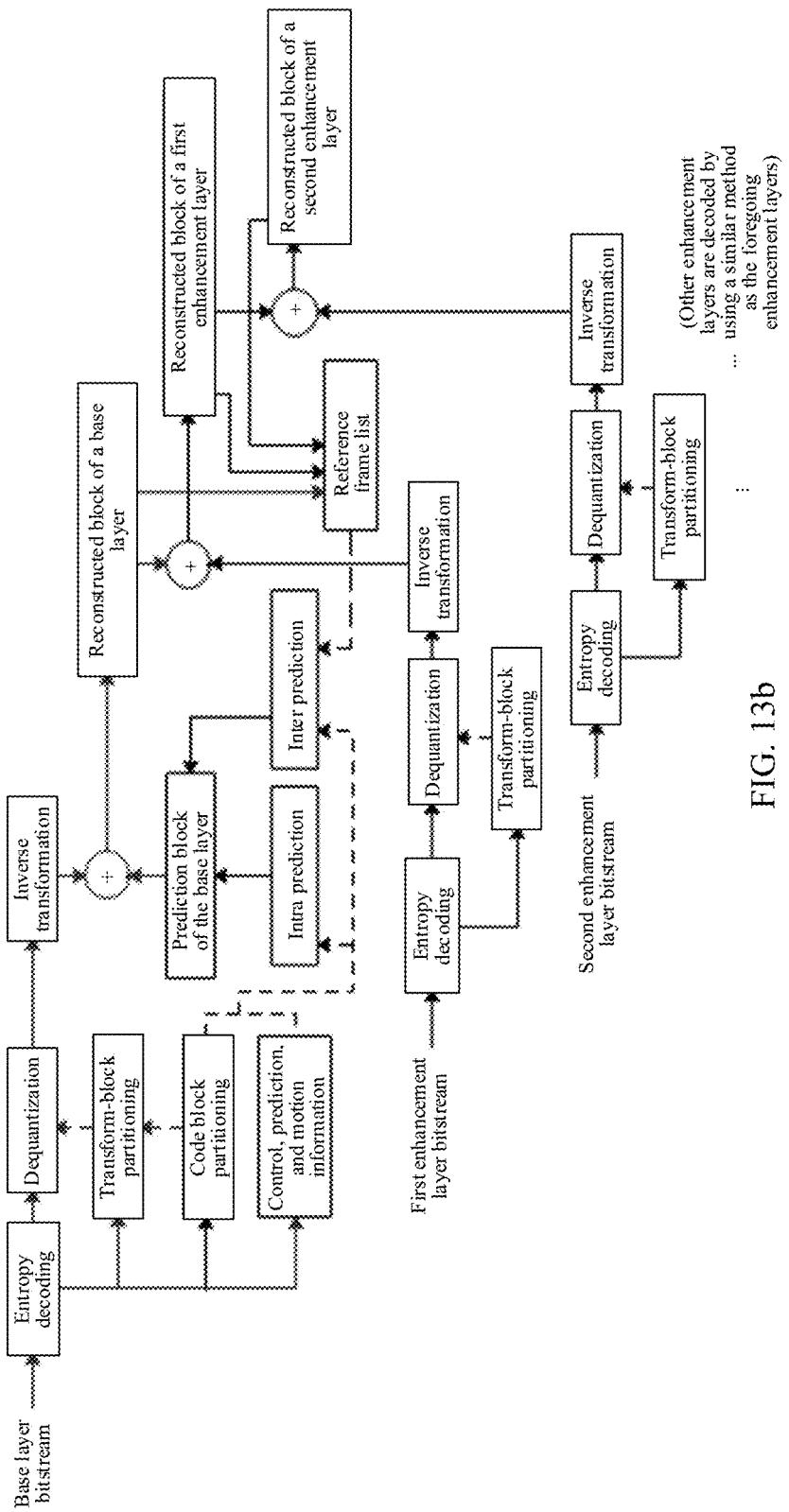

FIG. 13a and FIG. 13b are an example flowchart of a coding method for an enhancement layer according to this application. As shown in FIG. 13a and FIG. 13b, a picture block is layered by using quality scalability in this embodiment to obtain at least two enhancement layers, where the picture block is an LCU. This embodiment is an extension of Embodiment 1, that is, describes encoding and decoding processing methods when there are more than one enhancement layer.

Encoder Side:

Operation 1 is the same as operation 1 performed by the encoder side in Embodiment 1.

Operation 2 is the same as operation 2 performed by the encoder side in Embodiment 1.

Operation 3 is the same as operation 3 performed by the encoder side in Embodiment 1.

In some embodiments, before operation 4 is performed, the encoder may further perform post-processing (for example, loop filtering) on the reconstructed block of the base layer of the LCU, and then use a post-processed block as a reconstructed block of a first enhancement layer of the LCU. Whether to perform the post-processing process is not limited herein. If the post-processing process is performed, information indicating post-processing may be added to a first enhancement layer bitstream.

Operation 4: Calculate a difference between corresponding pixels in the picture block corresponding to the LCU and the reconstructed block of the first enhancement layer to obtain a residual block of a second enhancement layer of the LCU.

Operation 5: Send the residual block of the second enhancement layer obtained in operation 4 to a second enhancement-layer encoder for residual encoding. The encoding operation is the same as operation 3. A difference from operation 3 lies in that an encoding-distorted reconstructed block of the residual block of the second enhancement layer is superimposed on the reconstructed block of the first enhancement layer to obtain a reconstructed block of the second enhancement layer corresponding to the LCU.

Herein, alternatively, further post-processing (for example, loop filtering) may be performed on a superimposed picture, and a post-processed picture is then used as a reconstructed block of the second enhancement layer of the LCU. Whether to perform the post-processing process is not limited herein. If the post-processing process is performed, information indicating post-processing may be added to a second enhancement layer bitstream.

Operation 6: Repeat operation 4 and operation 5, calculate a difference between pixels in the picture block corresponding to the LCU and a reconstructed block of a current enhancement layer to obtain a residual block of a higher-layer enhancement layer corresponding to the LCU, and send the residual block to the enhancement-layer encoder of the corresponding layer for residual encoding to obtain a reconstructed block of a higher enhancement layer and a higher-layer enhancement layer bitstream.

Operation 7: Repeat operation 1 to operation 6, complete processing on all LCUs of the entire source picture, to obtain the reconstructed block of the base layer and reconstructed blocks of all enhancement layers of the entire picture and the base layer bitstream and all enhancement layer bitstreams of the entire picture. These reconstructed blocks may be placed in a reference frame list for reference of subsequent frames of pictures in time domain. After the reconstructed block of the base layer or the enhancement layers is obtained, further post-processing (for example, loop filtering) may be performed, and a post-processed block is placed into the reference frame list. This is not limited herein. If post-processing is performed, information indicating that the post-processed block is to be placed into the reference frame list after post-processing is performed may be encoded into a corresponding bitstream.

Herein, information indicating that the enhancement layers are no longer partitioned in the LCU or CU partitioning manner of the base layer may be further encoded into the bitstream, or information indicating that a higher-layer enhancement layer is no longer partitioned in the LCU partitioning manner of the base layer or an LTU partitioning manner of a lower-layer enhancement layer may be further encoded into the bitstream, so that a decoder side performs enhancement layer processing after decoding.

Operation 8: Repeat operation 1 to operation 7 to encode subsequent frames of pictures in a picture sequence until encoding of the entire picture sequence is completed.

Decoder Side:

Operation 1: Obtain the base layer bitstream, and send the base layer bitstream to a base-layer decoder for decoding, to obtain the reconstructed block of the base layer.

In this operation, the base-layer decoder is a decoder that is corresponding to a base layer bitstream encoding rule and that can decode the base layer bitstream. Herein, a decoder that complies with the H.264/H.265 standard may be used to perform decoding, or another non-standard video decoder may be used to perform decoding. This is not limited herein. In this embodiment, an example in which the base-layer decoder is a decoder that complies with the H.265 coding standard is used for description.

Entropy decoding is performed after the bitstream is sent to the decoder. In this way, a code block partitioning information, transform-block partitioning information, the control information, the prediction information, and the motion information of the LCU may be obtained, and intra prediction and inter prediction are performed based on these pieces of information to obtain a prediction block of the LCU. In addition, residual information may be obtained, and a residual picture of the LCU may be obtained by performing dequantization and inverse transformation processes based on the transform-block partitioning information obtained through decoding. The prediction block is superimposed on the residual picture, to obtain the reconstructed block of the base layer corresponding to the LCU. The process is repeated until decoding of all the LCUs of the full-frame picture is completed, to obtain the reconstructed block of the entire picture.

If information that is to be used for performing post-processing (for example, loop filtering) in the reconstructed block is obtained through decoding, a corresponding post-processing process is performed after the reconstructed block is obtained, so that the post-processing process is corresponding to an encoding process.

After this operation is completed, the reconstructed block of the base layer is obtained.

Operation 2: Obtain the first enhancement layer bitstream, and send the first enhancement layer bitstream to a first enhancement-layer decoder for decoding, to obtain a reconstructed residual block of the first enhancement layer and further obtain the reconstructed block of the first enhancement layer.

In this operation, entropy decoding is performed after the bitstream is sent to the decoder. In this way, the partitioning information of the LTU and the residual information of the LTU are obtained, and dequantization and inverse transformation are performed on the residual information based on the LTU partitioning, to obtain a reconstructed residual block corresponding to the LTU. The process is repeated until decoding of the LTUs of the full-frame picture is completed, to obtain the reconstructed residual block of the first enhancement layer. The reconstructed block of the base layer and the reconstructed residual block of the first enhancement layer are added to obtain a reconstructed block.

If information indicating that the first enhancement layer is no longer partitioned in the LCU or CU partitioning manner of the base layer exists in the bitstream, the information may be obtained through entropy decoding first, and then operation 2 is performed.

In this operation, if information that is to be used for performing post-processing (for example, loop filtering) in the reconstructed block is obtained through decoding, a corresponding post-processing process is performed after the reconstructed block is obtained, so that the post-processing process is corresponding to the encoding process.

After this operation is completed, the obtained reconstructed block is the reconstructed block of the first enhancement layer.

Operation 3: Obtain the second enhancement layer bitstream, and send the second enhancement layer bitstream to the enhancement-layer decoder for decoding, to obtain a reconstructed residual block of the second enhancement layer and further obtain the reconstructed block of the second enhancement layer.

This operation is similar to operation 2, and a difference lies in that the reconstructed block of the first enhancement layer is added to the reconstructed residual block of the second enhancement layer to obtain the reconstructed block.

If information indicating that the enhancement layers are no longer partitioned in the LCU or CU partitioning manner of the base layer or information indicating that a higher-layer enhancement layer is no longer partitioned in the LCU partitioning manner of the base layer or an LTU partitioning manner of a lower-layer enhancement layer exists in the bitstream, the information may be obtained through entropy decoding, and then operation 3 is performed.

In this operation, if information that is to be used for performing post-processing (for example, loop filtering) in the reconstructed block is obtained through decoding, an indicated post-processing process is performed after the reconstructed block is obtained, so that the post-processing process is corresponding to the encoding process.

After this operation is completed, the obtained reconstructed block is the reconstructed block of the second enhancement layer.

Operation 4: Repeat operation 3, obtain a higher-layer enhancement layer bitstream, and send the higher-layer enhancement layer bitstream to the enhancement-layer decoder for decoding, to obtain a reconstructed residual block of a higher-layer enhancement layer and further obtain a reconstructed block of the higher-layer enhancement layer, until decoding of all enhancement layer bitstreams of the current frame is completed.

Operation 5: Place the reconstructed block of the base layer and the reconstructed blocks of all the enhancement layers into the reference frame list for reference of subsequent frames of pictures in time domain.

If information indicating that the post-processed block is to be placed into the reference frame list after post-processing (for example, loop filtering) is performed on the reconstructed block exists in the bitstream, the information may be obtained through entropy decoding, post-processing is performed on the reconstructed block of the base layer and the reconstructed blocks of the enhancement layers, and then reconstructed blocks obtained through post-processing are placed into the reference frame list, so that the post-processing process is corresponding to the encoding process.

Operation 6: Repeat operation 1 to operation 5 until decoding of the entire picture sequence is completed.

Embodiment 3

Figure 14A:
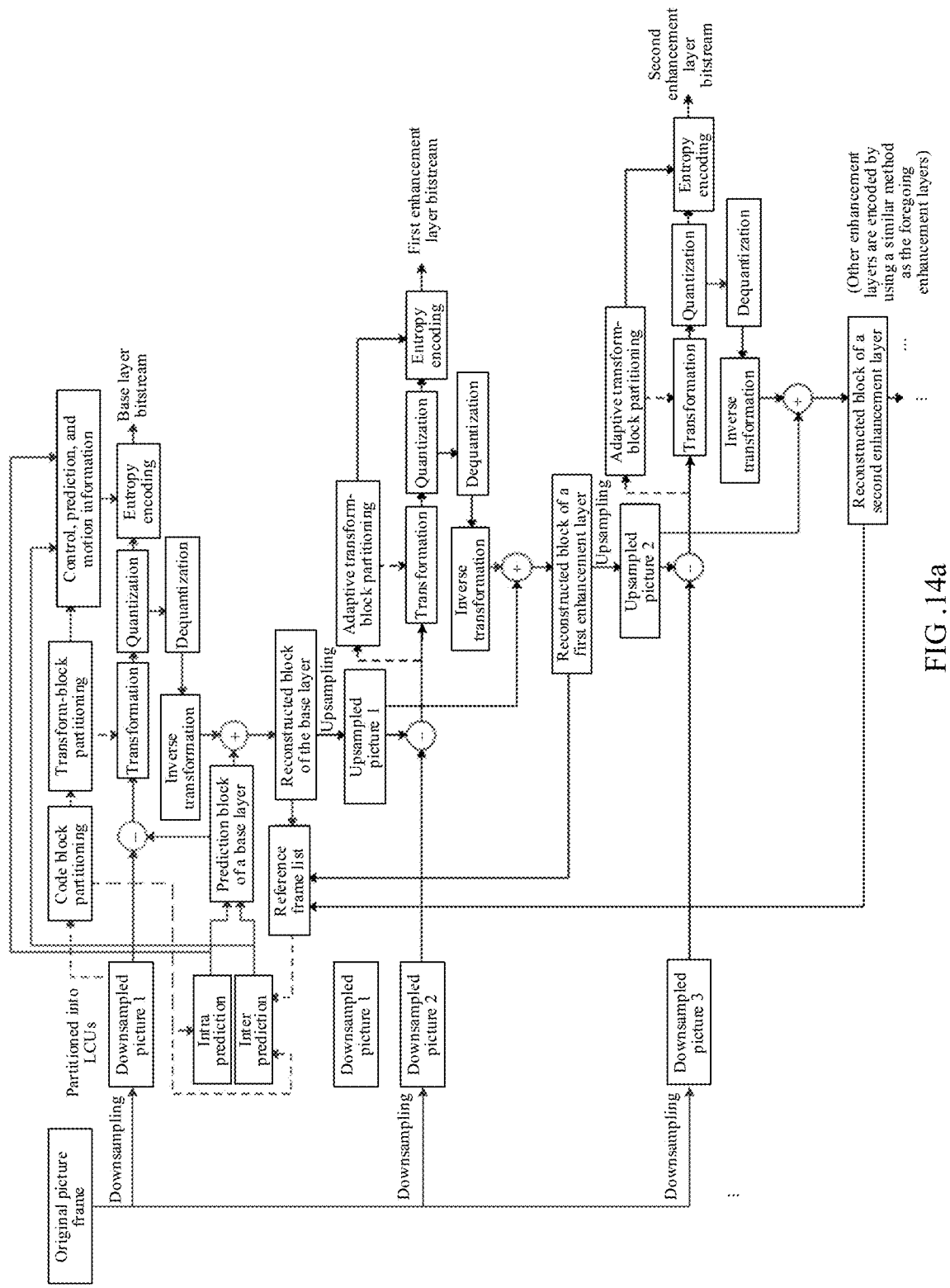
FIG. 14a and FIG. 14b are an example flowchart of a coding method for an enhancement layer according to this application.
Figure 14B:
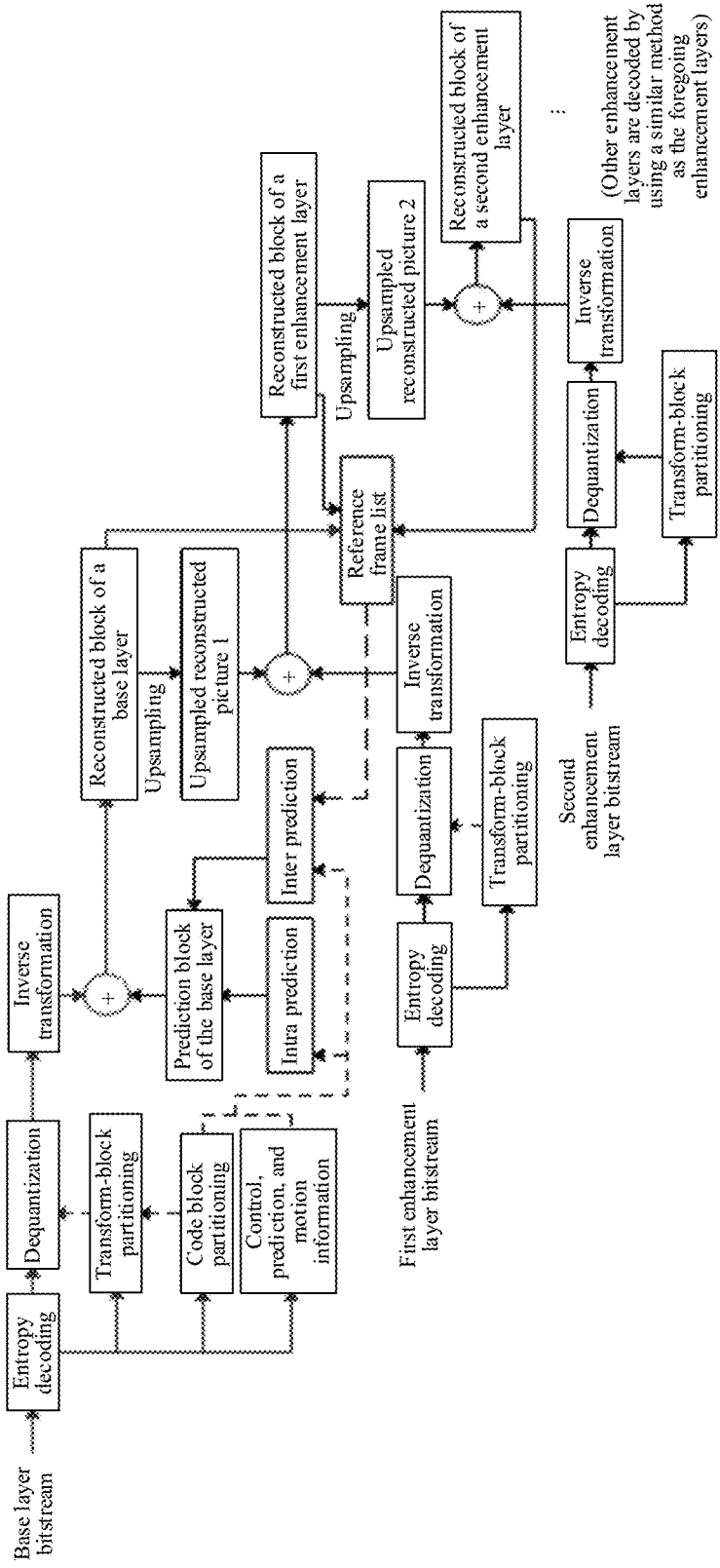

FIG. 14a and FIG. 14b are an example flowchart of a coding method for an enhancement layer according to this application. As shown in FIG. 14a and FIG. 14b, a picture block is layered by using spatial scalability in this embodiment to obtain at least two enhancement layers, where the picture block is an LCU.

Encoder Side:

Operation 1: An encoder performs downsampling on an original picture by using a resolution 1 (a width and a height of a picture are W1×H1), to generate a downsampled picture 1. Herein, the resolution 1 is less than a resolution of an original picture block, and a sampling manner may be any manner, for example, linear interpolation or bicubic interpolation. This is not limited herein.

Operation 2: Send the downsampled picture 1 to a base-layer encoder for encoding, where the encoding operation is the same as operation 1 in Embodiment 1.

Operation 3: Perform downsampling on the original picture by using a picture resolution 2 (a width and a height of a picture are W2×H2), to generate a downsampled picture 2, where the resolution 2 is higher than the resolution 1. A scaling ratio of the downsampled picture 2 to the downsampled picture 1 is Sw1=W2/W1 in width and is Sh1=H2/H1 in height.

Operation 4: Perform upsampling on a reconstructed block of a base layer of the LCU, to obtain a reconstructed block whose size is the same as that of an LTU of a first enhancement layer and further obtain a residual block of the first enhancement layer corresponding to the LTU.

The size of the LTU of the first enhancement layer is set to a size of the LCU corresponding to the base layer multiplied by the scaling ratio Sw1×Sh1, to obtain an LTU of a size Lw1×Lh1, where Lw1=L×Sw1, and Lh1=L×Sh1 herein. Upsampling is performed on the reconstructed block, obtained in operation 2, of the base layer corresponding to the LCU to obtain the size Lw1×Lh1, to obtain the reconstructed block of the base layer whose size is the same as that of the LTU of the first enhancement layer. In addition, an LTU source picture at a same location as the reconstructed block of the base layer is selected from the downsampled picture 2. A difference between the source picture and the reconstructed block of the base layer is calculated to obtain the residual block in the LTU of the first enhancement layer. Herein, the upsampling method may be corresponding to or may not be corresponding to the downsampling method in operation 1. This is not limited herein.

Operation 5: Send the residual block in the LTU of the first enhancement layer to a first enhancement-layer encoder for residual encoding. The encoding operation is the same as operation 3 in Embodiment 1.

Operation 6: Perform downsampling on the original picture by using a picture resolution 3 (a width and a height of a picture are W3×H3), to generate a downsampled picture 3, where the resolution 3 is higher than the resolution 2. A scaling ratio of the downsampled picture 3 to the downsampled picture 2 is Sw2=W3/W2 in width and is Sh2=H3/H2 in height.

Operation 7: Perform upsampling on a reconstructed block of the LTU of the first enhancement layer, to obtain a reconstructed block whose size is the same as that of an LTU of a second enhancement layer and further obtain a residual block of the second enhancement layer corresponding to the LTU.

This operation is similar to operation 4. The size of the LTU of the second enhancement layer is set to the size of the LTU corresponding to the first enhancement layer multiplied by the scaling ratio Sw2×Sh2. Upsampling is performed on the reconstructed block of the LTU of the first enhancement layer to obtain the reconstructed block whose size is the same as that of the LTU of the second enhancement layer. An LTU source picture at a same location is selected from the downsampled picture 3. A difference between the source picture and the reconstructed block is calculated to obtain the residual block in the LTU of the second enhancement layer.

Operation 8: Send the residual block in the LTU of the second enhancement layer to a second enhancement-layer encoder for residual encoding. The encoding operation is the same as operation 3 in Embodiment 1.

Operation 9: Repeat operation 6 to operation 8 until reconstructed blocks and enhancement layer bitstreams corresponding to LTUs of all enhancement layers are obtained.

Operation 10: Repeat operation 1 to operation 9, and complete processing on all LTUs of the downsampled pictures input from all layers, to obtain the reconstructed block of the base layer and reconstructed blocks of all enhancement layers of the entire picture and the base layer bitstream and all enhancement layer bitstreams. These reconstructed blocks may be placed in a reference frame list for reference of subsequent frames of pictures in time domain. After the reconstructed block of the base layer or the enhancement layers is obtained, further post-processing (for example, loop filtering) may be performed, and a post-processed block is placed into the reference frame list. This is not limited herein. If post-processing is performed, information indicating that the post-processed block is to be placed into the reference frame list after post-processing is performed may be encoded into a corresponding bitstream.

Herein, resolution information of the downsampled pictures input from all the layers is encoded into a bitstream, so that a decoder performs processing on all the layers. In addition, information about a method for performing upsampling on each layer may be further encoded into a bitstream.

Operation 11: Repeat operation 1 to operation 10 to encode subsequent frames of pictures in a picture sequence until encoding of the entire picture sequence is completed.

Decoder Side:

Operation 1 is the same as operation 1 performed by the decoder side in Embodiment 1.

Operation 2: Obtain a first enhancement layer bitstream of the picture block being processed, and send the first enhancement layer bitstream to an enhancement-layer decoder for decoding, to obtain a reconstructed residual block of the first enhancement layer. This operation is the same as the process of obtaining the reconstructed residual block of the first enhancement layer in operation 2 in Embodiment 1.

Operation 3: Based on a resolution of the residual block of the first enhancement layer, perform upsampling on the reconstructed block of the base layer to ensure that a resolution of the reconstructed block of the base layer is the same as the resolution of the residual block of the first enhancement layer. The reconstructed block of the base layer and the residual block of the first enhancement layer are added to obtain a reconstructed block of the first enhancement layer.

If information about the upsampling method exists in the bitstream, the information may be obtained through entropy decoding first. In this operation, upsampling is performed on the reconstructed block of the base layer based on the obtained upsampling information.

Operation 4: Obtain a second enhancement layer bitstream of the picture block being processed, and send the second enhancement layer bitstream to the enhancement-layer decoder for decoding, to obtain a reconstructed residual block of the second enhancement layer. This operation is the same as the process of obtaining the residual block of the first enhancement layer.

Operation 5: Based on a resolution of the residual block of the second enhancement layer, perform upsampling on the reconstructed block of the first enhancement layer to ensure that a resolution of the reconstructed block of the first enhancement layer is the same as the resolution of the residual block of the second enhancement layer. The reconstructed block of the first enhancement layer and the residual block of the second enhancement layer are added to obtain a reconstructed block of the second enhancement layer.

If information about the upsampling method exists in the bitstream, the information may be obtained through entropy decoding first. In this operation, upsampling is performed on the reconstructed block of the first enhancement layer based on the upsampling information.

Operation 6: Repeat operation 4 and operation 5, obtain a higher-layer enhancement layer bitstream, send the higher-layer enhancement layer bitstream to the enhancement-layer decoder for decoding, to obtain a reconstructed residual block of a higher-layer enhancement layer, and add the reconstructed residual block of the higher-layer enhancement layer to a picture obtained by upsampling on a reconstructed block of a lower-layer enhancement layer, to obtain a reconstructed block of the higher-layer enhancement layer, until decoding of all enhancement layer bitstreams of the current frame is completed.

Operation 7 is the same as operation 3 performed by the decoder side in Embodiment 1.

Operation 8: Repeat operation 1 to operation 7 until decoding of the entire picture sequence is completed.

Embodiment 4

Figure 15:
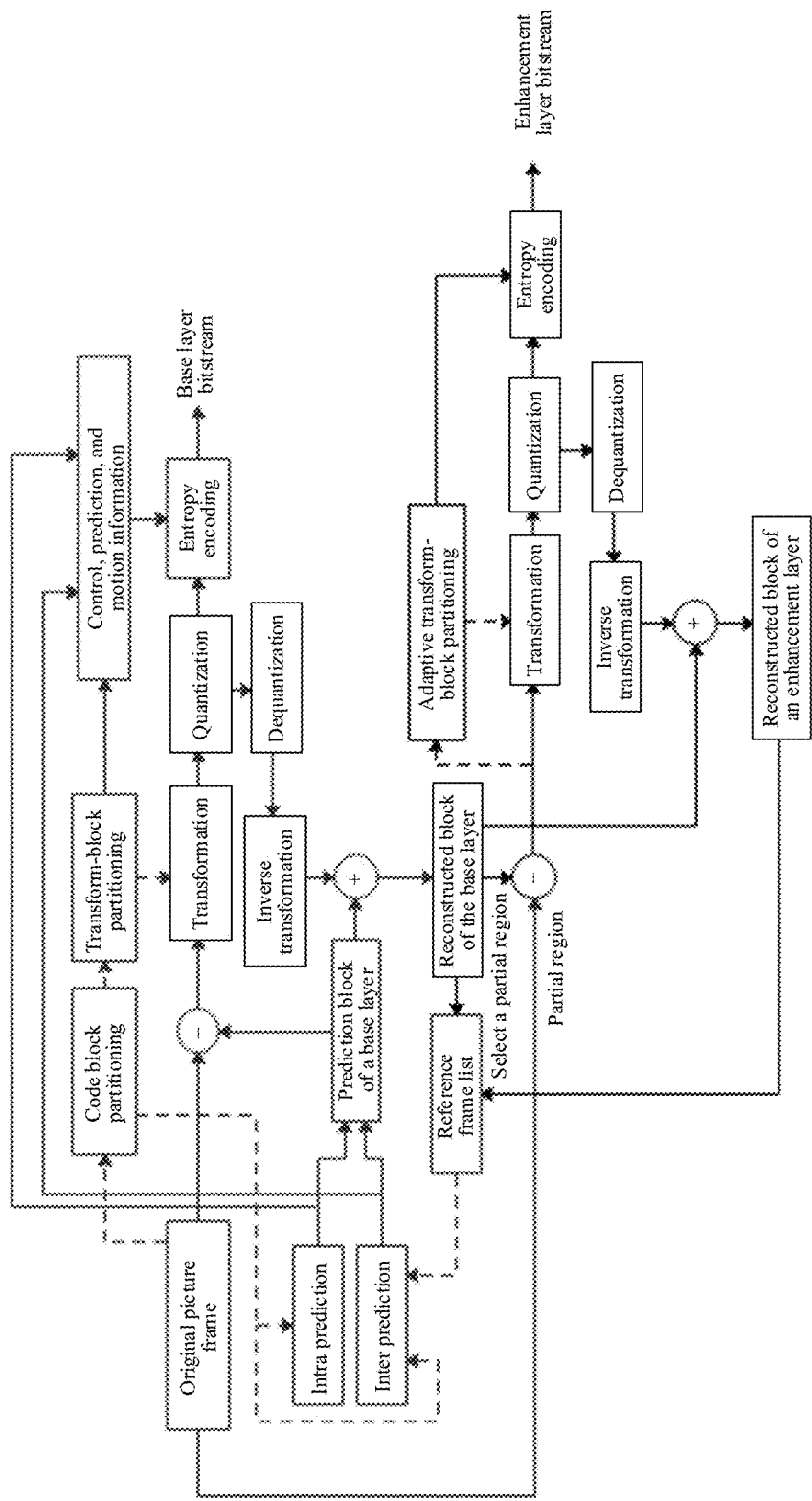
FIG. 15 is an example flowchart of a coding method for an enhancement layer according to this application.

FIG. 15 is an example flowchart of a coding method for an enhancement layer according to this application. As shown in FIG. 15, a picture block is layered by using quality scalability in this embodiment. At a base layer, a full-frame picture is processed; and at an enhancement layer, a partial region (for example, a ROI in the full-frame picture) is selected from the full-frame picture, and the partial region is processed. A difference from Embodiment 1 lies in that, in this embodiment, a partial region is selected from an original picture frame, a corresponding partial region is selected from a reconstructed block of the base layer, and a difference between corresponding pixels in the two partial regions is calculated to obtain a residual block of the partial region, and the residual block is sent to an enhancement-layer encoder as a residual block of the enhancement layer.

Encoder Side:

Operation 1 is the same as operation 1 performed by the encoder side in Embodiment 1.

Operation 2: Perform a difference operation between a partial region (for example, a ROI) of an original picture frame and a corresponding partial region of a reconstructed block of a base layer to obtain a residual block of an enhancement layer of the partial region.

It should be noted that there may be one or more partial regions. This is not specifically limited in this application. If there are a plurality of partial regions, the following operations are separately performed for each partial region.

Operation 3 is the same as operation 3 performed by the encoder side in Embodiment 1. A difference lies in that: After dequantization and inverse transformation are performed on a quantized coefficient, a reconstructed residual block of the enhancement layer of the partial region is obtained, and the reconstructed residual block of the enhancement layer of the partial region is superimposed on the reconstructed block of the base layer of the corresponding partial region to obtain a reconstructed block of the enhancement layer of the partial region. Location and size information of the partial region may be encoded into a bitstream.

Operation 4 is the same as operation 4 performed by the encoder side in Embodiment 1.

Operation 5 is the same as operation 5 performed by the encoder side in Embodiment 1.

Decoder Side:

Operation 1 is the same as operation 1 performed by the decoder side in Embodiment 1.

Operation 2 is the same as operation 2 performed by the decoder side in Embodiment 1. A difference lies in that: After the reconstructed residual block of the enhancement layer of the partial region is obtained, and the reconstructed residual block of the enhancement layer is superimposed on the reconstructed block of the base layer of the corresponding partial region to obtain the reconstructed block of the enhancement layer of the partial region.

If the location and size information of the partial region exists in the bitstream, the location and size information is obtained through decoding first, the partial region is found in the reconstructed block of the base layer based on the location and size information, and then the reconstructed residual block of the enhancement layer of the partial region is superimposed on the reconstructed block of the base layer.

Operation 3 is the same as operation 3 performed by the decoder side in Embodiment 1.

Operation 4 is the same as operation 4 performed by the decoder side in Embodiment 1.

Embodiment 5

A picture block is layered by using hybrid scalability, that is, quality scalability and spatial scalability, in this embodiment to obtain at least two enhancement layers, where the picture block is an LCU.

It can be learned from the layering structures in Embodiment 2 and Embodiment 3 that the enhancement-layer encoders used for the residual blocks of the enhancement layers in case of quality scalability are the same as those in case of spatial scalability, and the residual blocks are encoded based on adaptive TU partitioning for the two layering structures. The encoding processes have been described in detail in Embodiment 1 to Embodiment 4.

A difference between the two layering structures lies in that: In spatial scalability, an upsampling process may be performed on a reconstructed block of a lower-layer enhancement layer to obtain a reconstructed block of a size corresponding to that of an LTU of a higher-layer enhancement layer, a residual block is obtained by calculating a difference between corresponding pixels in a source picture block and a reconstructed block obtained through upsampling, and the residual block is sent to a higher-layer enhancement-layer encoder. In addition, the reconstructed block obtained through upsampling is superimposed on a reconstructed residual block of the higher-layer enhancement layer to obtain a reconstructed block of the higher-layer enhancement layer. Therefore, in the layering process, either spatial scalability or quality scalability can be used for any layer, and the two layering manners may be used in a mixed manner. For example, the first enhancement layer uses spatial scalability, the second enhancement layer uses quality scalability, and a third enhancement layer also uses spatial scalability.

Correspondingly, a decoding method based on the foregoing hybrid layered bitstreams may be obtained. Based on Embodiment 2 and Embodiment 3, it can be learned that the decoding mode for the enhancement layer bitstream in case of quality scalability is the same as that in case of spatial scalability. Both of the decoding modes are processes in which the TU partitioning information and the residual information are directly decoded and then the residual information is processed based on the TU partitioning information to obtain the reconstructed residual block of the enhancement layer. Therefore, the hybrid layered bitstreams, that is, the quality scalability bitstream and the spatial scalability bitstream, can also be correctly decoded in layering manners corresponding to specific layers.

Figure 16:
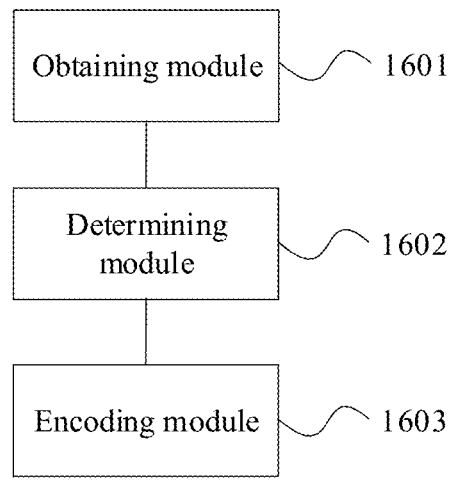
FIG. 16 is an example schematic diagram of a structure of an encoding apparatus according to this application.

FIG. 16 is an example schematic diagram of a structure of an encoding apparatus according to this application. As shown in FIG. 16, the apparatus in this embodiment may be corresponding to a video encoder 20. The apparatus may include an obtaining module 1601, a determining module 1602, and an encoding module 1603.

In a possible embodiment, the obtaining module 1601 is configured to: obtain a reconstructed block of a base layer of a to-be-encoded picture block; and calculate a difference between corresponding pixels in the to-be-encoded picture block and the reconstructed block of the base layer to obtain a residual block of an enhancement layer of the to-be-encoded picture block, where a resolution of an enhancement layer picture block is not lower than a resolution of a base layer picture block, or encoding quality of an enhancement layer picture block is not lower than encoding quality of a base layer picture block; the determining module 1602 is configured to determine a transform-block partitioning manner of the residual block of the enhancement layer, where the transform-block partitioning manner of the residual block of the enhancement layer is different from a transform-block partitioning manner of a residual block of the base layer; and the encoding module 1603 is configured to perform transformation on the residual block of the enhancement layer based on the transform-block partitioning manner to obtain a bitstream of the residual block of the enhancement layer.

In a possible embodiment, the determining module 1602 is configured to: perform iterative tree structure partitioning on a first largest transform unit LTU of the residual block of the enhancement layer to obtain transform units TUs of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and $0 \leq i \leq Dmax-1$.

In a possible embodiment, the determining module 1602 is configured to: perform transformation and quantization on a TU to obtain a quantized coefficient of the TU, where the TU is the first TU or the second TU; precode the quantized coefficient of the TU to obtain a code word length of the TU; perform dequantization and inverse transformation on the quantized coefficient of the TU to obtain a reconstructed block of the TU; calculate a sum of squared differences SSD of the TU and the reconstructed block of the TU to obtain a distortion value of the TU; obtain a loss estimate of the TU based on the code word length of the TU and the distortion value of the TU; determine a smaller one of the loss estimate of the first TU and the sum of the loss estimates of the plurality of second TUs; and determine a partitioning manner corresponding to the smaller one as the partitioning manner of the first TU.

In a possible embodiment, a size of the LTU is same as a size of the reconstructed block of the base layer, or a size of the LTU is same as a size of a reconstructed block obtained by performing upsampling on an original reconstructed block of the base layer.

In a possible embodiment, the to-be-encoded picture block is a largest coding unit LCU in a full-frame picture, the to-be-encoded picture block is a full-frame picture, or the to-be-encoded picture block is a region of interest ROI in a full-frame picture.

In a possible embodiment, the base layer and the enhancement layer are obtained based on resolution or encoding quality scalability.

In a possible embodiment, when the base layer and the enhancement layer are obtained based on resolution scalability, the obtaining module 1601 is further configured to: perform downsampling on an original to-be-encoded picture block to obtain the to-be-encoded picture block with a first resolution; and perform upsampling on the original reconstructed block of the base layer to obtain the reconstructed block of the base layer with the first resolution.

In a possible embodiment, the obtaining module 1601 is configured to: calculate a difference between corresponding pixels in the to-be-processed picture block and a prediction block of the to-be-processed picture block to obtain a residual block of the to-be-processed picture block; perform transformation and quantization on the residual block of the to-be-processed picture block to obtain a quantized coefficient of the to-be-processed picture block; perform dequantization and inverse transformation on the quantized coefficient of the to-be-processed picture block to obtain a reconstructed residual block of the to-be-processed picture block; and perform summation on corresponding pixels in the prediction block of the to-be-processed picture block and the reconstructed residual block of the to-be-processed picture block to obtain the reconstructed block of the base layer.

In a possible embodiment, the obtaining module 1601 is configured to: obtain a reconstructed block of a first enhancement layer of a to-be-encoded picture block; and calculate a difference between corresponding pixels in the to-be-encoded picture block and the reconstructed block of the first enhancement layer to obtain a residual block of a second enhancement layer of the to-be-encoded picture block, where a resolution of a second enhancement layer picture block is not lower than a resolution of a first enhancement layer picture block, or encoding quality of a second enhancement layer picture block is not lower than encoding quality of a first enhancement layer picture block; the determining module 1602 is configured to determine a transform-block partitioning manner of the residual block of the second enhancement layer, where the transform-block partitioning manner of the residual block of the second enhancement layer is different from a transform-block partitioning manner of a residual block of the first layer; and the encoding module 1603 is configured to perform transformation on the residual block of the second enhancement layer based on the transform-block partitioning manner to obtain a bitstream of the residual block of the second enhancement layer.

In a possible embodiment, the determining module 1602 is configured to: perform iterative tree structure partitioning on a first largest transform unit LTU of the residual block of the second enhancement layer to obtain transform units TUs of a plurality of partitioning depths, where a maximum partitioning depth of the plurality of partitioning depths is equal to Dmax, and Dmax is a positive integer; and determine a partitioning manner of a first TU based on a loss estimate of the first TU and a sum of loss estimates of a plurality of second TUs included in the first TU, where a partitioning depth of the first TU is i, a depth of the second TU is i+1, and $0 \le i \le Dmax-1$.

In a possible embodiment, the determining module 1602 is configured to: perform transformation and quantization on a TU to obtain a quantized coefficient of the TU, where the TU is the first TU or the second TU; precode the quantized coefficient of the TU to obtain a code word length of the TU; perform dequantization and inverse transformation on the quantized coefficient of the TU to obtain a reconstructed block of the TU; calculate a sum of squared differences SSD of the TU and the reconstructed block of the TU to obtain a distortion value of the TU; obtain a loss estimate of the TU based on the code word length of the TU and the distortion value of the TU; determine a smaller one of the loss estimate of the first TU and the sum of the loss estimates of the plurality of second TUs; and determine a partitioning manner corresponding to the smaller one as the partitioning manner of the first TU.

In a possible embodiment, a size of the LTU is same as a size of the reconstructed block of the first enhancement layer, or a size of the LTU is same as a size of a reconstructed block obtained by performing upsampling on an original reconstructed block of the first enhancement layer.

In a possible embodiment, the to-be-encoded picture block is a largest coding unit LCU in a full-frame picture, the to-be-encoded picture block is a full-frame picture, or the to-be-encoded picture block is a region of interest ROI in a full-frame picture.

In a possible embodiment, the first enhancement layer and the second enhancement layer are obtained through layering in a quality scalability manner or a spatial scalability manner.

In a possible embodiment, when the first enhancement layer and the second enhancement layer are obtained through layering in a spatial scalability manner, the obtaining module 1601 is further configured to: perform downsampling on an original to-be-encoded picture block to obtain the to-be-encoded picture block with a second resolution; and perform upsampling on the original reconstructed block of the first enhancement layer to obtain the reconstructed block of the first enhancement layer with the second resolution.

In a possible embodiment, the obtaining module 1601 is configured to: calculate a difference between corresponding pixels in the to-be-processed picture block and a reconstructed block of a third layer of the to-be-processed picture block to obtain a residual block of the first enhancement layer, where the resolution of the first enhancement layer picture block is not lower than a resolution of a third-layer picture block, or the encoding quality of the first enhancement layer picture block is not lower than encoding quality of a third-layer picture block; perform transformation and quantization on the residual block of the first enhancement layer to obtain a quantized coefficient of the residual block of the first enhancement layer; perform dequantization and inverse transformation on the quantized coefficient of the residual block of the first enhancement layer to obtain a reconstructed residual block of the first enhancement layer; and perform summation on corresponding pixels in the reconstructed block of the third layer and the reconstructed residual block of the first enhancement layer to obtain the reconstructed block of the first enhancement layer.

The apparatus in this embodiment may be configured to implement the technical solution implemented by the encoder in the method embodiment shown in FIG. 8 or FIG. 11. An implementation principle and technical effects thereof are similar to those in the method embodiments. Details are not described herein again.

Figure 17:
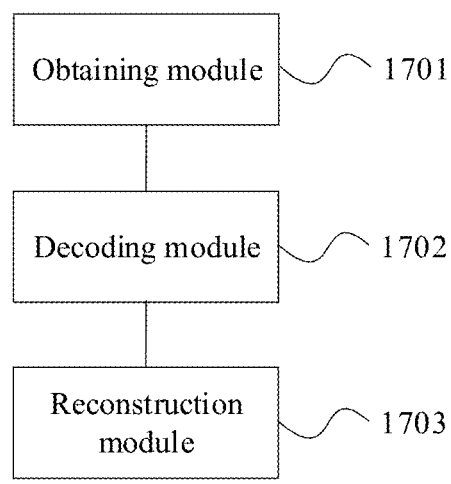
FIG. 17 is an example schematic diagram of a structure of a decoding apparatus according to this application.

FIG. 17 is an example schematic diagram of a structure of a decoding apparatus according to this application. As shown in FIG. 17, the apparatus in this embodiment may be corresponding to a video decoder 30. The apparatus may include an obtaining module 1701, a decoding module 1702, and a reconstruction module 1703.

In a possible embodiment, the obtaining module 1701 is configured to obtain a bitstream of a residual block of an enhancement layer of a to-be-decoded picture block; the decoding module 1702 is configured to perform entropy decoding, dequantization, and inverse transformation on the bitstream of the residual block of the enhancement layer to obtain a reconstructed residual block of the enhancement layer; and the reconstruction module 1703 configured to: obtain a reconstructed block of a base layer of the to-be-decoded picture block, where a resolution of an enhancement layer picture block is not lower than a resolution of a base layer picture block, or encoding quality of an enhancement layer picture block is not lower than encoding quality of a base layer picture block; and perform summation on corresponding pixels in the reconstructed residual block of the enhancement layer and the reconstructed block of the base layer to obtain a reconstructed block of the enhancement layer.

In a possible embodiment, the to-be-decoded picture block is a largest coding unit LCU in a full-frame picture, the to-be-decoded picture block is a full-frame picture, or the to-be-decoded picture block is a region of interest ROI in a full-frame picture.

In a possible embodiment, the base layer and the enhancement layer are obtained through layering in a quality scalability manner or a spatial scalability manner.

In a possible embodiment, when the base layer and the enhancement layer are obtained through layering in a spatial scalability manner, the reconstruction module 1703 is further configured to perform upsampling on an original reconstructed block of the base layer to obtain the reconstructed block of the base layer whose resolution is a third resolution, where the third resolution is equal to the resolution of the reconstructed residual block of the enhancement layer.

In a possible embodiment, the reconstruction module 1703 is configured to: obtain a bitstream of a residual block of the base layer; perform entropy decoding on the bitstream of the residual block of the base layer to obtain decoded data of the residual block of the base layer; perform dequantization and inverse transformation on the decoded data of the residual block of the base layer to obtain a reconstructed residual block of the base layer; obtain a prediction block of the base layer based on the decoded data of the residual block of the base layer; and perform summation on corresponding pixels in the reconstructed residual block of the base layer and the prediction block of the base layer to obtain the reconstructed block of the base layer.

In a possible embodiment, the obtaining module 1701 configured to obtain a bitstream of a residual block of a second enhancement layer of a to-be-decoded picture block; the decoding module 1702 is configured to perform entropy decoding, dequantization, and inverse transformation on the bitstream of the residual block of the second enhancement layer to obtain a reconstructed residual block of the second enhancement layer; and the reconstruction module 1703 is configured to: obtain a reconstructed block of a first enhancement layer of the to-be-decoded picture block, where a resolution of a second enhancement layer picture block is not lower than a resolution of a first enhancement layer picture block, or encoding quality of a second enhancement layer picture block is not lower than encoding quality of a first enhancement layer picture block; and perform summation on corresponding pixels in the reconstructed residual block of the second enhancement layer and the reconstructed block of the first enhancement layer to obtain a reconstructed block of the second enhancement layer.

In a possible embodiment, the to-be-decoded picture block is a largest coding unit LCU in a full-frame picture, the to-be-decoded picture block is a full-frame picture, or the to-be-decoded picture block is a region of interest ROI in a full-frame picture.

In a possible embodiment, the first enhancement layer and the second enhancement layer are obtained through layering in a quality scalability manner or a spatial scalability manner.

In a possible embodiment, when the first enhancement layer and the second enhancement layer are obtained through layering in a spatial scalability manner, the reconstruction module 1703 is further configured to perform upsampling on an original reconstructed block of the first enhancement layer to obtain the reconstructed block of the first enhancement layer whose resolution is a fourth resolution, where the fourth resolution is equal to the resolution of the reconstructed residual block of the second enhancement layer.

In a possible embodiment, the reconstruction module 1703 is configured to: obtain a bitstream of a residual block of the first enhancement layer; perform entropy decoding, dequantization, and inverse transformation on the bitstream of the residual block of the first enhancement layer to obtain a reconstructed residual block of the first enhancement layer; and perform summation on corresponding pixels in the reconstructed residual block of the first enhancement layer and a reconstructed block of a third layer to obtain the reconstructed block of the first enhancement layer, where the resolution of the first enhancement layer picture block is not lower than a resolution of a third-layer picture block, or the encoding quality of the first enhancement layer picture block is not lower than encoding quality of a third-layer picture block.

The apparatus in this embodiment may be configured to implement the technical solution implemented by the decoder in the method embodiment shown in FIG. 8 or FIG. 11. An implementation principle and technical effects thereof are similar to those in the method embodiments. Details are not described herein again.

In an example process, operations in the foregoing method embodiments may be completed by using an integrated logic circuit of hardware in a processor or instructions in a form of software. The processor may be a general purpose processor, a digital signal processor (DSP), an application-specific integrated circuit (ASIC), a field-programmable gate array (FPGA), another programmable logic device, a discrete gate, a transistor logic device, or a discrete hardware component. The general purpose processor may be a microprocessor, or the processor may be any conventional processor or the like. The operations of the methods disclosed in embodiments of this application may be directly implemented by using a hardware encoding processor, or may be implemented by using a combination of hardware in an encoding processor and a software module. The software module may be in a mature storage medium in the art, for example, a random access memory, a flash memory, a read-only memory, a programmable read-only memory, an erasable programmable memory, or a register. The storage medium is located in a memory, and the processor reads information from the memory and completes the operations in the foregoing methods in combination with hardware of the processor.

The memory mentioned in various embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example rather than limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and the methods that are described in this specification is intended to include but is not limited to these memories and any other appropriate types of memories.

A person of ordinary skill in the art can be aware that, in combination with the examples described in embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It can be clearly understood by a person skilled in the art that, for the purpose of convenient and brief description, for detailed working processes of the described systems, apparatuses, and units, refer to corresponding processes in the method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement to achieve the objectives of the solutions of embodiments.

In addition, functional units in embodiments of this application may be integrated into one processing unit, each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (a personal computer, a server, a network device, or the like) to perform all or some of the operations of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

We claim:

1. An encoding method, comprising:
obtaining a reconstructed block of a base layer of a to-be-encoded picture block;
calculating a difference between corresponding pixels in the to-be-encoded picture block and the reconstructed block of the base layer to obtain a residual block of an enhancement layer of the to-be-encoded picture block, wherein a resolution of an enhancement layer picture block is not lower than a resolution of a base layer picture block, or an encoding quality of the enhancement layer picture block is not lower than an encoding quality of the base layer picture block;
determining a transform-block partitioning manner of the residual block of the enhancement layer, including:
performing iterative tree structure partitioning on a first largest transform unit (LTU) of the residual block of the enhancement layer to obtain transform units (TUs) of a plurality of partitioning depths, wherein a maximum partitioning depth of the plurality of partitioning depths is equal to Dmax, and Dmax is a positive integer; and
determining a partitioning manner of a first TU based on a loss estimate of the first TU and a sum of loss estimates of a plurality of second TUs comprised in the first TU, wherein a partitioning depth of the first TU is i, a depth of the second TU is i+1, and $0 \le i \le Dmax-1$, wherein the transform-block partitioning manner of the residual block of the enhancement layer is different from a transform-block partitioning manner of a residual block of the base layer; and
performing transformation on the residual block of the enhancement layer based on the transform-block partitioning manner to obtain a bitstream of the residual block of the enhancement layer.

2. The method according to claim 1, wherein the determining the partitioning manner of the first TU based on the loss estimate of the first TU and the sum of the loss estimates of the plurality of second TUs comprised in the first TU comprises:
performing transformation and quantization on a TU to obtain a quantized coefficient of the TU, wherein the TU is the first TU or one of the plurality of second TUs;
precoding the quantized coefficient of the TU to obtain a code word length of the TU;
performing dequantization and inverse transformation on the quantized coefficient of the TU to obtain a reconstructed block of the TU;
calculating a sum of squared differences (SSD) of the TU and the reconstructed block of the TU to obtain a distortion value of the TU;
obtaining a loss estimate of the TU based on the code word length of the TU and the distortion value of the TU;
determining a smaller one of the loss estimate of the first TU and a sum of the loss estimates of the plurality of second TUs; and
determining the partitioning manner corresponding to the smaller one as the partitioning manner of the first TU.

3. The method according to claim 1, wherein a size of the first LTU is the same as a size of the reconstructed block of the base layer, or a size of the first LTU is the same as a size of a reconstructed block obtained by performing upsampling on an original reconstructed block of the base layer.

4. The method according to claim 1, wherein the to-be-encoded picture block is a largest coding unit (LCU) in a full-frame picture, the to-be-encoded picture block is a full-frame picture, or the to-be-encoded picture block is a region of interest (ROI) in a full-frame picture.

5. The method according to claim 1, wherein the base layer and the enhancement layer are obtained based on resolution or encoding quality scalability.

6. The method according to claim 1, wherein when the base layer and the enhancement layer are obtained based on resolution scalability, before the calculating the difference between the corresponding pixels in the to-be-encoded picture block and the reconstructed block of the base layer to obtain the residual block of the enhancement layer of the to-be-encoded picture block, and
wherein the method further comprises:
performing downsampling on an original to-be-encoded picture block to obtain the to-be-encoded picture block with a first resolution; and
performing upsampling on an original reconstructed block of the base layer to obtain the reconstructed block of the base layer with the first resolution.

7. The method according to claim 1, wherein the obtaining the reconstructed block of the base layer of the to-be-encoded picture block comprises:
calculating a difference between corresponding pixels in the to-be-encoded picture block and a prediction block of the to-be-encoded picture block to obtain a residual block of the to-be-encoded picture block;
performing transformation and quantization on the residual block of the to-be-encoded picture block to obtain a quantized coefficient of the to-be-encoded picture block;
performing dequantization and inverse transformation on the quantized coefficient of the to-be-encoded picture block to obtain a reconstructed residual block of the to-be-encoded picture block; and
performing summation on corresponding pixels in the prediction block of the to-be-encoded picture block and the reconstructed residual block of the to-be-encoded picture block to obtain the reconstructed block of the base layer.

8. A decoding method, comprising:
obtaining a bitstream of a residual block of an enhancement layer of a to-be-decoded picture block, wherein the bitstream of the residual block of the enhancement layer is encoded by determining a transform-block partitioning manner of the residual block of the enhancement layer, including performing iterative tree structure partitioning on a first largest transform unit (LTU) of the residual block of the enhancement layer to obtain transform units (TUs) of a plurality of partitioning depths, wherein a maximum partitioning depth of the plurality of partitioning depths is equal to Dmax, and Dmax is a positive integer, and determining a partitioning manner of a first TU based on a loss estimate of the first TU and a sum of loss estimates of a plurality of second TUs comprised in the first TU, wherein a partitioning depth of the first TU is i, a depth of the second TU is i+1, and $0 \leq i \leq Dmax-1$;
performing entropy decoding, dequantization, and inverse transformation on the bitstream of the residual block of the enhancement layer to obtain a reconstructed residual block of the enhancement layer;
obtaining a reconstructed block of a base layer of the to-be-decoded picture block, wherein a resolution of an enhancement layer picture block is not lower than a resolution of a base layer picture block, or an encoding quality of the enhancement layer picture block is not lower than an encoding quality of the base layer picture block; and
performing summation on corresponding pixels in the reconstructed residual block of the enhancement layer and the reconstructed block of the base layer to obtain a reconstructed block of the enhancement layer, wherein the transform-block partitioning manner of the residual block of the enhancement layer is determined to be different from a transform-block partitioning manner of a residual block of the base layer.

9. The method according to claim 8, wherein the to-be-decoded picture block is a largest coding unit (LCU) in a full-frame picture, the to-be-decoded picture block is a full-frame picture, or the to-be-decoded picture block is a region of interest (ROI) in the full-frame picture.

10. The method according to claim 8, wherein the base layer and the enhancement layer are obtained through layering in a quality scalability manner or a spatial scalability manner.

11. The method according to claim 8, wherein when the base layer and the enhancement layer are obtained through layering in a spatial scalability manner, before the performing the summation on the corresponding pixels in the reconstructed residual block of the enhancement layer and the reconstructed block of the base layer to obtain the reconstructed block of the enhancement layer, the method further comprises:
performing upsampling on an original reconstructed block of the base layer to obtain the reconstructed block of the base layer whose resolution is a third resolution, wherein the third resolution is equal to a resolution of the reconstructed residual block of the enhancement layer.

12. The method according to claim 8, wherein the obtaining the reconstructed block of the base layer of the to-be-decoded picture block comprises:
obtaining a bitstream of a residual block of the base layer;
performing entropy decoding on the bitstream of the residual block of the base layer to obtain decoded data of the residual block of the base layer;
performing dequantization and inverse transformation on the decoded data of the residual block of the base layer to obtain a reconstructed residual block of the base layer;
obtaining a prediction block of the base layer based on the decoded data of the residual block of the base layer; and
performing summation on corresponding pixels in the reconstructed residual block of the base layer and the prediction block of the base layer to obtain the reconstructed block of the base layer.

13. A device, comprising:
a processor and a memory, wherein the processor is coupled to the memory, and the memory stores computer-readable instructions; and
the processor is configured to execute the computer-readable instructions, and when the computer-readable instructions are executed by the device, the device is configured to perform operations comprising:
obtaining a reconstructed block of a base layer of a to-be-encoded picture block;
calculating a difference between corresponding pixels in the to-be-encoded picture block and the reconstructed block of the base layer to obtain a residual block of an enhancement layer of the to-be-encoded picture block, wherein a resolution of an enhancement layer picture block is not lower than a resolution of a base layer picture block, or an encoding quality of the enhancement layer picture block is not lower than an encoding quality of the base layer picture block;
determining a transform-block partitioning manner of the residual block of the enhancement layer, including:
performing iterative tree structure partitioning on a first largest transform unit (LTU) of the residual block of the enhancement layer to obtain transform units (TUs) of a plurality of partitioning depths, wherein a maximum partitioning depth of the plurality of partitioning depths is equal to Dmax, and Dmax is a positive integer; and
determining a partitioning manner of a first TU based on a loss estimate of the first TU and a sum of loss estimates of a plurality of second TUs comprised in the first TU, wherein a partitioning depth of the first TU is i, a depth of the second TU is i+1, and $0 \leq i \leq Dmax-1$, wherein the transform-block partitioning manner of the residual block of the enhancement layer is different from a transform-block partitioning manner of a residual block of the base layer; and
performing transformation on the residual block of the enhancement layer based on the transform-block partitioning manner to obtain a bitstream of the residual block of the enhancement layer.

14. The device of claim 13, wherein the determining the partitioning manner of the first TU based on the loss estimate of the first TU and the sum of the loss estimates of the plurality of second TUs comprised in the first TU comprises:
performing transformation and quantization on a TU to obtain a quantized coefficient of the TU, wherein the TU is the first TU or one of the plurality of second TUs;
precoding the quantized coefficient of the TU to obtain a code word length of the TU;
performing dequantization and inverse transformation on the quantized coefficient of the TU to obtain a reconstructed block of the TU;
calculating a sum of squared differences (SSD) of the TU and the reconstructed block of the TU to obtain a distortion value of the TU;
obtaining a loss estimate of the TU based on the code word length of the TU and the distortion value of the TU;
determining a smaller one of the loss estimate of the first TU and a sum of the loss estimates of the plurality of second TUs; and
determining the partitioning manner corresponding to the smaller one as the partitioning manner of the first TU.

15. The device of claim 13, wherein a size of the first LTU is the same as a size of the reconstructed block of the base layer, or a size of the first LTU is the same as a size of a reconstructed block obtained by performing upsampling on an original reconstructed block of the base layer.

16. The device of claim 13, wherein the to-be-encoded picture block is a largest coding unit (LCU) in a full-frame picture, the to-be-encoded picture block is a full-frame picture, or the to-be-encoded picture block is a region of interest (ROI) in a full-frame picture.

17. The device of claim 13, wherein the base layer and the enhancement layer are obtained based on resolution or encoding quality scalability.

18. The device of claim 13, wherein the obtaining the reconstructed block of the base layer of the to-be-encoded picture block comprises:
calculating a difference between corresponding pixels in the to-be-encoded picture block and a prediction block of the to-be-encoded picture block to obtain a residual block of the to-be-encoded picture block;
performing transformation and quantization on the residual block of the to-be-encoded picture block to obtain a quantized coefficient of the to-be-encoded picture block;
performing dequantization and inverse transformation on the quantized coefficient of the to-be-encoded picture block to obtain a reconstructed residual block of the to-be-encoded picture block; and
performing summation on corresponding pixels in the prediction block of the to-be-encoded picture block and the reconstructed residual block of the to-be-encoded picture block to obtain the reconstructed block of the base layer.

* * * * *